United States Patent
Kweon

(10) Patent No.: US 8,798,451 B1
(45) Date of Patent: Aug. 5, 2014

(54) METHODS OF OBTAINING PANORAMIC IMAGES USING ROTATIONALLY SYMMETRIC WIDE-ANGLE LENSES AND DEVICES THEREOF

(71) Applicant: Gyeongil Kweon, Daejeon (KR)

(72) Inventor: Gyeongil Kweon, Daejeon (KR)

( * ) Notice: Subject to any disclaimer, the term of this patent is extended or adjusted under 35 U.S.C. 154(b) by 0 days.

(21) Appl. No.: 13/918,960

(22) Filed: Jun. 15, 2013

(51) Int. Cl.
*G03B 37/00* (2006.01)
*G06T 3/00* (2006.01)

(52) U.S. Cl.
USPC .............................. 396/20; 348/36; 382/293

(58) Field of Classification Search
USPC ................................ 396/20; 348/36; 382/293
See application file for complete search history.

(56) References Cited

U.S. PATENT DOCUMENTS

| | | | |
|---|---|---|---|
| 6,574,376 B1 * | 6/2003 | Shiota et al. ................... | 382/293 |
| 7,058,235 B2 * | 6/2006 | Wakamoto et al. ............ | 382/275 |
| 7,570,280 B2 * | 8/2009 | Ozaki ............................. | 348/36 |
| 7,714,936 B1 * | 5/2010 | Martin et al. .................. | 348/576 |
| 2001/0015751 A1 * | 8/2001 | Geng .............................. | 348/36 |
| 2013/0177258 A1 * | 7/2013 | Inagaki ......................... | 382/293 |
| 2014/0009571 A1 * | 1/2014 | Geng .............................. | 348/36 |
| 2014/0071227 A1 * | 3/2014 | Takenaka et al. ............... | 348/36 |
| 2014/0111606 A1 * | 4/2014 | Cossairt et al. ................ | 348/36 |

* cited by examiner

*Primary Examiner* — W B Perkey
(74) *Attorney, Agent, or Firm* — John K. Park; Park Law Firm

(57) ABSTRACT

The present invention provides methods of obtaining panoramic images that appear most natural to the naked eye by executing a mathematically precise image processing operation on a wide-angle image acquired using a wide-angle lens that is rotationally symmetric about an optical axis, and devices using the methods. Imaging systems using this method can be used not only in security surveillance applications for indoor and outdoor environments, but also in diverse areas such as video phones for apartment entrance doors, rear view cameras for vehicles, visual sensors for unmanned aerial vehicles and robots, and broadcasting cameras. Also, it can be used to obtain panoramic photographs using digital cameras.

8 Claims, 50 Drawing Sheets

" Prior Art "

" Prior Art "

" Prior Art "

" Prior Art "

METHODS OF OBTAINING PANORAMIC IMAGES USING ROTATIONALLY SYMMETRIC WIDE-ANGLE LENSES AND DEVICES THEREOF

TECHNICAL FIELD

The present invention generally relates to mathematically precise image processing methods of extracting panoramic images, which appear most natural to the naked eye, from images acquired using a camera equipped with a wide-angle lens that is rotationally symmetric about an optical axis, as well as devices using the methods.

BACKGROUND ART

Panoramic camera, which captures the 360° view of scenic places such as tourist resorts, is an example of a panoramic imaging system. Panoramic imaging system is an imaging system that captures the views one could get by making one complete turn-around from a given spot. On the other hand, omnidirectional imaging system captures the view of every possible direction from a given spot. Omnidirectional imaging system provides a view that a person could observe from a given position by turning around as well as looking up and down. In a mathematical terminology, the solid angle of the region that can be captured by the imaging system is $4\pi$ steradian.

There have been a lot of studies and developments of panoramic imaging systems not only in the traditional areas such as photographing buildings, nature scenes, and heavenly bodies, but also in security/surveillance systems using CCD (charge-coupled device) or CMOS (complementary metal-oxide-semiconductor) cameras, virtual touring of real estates, hotels and tourist resorts, and navigational aids for mobile robots and unmanned aerial vehicles (UAV).

As a viable method of obtaining panoramic images, people are actively researching on catadioptric panoramic imaging systems, which are imaging systems employing both mirrors and refractive lenses. Shown in FIG. 1 is a schematic diagram of a general catadioptric panoramic imaging system. As schematically shown in FIG. 1, a catadioptric panoramic imaging system (100) of prior arts includes as constituent elements a rotationally symmetric panoramic mirror (111), of which the cross-sectional profile is close to an hyperbola, a lens (112) that is located on the rotational-symmetry axis (101) of the mirror (111) and oriented toward the said mirror (111), and an image acquisition means that includes a camera body (114) having an image sensor (113) inside. Then, an incident ray (105) having an altitude angle δ, which originates from every 360° directions around the mirror and propagates toward the rotational-symmetry axis (101), is reflected on a point M on the mirror surface (111), and captured by the image sensor (113) as a reflected ray (106) having a zenith angle θ with respect to the rotational-symmetry axis (101). Here, the altitude angle refers to an angle measured from the ground plane (i.e., X-Y plane) toward the zenith. FIG. 2 is a conceptual drawing of an exemplary rural landscape obtainable using the catadioptric panoramic imaging system (100) of prior art schematically shown in FIG. 1. As illustrated in FIG. 2, a photographic film or an image sensor (213) has a square or a rectangular shape, while a panoramic image (233) obtained using a panoramic imaging system (100) has an annular shape. Non-hatched region in FIG. 2 constitutes the panoramic image, and the hatched circle in the center corresponds to the area at the backside of the camera, which is not captured because the camera body occludes its view. Within this circle lies the image of the camera itself reflected by the mirror (111). On the other hand, the hatched regions at the four corners originate from the fact that the diagonal field of view of the camera lens (112) is larger than the field of view of the panoramic mirror (111). In this region lies the image of the area at the front side of the camera observable in absence of the panoramic mirror. FIG. 3 is an exemplary unwrapped panoramic image (334) obtained from the ring-shaped panoramic image (233) by cutting along the cutting-line (233c) and converting into a perspectively normal view using an image processing software.

For the unwrapped panoramic image (334) in FIG. 3 to appear natural to the naked eye, the raw panoramic image (233) prior to the unwrapping operation must be captured by a panoramic lens following a certain projection scheme. Here, a panoramic lens refers to a complex lens comprised of a panoramic mirror (111) and a refractive lens (112). FIG. 4 is a conceptual drawing of an object plane (431) employed in a panoramic imaging system following a rectilinear projection scheme, and FIG. 5 is a conceptual drawing of a raw panoramic image (533) obtained by capturing the scene on the object plane of FIG. 4 using the said panoramic imaging system. In such a rectilinear panoramic imaging system, a cylindrical object plane (131, 431) is assumed, of which the rotational symmetry axis coincides with the optical axis of the panoramic lens. In FIG. 4, it is preferable that the rotational symmetry axis of the cylindrical object plane (431) is perpendicular to the ground plane (417).

Referring to FIG. 1 and FIG. 4, the radius of the said object plane (131) is S, and the panoramic lens comprised of a panoramic mirror (111) and a refractive lens (112) forms the image of the point (104) of an object lying on the said object plane (131), in other words, the image point P, on the focal plane (132). To obtain a sharp image, the sensor plane (113) of the image sensor must coincide with the said focal plane (132). A ray (106) that arrives at the said image point P is first reflected at a point M on the panoramic mirror (111) and passes through the nodal point N of the refractive lens (112). Here, the nodal point is the position of a pinhole when the camera is approximated as an ideal pinhole camera. The distance from the nodal point to the focal plane (132) is approximately equal to the effective focal length f of the refractive lens (112). For the simplicity of argument, we will refer the ray (105) before the reflection at the mirror as the incident ray, and the ray after the reflection as the reflected ray (106). If the reflected ray has a zenith angle θ with respect to the optical axis (101) of the camera, then, the distance r from the center of the sensor plane (113), in other words, the intersection point O between the sensor plane (113) and the optical axis (101), to the point P on the image sensor plane, whereon the reflected ray (106) is captured, is given by Eq. 1.

$$r = f \tan\theta \qquad \text{[Math Figure 1]}$$

For a panoramic lens following a rectilinear projection scheme, the height in the object plane (131), in other words, the distance Z measured parallel to the optical axis, is proportional to the distance r on the sensor plane. The axial radius of the point M on the panoramic mirror surface (111), whereon the reflection has occurred, is ρ, and the height is z, and the axial radius of the corresponding point (104) on the object plane (131) is S, and the height is Z. Since the altitude angle of the said incident ray (105) is δ, the height Z of the said object is given by Eq. 2.

$$Z = z + (S - \rho)\tan\delta \qquad \text{[Math Figure 2]}$$

If the distance from the camera to the object plane is large compared to the size of the camera (i.e., S>>ρ, Z>>z), then Eq. 2 can be approximated as Eq. 3.

$$Z \cong S \tan \delta \quad \text{[Math Figure 3]}$$

Therefore, if the radius S of the object plane is fixed, then the height of the object (i.e., the object size) is proportional to tan δ, and the axial radius of the corresponding image point (i.e., the image size) on the focal plane is proportional to tan θ. If tan δ is proportional to tan θ in this manner, then the image of the object on the object plane is captured on the image sensor with its vertical proportions preserved. Incidentally, referring to FIG. 1, it can be noticed that both the altitude angle of the incident ray and the zenith angle of the reflected ray have upper bounds and lower bounds. If the range of the altitude angle of the incident ray is from $\delta_1$ to $\delta_2$ ($\delta_1 \leq \delta \leq \delta_2$), and the range of the zenith angle of the reflected ray is from $\theta_1$ to $\theta_2$ ($\theta_1 \leq \theta \leq \theta_2$), then the range of the corresponding object height on the object plane is from $Z_1 = S \tan \delta_1$ to $Z_2 = S \tan \delta_2$ ($Z_1 \leq Z \leq Z_2$), and the range of the axial radius of the image point on the focal plane is from $r_1 = f \tan \theta_1$ to $r_2 = f \tan \theta_2$ ($r_1 \leq r \leq r_2$). The projection scheme for these r and Z to be in proportion to each other is given by Eq. 4.

$$r(\delta) = r_1 + \frac{r_2 - r_1}{\tan \delta_2 - \tan \delta_1}(\tan \delta - \tan \delta_1) \quad \text{[Math Figure 4]}$$

Therefore, a most natural panoramic image can be obtained when the panoramic lens implements the rectilinear projection scheme given by Eq. 4. One disadvantage of such a panoramic imaging system is that there are considerable numbers of unused pixels in the image sensor. FIG. 6 is a schematic diagram illustrating the degree of pixel utilization on the sensor plane (613) of an image sensor having the standard 4:3 aspect ratio. Image sensors with the ratio of the lateral side B to the longitudinal side V equal to 1:1 or 16:9 are not many in kinds nor cheap in price, and most of the image sensors are manufactured with the ratio of 4:3. Assuming an image sensor having the 4:3 aspect ratio, the area $A_1$ of the image sensor plane (613) is given by Eq. 5.

$$A_1 = BV = 4/3 V^2 \quad \text{[Math Figure 5]}$$

On such an image sensor plane, the panoramic image (633) is formed between the outer rim (633b) and the inner rim (633a) of an annular region, where the two rims constitute concentric circles. Here, the said sensor plane (613) coincides with a part of the focal plane (632) of the len, and the said panoramic image (633) exists on a part of the sensor plane (613). In FIG. 6, the outer radius of the panoramic image (633) is $r_2$, and the inner radius is $r_1$. Therefore, the area $A_2$ of the panoramic image is given by Eq. 6.

$$A_2 = \pi(r_2^2 - r_1^2) \quad \text{[Math Figure 6]}$$

Referring to FIG. 2 and FIG. 5, the height of the unwrapped panoramic image is given by the difference between the outer radius and the inner radius, in other words, by $r_2 - r_1$. On the other hand, the lateral dimension of the unwrapped panoramic image is given by $2\pi r_1$ or $2\pi r_2$, depending on which radius is taken as a base. Therefore, the outer radius $r_2$ and the inner radius $r_1$ must have an appropriate ratio, and 2:1 can be considered as a proper ratio. Furthermore, to make the maximum use of pixels, it is desirable that the outer rim (633b) of the panoramic image contacts the lateral sides of the image sensor plane (613). Therefore, it is preferable that $r_2 = (1/2)V$, and $r_1 = (1/2)r_2 = (1/4)V$. Under these conditions, the area of the panoramic image (633) is given by Eq. 7.

$$A_2 = \pi\left\{\left(\frac{1}{2}V\right)^2 - \left(\frac{1}{4}V\right)^2\right\} = \frac{3\pi}{16}V^2 \quad \text{[Math Figure 7]}$$

Therefore, the ratio between the area $A_2$ of the panoramic image (633) and the area $A_1$ of the image sensor plane (613) is given by Eq. 8.

$$\frac{A_2}{A_1} = \frac{\frac{3\pi}{16}V^2}{\frac{4}{3}V^2} = \frac{9\pi}{64} \cong 0.442 \quad \text{[Math Figure 8]}$$

Thus, the percentage of pixel utilization is less than 50%, and the panoramic imaging systems of prior arts have a disadvantage in that pixels are not efficiently used.

Another method of obtaining a panoramic image is to employ a fisheye lens with a wide field of view (FOV). For example, the entire sky and the horizon can be captured in a single image by pointing a camera equipped with a fisheye lens with 180° FOV toward the zenith (i.e., the optical axis of the camera is aligned perpendicular to the ground plane). On this reason, fisheye lenses have been often referred to as "all-sky lenses". Particularly, a high-end fisheye lens by Nikon, namely, 6 mm f/5.6 Fisheye-Nikkor, has a FOV of 220°. Therefore, a camera mounted with this lens can capture even a portion of the backside of the camera as well as the front side of the camera. Then, a panoramic image can be obtained from thus obtained fisheye image by the same methods as illustrated in FIG. 2 and FIG. 3.

In many cases, imaging systems are installed on vertical walls. Imaging systems installed on the outside walls of a building for the purpose of monitoring the surroundings, or a rear view camera for monitoring the backside of a passenger car are such examples. In such cases, it is inefficient if the horizontal field of view is significantly larger than 180°. This is because a wall, which is not needed to be monitored, takes up a large space in the monitor screen, pixels are wasted, and screen appears dull. Therefore, a horizontal FOV around 180° is more appropriate for such cases. Nevertheless, a fisheye lens with 180° FOV is not desirable for such application. This is because the barrel distortion, which accompanies a fisheye lens, evokes psychological discomfort and abhorred by the consumer.

An example of an imaging system, which can be installed on an interior wall for the purpose of monitoring the entire room, is given by a pan•tilt•zoom camera. Such a camera is comprised of a video camera, which is equipped with an optical zoom lens, mounted on a pan•tilt stage. Pan is an operation of rotating in the horizontal direction for a given angle, and tilt is an operation of rotating in the vertical direction for a given angle. In other words, if we assume that the camera is at the center of a celestial sphere, then pan is an operation of changing the longitude, and tilt is an operation of changing the latitude. Therefore, the theoretical range of pan operation is 360°, and the theoretical range of tilt operation is 180°. The shortcomings of a pan•tilt•zoom camera include high price, large size and heavy weight. Optical zoom lens is large, heavy and expensive due to the difficulty in design and the complicated structure. Also, a pan•tilt stage is an expensive device not cheaper than a camera. Therefore, it cost a considerable sum of money to install a pan•tilt•zoom camera. Furthermore, since a pan•tilt•zoom camera is large and heavy, this fact can become a serious impediment to certain applications. Examples of such cases include airplanes where the weight of the payload is of critical importance, or when a strict size limitation exists in order to install a camera in a confined space. Furthermore, pan•tilt•zoom operation takes a time because it is a mechanical operation. Therefore, depending on the particular application at hand, such a mechanical response may not be fast enough.

References 1 and 2 provide fundamental technologies of extracting an image having a particular viewpoint or projection scheme from an image having other than the desirable viewpoint or projection scheme. Specifically, reference 2 provides an example of a cubic panorama. In short, a cubic panorama is a special technique of illustration wherein the observer is assumed to be located at the very center of an imaginary cubic room made of glass, and the outside view from the center of the glass room is directly transcribed on the region of the glass wall whereon the ray vector from the object to the observer meets the glass wall. Furthermore, an example of a more advanced technology is provided in the above reference, wherewith reflections from an arbitrarily shaped mirrored surface can be calculated. Specifically, the author of reference 2 created an imaginary lizard having a highly reflective mirror-like skin as if made of a metal surface, then set-up an observer's viewpoint separated from the lizard, and calculated the view of the imaginary environment reflected on the lizard skin from the viewpoint of the imaginary observer. However, the environment was not a real environment captured by an optical lens, but a computer-created imaginary environment captured with an imaginary distortion-free pinhole camera.

On the other hand, an imaging system is described in reference 3 that is able to perform pan•tilt•zoom operations without a physically moving part. The said invention uses a camera equipped with a fisheye lens with more than 180° FOV in order to take a picture of the environment. Then, the user designates a principal direction of vision using various devices such as a joystick, upon which, the computer extracts a rectilinear image from the fisheye image that could be obtained by heading a distortion-free camera to that particular direction. The main difference between this invention and the prior arts is that this invention creates a rectilinear image corresponding to the particular direction the user has designated using devices such as a joystick or a computer mouse. Such a technology is essential in the field of virtual reality, or when it is desirable to replace mechanical pan•tilt•zoom camera, and the keyword is "interactive picture". In this technology, there are no physically moving parts in the camera. As a consequence, the system response is fast, and there is less chance of mechanical failure.

Ordinarily, when an imaging system such as a security camera is installed, a cautionary measure is taken so that vertical lines perpendicular to the horizontal plane also appear vertical in the acquired image. In such a case, vertical lines still appear vertical even as mechanical pan•tilt•zoom operation is performed. On the other hand, in the said invention, vertical lines generally do not appear as vertical lines after software pan•tilt•zoom operation has been performed. To remedy such an unnatural result, a rotate operation is additionally performed, which is not found in a mechanical pan•tilt•zoom camera. Furthermore, the said invention does not provide the exact amount of rotate angle that is needed in order to display vertical lines as vertical lines. Therefore, the exact rotation angle must be found in a trial-and-error method in order to display vertical lines as vertical lines.

Furthermore, the said invention assumes that the projection scheme of the fisheye lens is an ideal equidistance projection scheme. But, the real projection scheme of a fisheye lens generally shows a considerable deviation from an ideal equidistance projection scheme. Since the said invention does not take into account the distortion characteristics of a real lens, images obtained after image processing still shows distortion.

The invention described in reference 4 remedies the shortcoming of the invention described in reference 3, namely the inability of taking into account the real projection scheme of a fisheye lens used in image processing. Nevertheless, the defect of not showing vertical lines as vertical lines in the monitor screen has not been resolved.

From another point of view, all animals and plants including human are bound on the surface of the earth due to the gravitational pull, and most of the events, which need attention or cautionary measure, take place near the horizon. Therefore, even though it is necessary to monitor every 360° direction on the horizon, it is not as important to monitor high along the vertical direction, for example, as high as to the zenith or deep down to the nadir. Distortion is unavoidable if we want to describe the scene of every 360° direction on a two-dimensional plane. Similar difficulty exists in the cartography where geography on earth, which is a structure on the surface of a sphere, needs to be mapped on a planar two-dimensional atlas. Among all the distortions, the distortion that appears most unnatural to the people is the distortion where vertical lines appear as curved lines. Therefore, even if other kinds of distortions are present, it is important to make sure that such a distortion is absent.

Described in reference 5 are the well-known map projection schemes among the diverse map projection schemes such as equi-rectangular projection, Mercator projection and cylindrical projection schemes, and reference 6 provides a brief history of diverse map projection schemes. Among these, the equi-rectangular projection scheme is the projection scheme most familiar to us when we describe the geography on the earth, or when we draw the celestial sphere in order to make a map of the constellation.

Referring to FIG. 7, if we assume the surface of the earth is a spherical surface with a radius S, then an arbitrary point Q on the earth's surface has a longitude $\Psi$ and a latitude $\delta$. On the other hand, FIG. 8 is a schematic diagram of a planar map drawn according to the equi-rectangular projection scheme. A point Q on the earth's surface having a longitude $\Psi$ and a latitude $\delta$ has a corresponding point P on the planar map (834) drawn according to the equi-rectangular projection scheme. The rectangular coordinate of this corresponding point is given as (x, y). Furthermore, the reference point on the equator having a longitude 0° and a latitude 0° has a corresponding point O on the planar map, and this corresponding point O is the origin of the rectangular coordinate system. Here, according to the equi-rectangular projection scheme, the same interval in the longitude (i.e., the same angular distance along the equator) corresponds to the same lateral interval on the planar map. In other words, the lateral coordinate x on the planar map (834) is proportional to the longitude.

$$x=c\Psi \quad \text{[Math Figure 9]}$$

Here, c is proportionality constant. Also, the longitudinal coordinate y is proportional to the latitude, and has the same proportionality constant as the lateral coordinate.

$$y=c\delta \quad \text{[Math Figure 10]}$$

The span of the longitude is 360° ranging from −180° to +180°, and the span of the latitude is 180° ranging from −90° to +90°. Therefore, a map drawn according to the equi-rectangular projection scheme must have a width W:height H ratio of 360:180=2:1. Furthermore, if the proportionality constant c is given as the radius S of the earth, then the width of the said planar map is given as the perimeter of the earth measured along the equator as given in Eq. 11.

$$W=2\pi S \qquad \text{[Math Figure 11]}$$

Such an equi-rectangular projection scheme appears as a natural projection scheme considering the fact that the earth's surface is close to the surface of a sphere. Nevertheless, it is disadvantageous in that the size of a geographical area is greatly distorted. For example, two very close points near the North Pole can appear as if they are on the opposite sides of the earth in a map drawn according to the equi-rectangular projection scheme.

On the other hand, in a map drawn according to the Mercator projection scheme, the longitudinal coordinate is given as a complex function given in Eq. 12.

$$y = c\ln\left\{\tan\left(\frac{\pi}{4}+\frac{\delta}{2}\right)\right\} \qquad \text{[Math Figure 12]}$$

On the other hand, FIG. 9 is a conceptual drawing of a cylindrical projection scheme or a panoramic perspective. In a cylindrical projection scheme, an imaginary observer is located at the center N of a celestial sphere (931) with a radius S, and it is desired to make a map of the celestial sphere centered on the observer, the map covering most of the region excluding the zenith and the nadir. In other words, the span of the longitude must be 360° ranging from −180° to +180°, but the range of the latitude can be narrower including the equator within its span. Specifically, the span of the latitude can be assumed as ranging from −Δ to +Δ, where Δ must be smaller than 90°.

In this projection scheme, a hypothetical cylindrical plane (934) is assumed which contacts the celestial sphere at the equator (903). Then, for a point Q(Ψ, δ) on the celestial sphere (931) having a given longitude Ψ and a latitude δ, a line segment connecting the center of the celestial sphere and the point Q is extended until it meets the said cylindrical plane. This intersection point is designated as P(Ψ, δ). In this manner, the corresponding point P on the cylindrical plane (934) can be obtained for every point Q on the celestial sphere (931) within the said latitude range. Then, a map having a cylindrical projection scheme is obtained by cutting the cylindrical plane and laying flat on a planar surface. Therefore, the lateral coordinate of the point P on the flattened-out cylindrical plane is given by Eq. 13, and the longitudinal coordinate y is given by Eq. 14.

$$x=S\Psi \qquad \text{[Math Figure 13]}$$

$$y=S\tan\delta \qquad \text{[Math Figure 14]}$$

Such a cylindrical projection scheme is the natural projection scheme for a panoramic camera that produces a panoramic image by rotating in the horizontal plane. Especially, if the lens mounted on the rotating panoramic camera is a distortion-free rectilinear lens, then the resulting panoramic image exactly follows a cylindrical projection scheme. In principle, such a cylindrical projection scheme is the most accurate panoramic projection scheme. However, the panoramic image appears unnatural when the latitudinal range is large, and thus it is not widely used in practice.

Unwrapped panoramic image thus produced and having a cylindrical projection scheme has a lateral width W given by Eq. 11. On the other hand, if the range of the latitude is from $\delta_1$ to $\delta_2$, then the longitudinal height of the unwrapped panoramic image is given by Eq. 15.

$$H=S(\tan\delta_2-\tan\delta_1) \qquad \text{[Math Figure 15]}$$

Therefore, the following equation can be derived from Eq. 11 and Eq. 15.

$$\frac{W}{H} = \frac{2\pi}{\tan\delta_2 - \tan\delta_1} \qquad \text{[Math Figure 16]}$$

Therefore, an unwrapped panoramic image following a cylindrical projection scheme must satisfy Eq. 16.

FIG. 10 is an example of an unwrapped panoramic image given in reference 7, and FIG. 11 is an example of an unwrapped panoramic image given in reference 8. FIGS. 10 and 11 have been acquired using panoramic lenses following rectilinear projection schemes, or in the terminology of cartography, using panoramic lenses following cylindrical projection schemes. Therefore, in the panoramic images of FIG. 10 and FIG. 11, the longitudinal coordinate y is proportional to tan δ. On the other hand, by the structure of panoramic lenses, the lateral coordinate x is proportional to the longitude Ψ. Therefore, except for the proportionality constant, Eqs. 13 and 14 are satisfied.

In the example of FIG. 10, the lateral size is 2192 pixels, and the longitudinal size is 440 pixels. Therefore, 4.98 is obtained by calculating the LHS (left hand side) of Eq. 16. In FIG. 10, the range of the vertical incidence angle is from $\delta_1=-70°$ to $\delta_2=50°$. Therefore, 1.60 is obtained by calculating the RHS (right hand side) of Eq. 16. Thus, the exemplary panoramic image in FIG. 10 does not satisfy the proportionality relation given by Eq. 16. On the other hand, in the example of FIG. 11, the lateral size is 2880 pixels, and the longitudinal size is 433 pixels. Therefore, 6.65 is obtained by calculating the LHS of Eq. 16. In FIG. 11, the range of the vertical incidence angle is from $\delta_1=-23°$ to $\delta_2=23°$. Therefore, 7.40 is obtained by calculating the RHS of Eq. 16. Thus, although the error may be less than that of FIG. 10, still the exemplary panoramic image in FIG. 11 does not satisfy the proportionality relation given by Eq. 16.

It can be noticed that the unwrapped panoramic images given in FIG. 10 and FIG. 11 appear as natural panoramic images despite the fact that the panoramic images do not satisfy such a proportionality relation. This is because of the fact that in a panoramic image, the phenomenon of a line vertical to the ground plane (i.e., a vertical line) appearing as a curved line or as a slanted line is easily noticeable and causes viewer discomfort, but the phenomenon of the lateral and the vertical scales not matching to each other is not unpleasant to the eye in the same degree, because a reference for comparing the horizontal and the vertical directions does not usually exist in the environment around the camera.

All the animals, plants and inanimate objects such as buildings on the earth are under the influence of gravity, and the direction of gravitational force is the up-right direction or the vertical direction. Ground plane is fairly perpendicular to the gravitational force, but needless to say, it is not so on a slanted ground. Therefore, the word "ground plane" actually refers to the horizontal plane, and the vertical direction is the direction perpendicular to the horizontal plane. Even if we refer them as the ground plane, the lateral direction, and the longitudinal direction, for the sake of simplicity in argument, the ground plane must be understood as the horizontal plane, the vertical direction must be understood as the direction perpendicular to the horizontal plane, and the horizontal direction must be understood as a direction parallel to the horizontal plane, whenever an exact meaning of a term needs to be clarified.

Panoramic lenses described in references 7 and 8 take panoramic images in one shot with the optical axes of the panoramic lenses aligned vertical to the ground plane. Incidentally, a cheaper alternative to the panoramic image acquisition method by the previously described camera with a horizontally-rotating lens consist of taking an image with an ordinary camera with the optical axis horizontally aligned, and repeating to take pictures after horizontally rotating the optical axis by a certain amount. Four to eight pictures are taken in this way, and a panoramic image with a cylindrical projection scheme can be obtained by seamlessly joining the pictures consecutively. Such a technique is called stitching. QuickTime VR from Apple computer inc. is commercial software supporting this stitching technology. This method requires a complex, time-consuming, and elaborate operation of precisely joining several pictures and correcting the lens distortion.

According to the reference 9, another method of obtaining a panoramic or an omnidirectional image is to take a hemispherical image by horizontally pointing a camera equipped with a fisheye lens with more than 180° FOV, and then point the camera to the exact opposite direction and take another hemispherical image. By stitching the two images acquired by the camera using appropriate software, one omnidirectional image having the views of every direction (i.e., $4\pi$ steradian) can be obtained. By sending thus obtained image to a geographically separated remote user using communication means such as the Internet, the user can select his own viewpoint from the received omnidirectional image according to his own personal interest, and image processing software on the user's computing device can extract a partial image corresponding to the user-selected viewpoint, and a perspectively correct planar image can be displayed on the computing device. Therefore, using the image processing software, the user can make a choice of turning around (pan), looking-up or down (tilt), or taking a close (zoom in) or a remote (zoom out) view as if the user is actually present at the specific place in the image. This method has a distinctive advantage of multiple users accessing the same Internet site being able to take looks along the directions of their own choices. This advantage cannot be enjoyed in a panoramic imaging system employing a motion camera such as a pan•tilt camera.

References 10 and 11 describe a method of obtaining an omnidirectional image providing the views of every direction centered on the observer. Despite the lengthy description of the invention, however, the projection scheme provided by the said references is one kind of equidistance projection schemes in essence. In other words, the techniques described in the documents make it possible to obtain an omnidirectional image from a real environment or from a cubic panorama, but the obtained omnidirectional image follows an equidistance projection scheme only and its usefulness is thus limited.

On the other hand, reference 12 provides an algorithm for projecting an Omnimax movie on a semi-cylindrical screen using a fisheye lens. Especially, taking into account of the fact that the projection scheme of a fisheye lens mounted on a movie projector deviates from an ideal equidistance projection scheme, a method is described for locating the position of the object point on the film corresponding to a certain point on the screen whereon an image point is formed. Therefore, it is possible to calculate what image has to be on the film in order to project a particular image on the screen, and such an image on the film is produced using a computer. Especially, since the lens distortion is already reflected in the image-processing algorithm, a spectator near the movie projector can entertain himself with a satisfactory panoramic image. Nevertheless, the real projection scheme of the fisheye lens in the said reference is inconvenient to use because it has been modeled with the real image height on the film plane as the independent variable, and the zenith angle of the incident ray as the dependent variable. Furthermore, unnecessarily, the real projection scheme of the fisheye lens has been modeled only with odd polynomials.

Reference 13 provides examples of stereo panoramic images produced by Professor Paul Bourke. Each of the panoramic images follows a cylindrical projection scheme, and a panoramic image of an imaginary scene produced by a computer as well as a panoramic image produced by a rotating slit camera are presented. For panoramic images produced by a computer or produced by a traditional method of rotating slit camera, the lens distortion is not an important issue. However, rotating slit camera cannot be used to take a real-time panoramic image (i.e., movie) of a real world.

[reference 1] J. F. Blinn and M. E. Newell, "Texture and reflection in computer generated images", Communications of the ACM, 19, 542-547 (1976).

[reference 2] N. Greene, "Environment mapping and other applications of world projections", IEEE Computer Graphics and Applications, 6, 21-29 (1986).

[reference 3] S. D. Zimmermann, "Omniview motionless camera orientation system", U.S. Pat. No. 5,185,667, date of patent Feb. 9, 1993.

[reference 4] E. Gullichsen and S. Wyshynski, "Wide-angle image dewarping method and apparatus", U.S. Pat. No. 6,005,611, date of patent Dec. 21, 1999.

[reference 5] E. W. Weisstein, "Cylindrical Projection", http://mathworld.wolfram.com/CylindricalProjection.html.

[reference 6] W. D. G. Cox, "An introduction to the theory of perspective—part 1", The British Journal of Photography, 4, 628-634 (1969).

[reference 7] G. Kweon, K. Kim, Y. Choi, G. Kim, and S. Yang, "Catadioptric panoramic lens with a rectilinear projection scheme", Journal of the Korean Physical Society, 48, 554-563 (2006).

[reference 8] G. Kweon, Y. Choi, G. Kim, and S. Yang, "Extraction of perspectively normal images from video sequences obtained using a catadioptric panoramic lens with the rectilinear projection scheme", Technical Proceedings of the 10th World Multi-Conference on Systemics, Cybernetics, and Informatics, 67-75 (Orlando, Fla., USA, June, 2006).

[reference 9] H. L. Martin and D. P. Kuban, "System for omnidirectional image viewing at a remote location without the transmission of control signals to select viewing parameters", U.S. Pat. No. 5,384,588, date of patent Jan. 24, 1995.

[reference 10] F. Oxaal, "Method and apparatus for performing perspective transformation on visible stimuli", U.S. Pat. No. 5,684,937, date of patent Nov. 4, 1997.

[reference 11] F. Oxaal, "Method for generating and interactively viewing spherical image data", U.S. Pat. No. 6,271,853, date of patent Aug. 7, 2001.

[reference 12] N. L. Max, "Computer graphics distortion for IMAX and OMNIMAX projection", Proc. NICOGRAPH, 137-159 (1983).

[reference 13] P. D. Bourke, "Synthetic stereoscopic panoramic images", Lecture Notes in Computer Graphics (LNCS), Springer, 4270, 147-155 (2006).

[reference 14] G. Kweon and M. Laikin, "Fisheye lens", Korean patent application 10-2008-0030184, date of filing Apr. 1, 2008.

[reference 15] G. Kweon and M. Laikin, "Wide-angle lenses", Korean patent 10-0826571, date of patent Apr. 24, 2008.

DISCLOSURE

Technical Problem

The purpose of the present invention is to provide image processing algorithms for extracting natural looking panoramic images from digitized images acquired using a camera equipped with a wide-angle lens that is rotationally symmetric about an optical axis and devices implementing such algorithms.

Technical Solution

The present invention provides image processing algorithms that are accurate in principle based on geometrical optics principle regarding image formation by wide-angle lenses with distortion and mathematical definitions of panoramic images.

Advantageous Effects

Panoramic images, which appear most natural to the naked eye, can be obtained by accurately image processing the images obtained using a rotationally symmetric wide-angle lens. Such panoramic imaging systems and devices can be used not only in security•surveillance applications for indoor and outdoor environments, but also in diverse areas such as video phone for apartment entrance door, rear view camera for vehicles, visual sensor for robots, and also it can be used to obtain panoramic photographs using a digital camera.

MODE FOR INVENTION

Hereinafter, referring to FIG. 12 through FIG. 64, the preferable embodiments of the present invention will be described in detail.

First Embodiment

Figure 12:
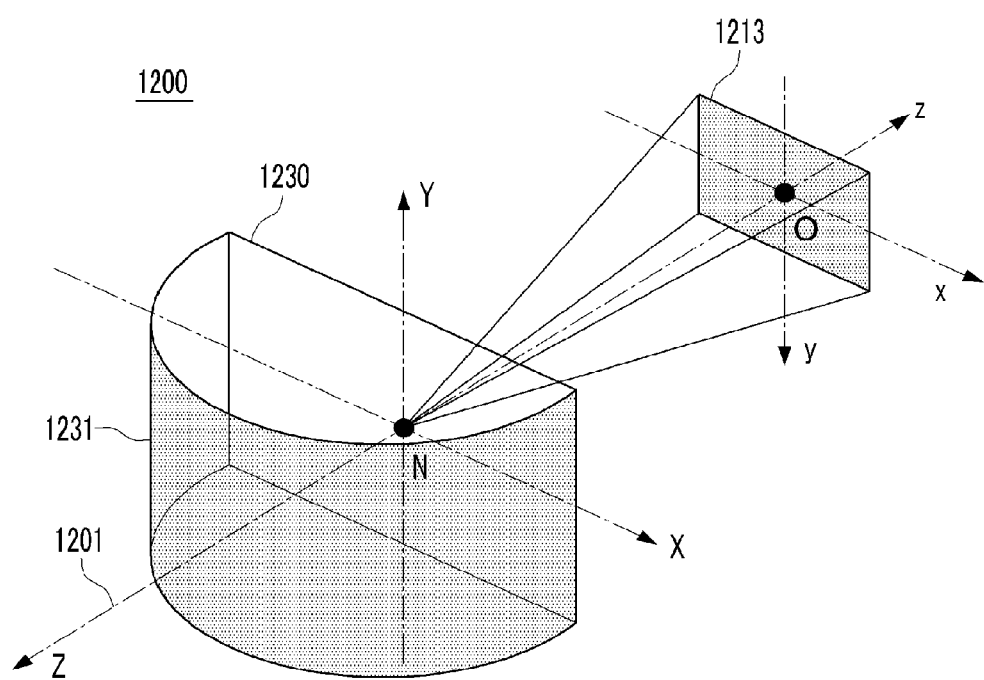
FIG. 12 is a conceptual drawing illustrating a projection scheme most appropriate for the panoramic imaging system of the first embodiment of the present invention.

FIG. 12 is a schematic diagram for understanding the field of view and the projection scheme of a panoramic imaging system according to the first embodiment of the present invention. The panoramic imaging system of the current embodiment is assumed as attached on a vertical wall (1230), which is perpendicular to the ground plane. The wall coincides with the X-Y plane, and the Y-axis runs from the ground plane (i.e., X-Z plane) to the zenith. The origin of the coordinate is located at the nodal point N of the lens, and the optical axis (1201) of the lens coincides with the Z-axis (in other words, it is parallel to the ground plane). Hereinafter, this coordinate system is referred to as the world coordinate system. The world coordinate system is a coordinate system for describing the environment around the camera that is captured by the lens, and it is a right-handed coordinate system.

In a rigorous sense, the direction of the optical axis is the direction of the negative Z-axis of the world coordinate system. This is because, by the notational convention of imaging optics, the direction from the object (or, an object point) to the image plane (or, an image point) is the positive direction. Despite this fact, we will describe the optical axis as coinciding with the Z-axis of the world coordinate system for the sake of simplicity in argument. This is because the current invention is not an invention about a lens design but an invention using a lens, and in the viewpoint of a lens user, it makes easier to understand by describing the optical axis as in the current embodiment of the present invention.

The image sensor plane (1213) is a plane having a rectangular shape and perpendicular to the optical axis, whereof the lateral dimension is B, and the longitudinal dimension is V. Here, we assume a first rectangular coordinate system, wherein the nodal point N of the lens is taken as the origin, and the optical axis (1201) is taken as the negative (−) z-axis. In other words, the direction of the z-axis is the exact opposite direction of the Z-axis. The intersection point between the z-axis and the image sensor plane (1213) is O. The x-axis of the first rectangular coordinate system passes through the intersection point O and is parallel to the lateral side of the image sensor plane, and the y-axis passes through the intersection point O and is parallel to the longitudinal side of the image sensor plane. Identical to the world coordinate system, this first rectangular coordinate system is a right-handed coordinate system.

In the current embodiment, the X-axis of the world coordinate system is parallel to the x-axis of the first rectangular coordinate system, and points in the same direction. On the other hand, the Y-axis of the world coordinate system is parallel to the y-axis of the first rectangular coordinate system, but the direction of the Y-axis is the exact opposite of the direction of the y-axis. Therefore, in FIG. 12, the positive direction of the x-axis of the first rectangular coordinate system runs from the left to the right, and the positive direction of the y-axis runs from the top to the bottom.

The intersection point O between the z-axis of the first rectangular coordinate system and the sensor plane (1213)—hereinafter referred to as the first intersection point—is not generally located at the center of the sensor plane, and it can even be located outside the sensor plane. Such a case can happen when the center of the image sensor is moved away from the center position of the lens—i.e., the optical axis—on purpose in order to obtain an asymmetric vertical or horizontal field of view.

The lateral coordinate x of an arbitrary point P—hereinafter referred to as the first point—on the sensor plane (1213) has a minimum value $x_1$ and a maximum value $x_2$(i.e., $x_1 \leq x \leq x_2$). By definition, the difference between the maximum lateral coordinate and the minimum lateral coordinate is the lateral dimension of the sensor plane (i.e., $x_2 - x_1 = B$). In the same manner, the longitudinal coordinate y of the first point P has a minimum value $y_1$ and a maximum value $y_2$(i.e., $y_1 \leq y \leq y_2$). By definition, the difference between the maximum longitudinal coordinate and the minimum longitudinal coordinate is the longitudinal dimension of the sensor plane (i.e., $y_2 - y_1 = V$).

Figure 3:
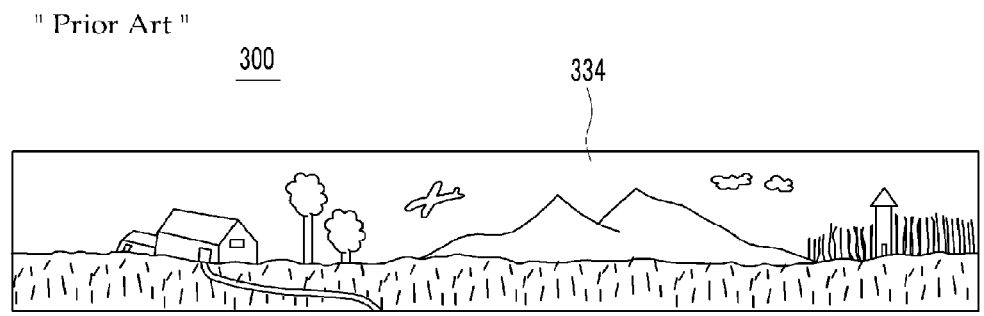
FIG. 3 is an unwrapped panoramic image corresponding to the raw panoramic image given in FIG. 2.
Figure 4:
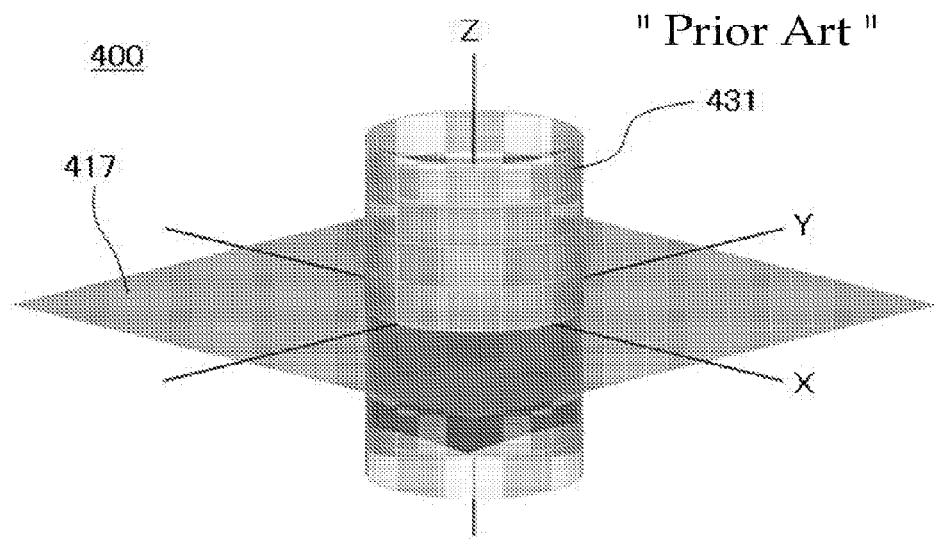
FIG. 4 is a conceptual drawing illustrating the shape of an object plane employed in a rectilinear panoramic imaging system.
Figure 5:
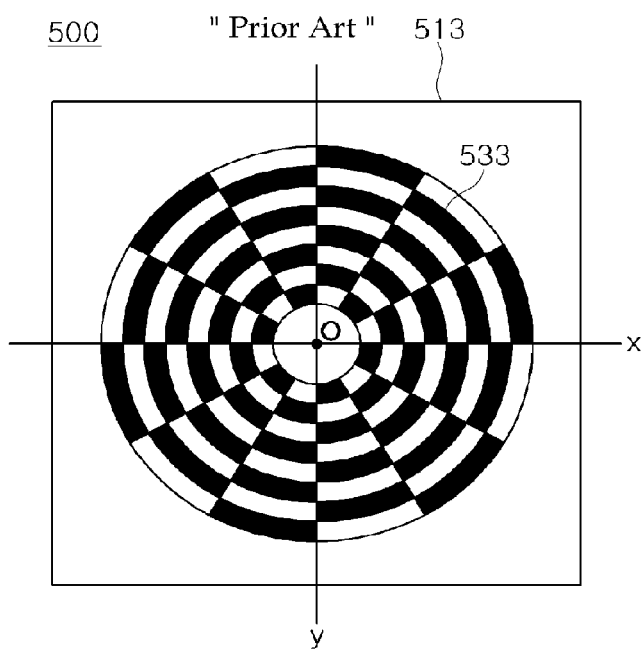
FIG. 5 is a conceptual drawing of a raw panoramic image corresponding to the object plane in FIG. 4.
Figure 6:
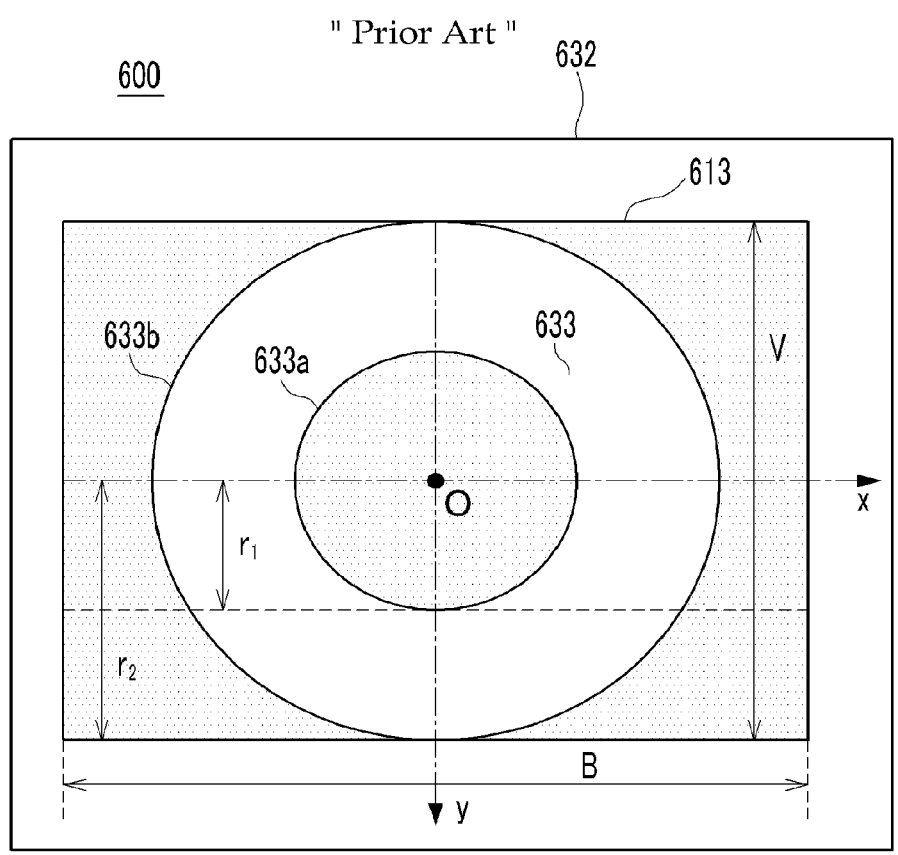
FIG. 6 is a schematic diagram illustrating the desirable location and the size of panoramic image on an image sensor plane.

However, it is not desirable to use a raw image acquired using a fisheye lens in order to obtain a horizontal field of view of 180°. This is because a natural-looking panoramic image cannot be obtained due to the previously mentioned barrel distortion. A panoramic lens assuming object planes schematically shown in FIG. 4 through FIG. 9 follows a rectilinear projection scheme in the vertical direction, and by the inherent structure of the lens, follows an equidistance projection scheme in the horizontal direction. Therefore, it is desirable that a panoramic imaging system of the current invention follows an equidistance projection scheme in the horizontal direction, and follows a rectilinear projection scheme in the vertical direction. Such a projection scheme corresponds to assuming a hemi-cylindrical object plane (1231) with a radius S and having the Y-axis as the rotational symmetry axis, and the image of an arbitrary point Q on the object plane (1231)—hereinafter referred to as an object point—appears as an image point on the said sensor plane (1213). According to a desirable projection scheme of the current invention, the image of an object on the hemi-cylindrical object plane (1231) is captured on the sensor plane (1213) with its vertical proportions preserved, and the lateral coordinate x of the image point is proportional to the horizontal arc length of the corresponding object point on the said object plane, and the image points on the image sensor plane by all the object points on the object plane (1231) collectively form a real image. When such a condition is satisfied, the image obtainable is, in effect, equivalent to selecting a portion of the image in FIG. 3 corresponding to a horizontal FOV of 180°.

Figure 13:
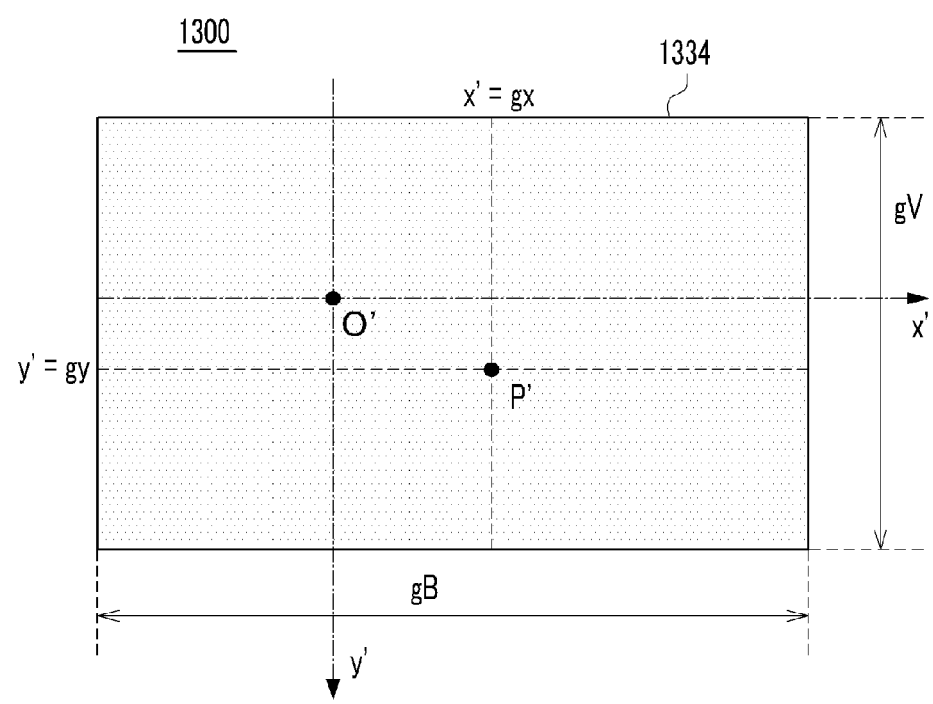
FIG. 13 is a conceptual drawing of an uncorrected image plane according to the first embodiment of the present invention.

An arbitrary rotationally symmetric lens including a fisheye lens, however, does not follow the said projection scheme. Therefore, to realize the said projection scheme, an image processing stage is inevitable. FIG. 13 is a conceptual drawing of an uncorrected image plane (1334) prior to the image processing stage, which corresponds to the image sensor plane (1213). If the lateral dimension of the image sensor plane (1213) is B and the longitudinal dimension is V, then the lateral dimension of the uncorrected image plane is gB and the longitudinal dimension is gV, where g is proportionality constant.

Uncorrected image plane (1334) can be considered as the image displayed on the image display means without rectification of distortion, and is a magnified image of the real image on the image sensor plane by a magnification ratio g. For example, the image sensor plane of a ⅓-inch CCD sensor has a rectangular shape having a lateral dimension of 4.8 mm, and a longitudinal dimension of 3.6 mm. On the other hand, if the size of a monitor is 48 cm wide and 36 cm high, then the magnification ratio g is 100. More desirably, the side dimension of a pixel in a digital image is considered as 1. A VGA-grade ⅓-inch CCD sensor has pixels in a two-dimensional array having 640 columns and 480 lows. Therefore, each pixel has a right rectangular shape with both the width and the height measuring as 4.8 mm/640=7.5 μm, and in this case, the magnification ratio g is given by 1 pixel/7.5 μm=133.3 pixel/mm. In recapitulation, the uncorrected image plane (1334) is a distorted digital image obtained by converting the real image formed on the image sensor plane into electrical signals.

The said first intersection point O is the intersection point between the optical axis (1201) and the image sensor plane (1213). Therefore, a ray entered along the optical axis forms an image point on the said first intersection point O. By definition, the horizontal incidence angle Ψ and the vertical incidence angle δ of a ray entered along the optical axis are both zero. Therefore, the point O' on the uncorrected image plane corresponding to the first intersection point O in the image sensor plane—hereinafter referred to as the second intersection point—corresponds to the image point by an incident ray having a horizontal incidence angle of 0 as well as a vertical incidence angle of 0.

A second rectangular coordinate systems is assumed wherein x'-axis is taken as the axis that passes through the said second intersection point and is parallel to the lateral side of the uncorrected image plane (1334), and y'-axis is taken as the axis that passes through the said second intersection point and is parallel to the longitudinal side of the uncorrected image plane. In FIG. 13, the positive direction of the x'-axis runs from the left to the right, and the positive direction of the y'-axis runs from the top to the bottom. Then, the lateral coordinate x' of an arbitrary point P' on the uncorrected image plane (1334) has a minimum value $x'_1 = gx_1$ and a maximum value $x'_2 = gx_2$(i.e., $gx_1 \leq x' \leq gx_2$). In the same manner, the longitudinal coordinate y' of the said point has a minimum value $y'_1 = gy_1$ and a maximum value $y'_2 = gy_2$ (i.e., $gy_1 \leq y' \leq gy_2$).

Figure 14:
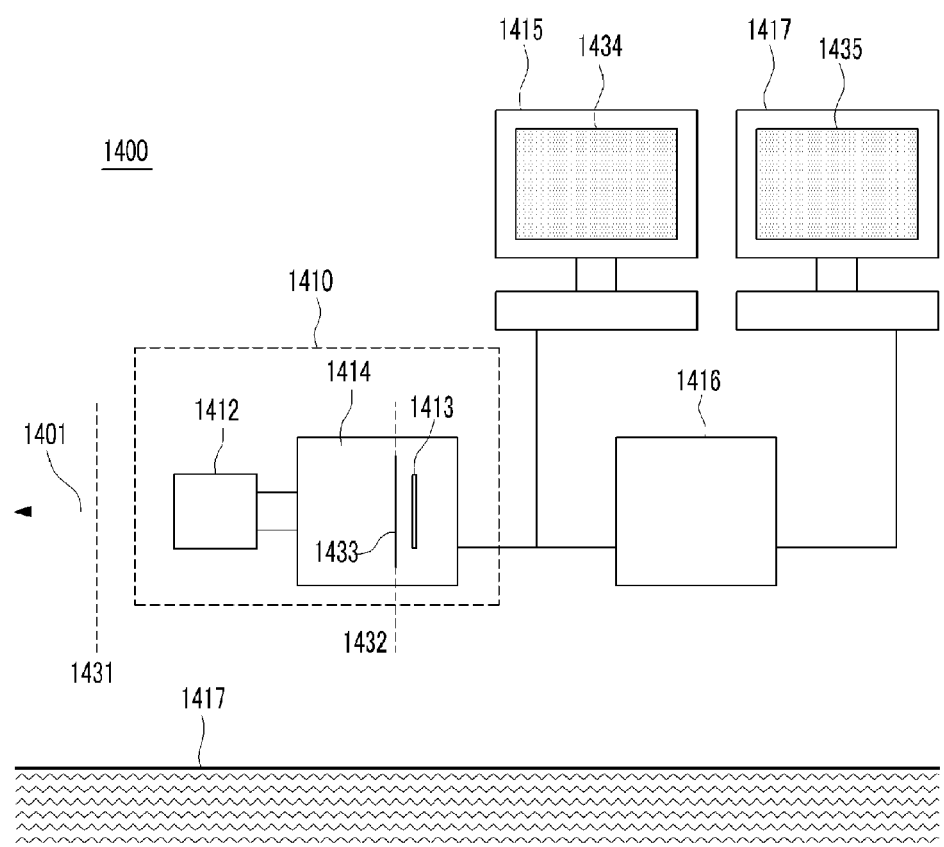
FIG. 14 is a schematic diagram of a panoramic imaging system according to the first embodiment of the present invention.

As has been described, a fisheye lens does not provide a natural-looking panoramic image as is schematically shown in FIG. 12. The main point of the current embodiment is about a method of obtaining a most natural-looking panoramic image as is schematically shown in FIG. 12 by applying a mathematically accurate image processing algorithm on a distorted image obtained using a rotationally symmetric wide-angle lens, which includes a fisheye lens. FIG. 14 is a schematic diagram of a device using the image processing methods of the current embodiments of the present invention, wherein the device has an imaging system which mainly includes an image acquisition means (1410), an image processing means (1416) and image display means (1415, 1417). The image acquisition means (1410) includes a rotationally symmetric wide-angle lens (1412) and a camera body (1414) having an image sensor (1413) inside. The said wide-angle lens can be a fisheye lens with more than 180° FOV and having an equidistance projection scheme, but it is by no means limited to such a fisheye lens. Hereinafter, for the sake of simplicity in argument, a wide-angle lens is referred to as a fisheye lens. Said camera body is either a digital camera or a video camera that can produce movie files, and contains an image sensor such as CCD or CMOS sensor. In this embodiment, the optical axis (1401) of the said fisheye lens is parallel to the ground plane (1417). In other embodiments, the optical axis can be perpendicular to the ground plane, or it can be inclined at an arbitrary angle. By the said fisheye lens (1412), a real image (1433: marked as a solid line in the figure) of the object plane (1431) is formed on the focal plane (1432: marked as a dotted line). In order to obtain a sharp image, the image sensor plane (1413) must coincide with the focal plane (1432).

The real image (1433) of the objects on the object plane (1431) formed by the fisheye lens (1412) is converted by the image sensor (1413) into electrical signals, and displayed as an uncorrected image plane (1434) on the image display means (1415), wherein this uncorrected image plane contains a distortion aberration. If the said lens is a fisheye lens, then the distortion will be mainly a barrel distortion. This distorted image can be rectified by the image processing means (1416), and then displayed as a processed image plane (1435) on an image display means (1417) such as a computer monitor or a CCTV monitor. Said image processing can be a software image processing by a computer, or a hardware image processing by an FPGA (Field Programmable Gate Array). The following table 1 summarizes corresponding variables in the object plane, the image sensor plane, the uncorrected image plane, and the processed image plane.

TABLE 1

| surface | object plane | image sensor plane | uncorrected image plane | processed image plane |
|---|---|---|---|---|
| lateral dimension of the plane | L | B | gB | W |
| longitudinal dimension of the plane | T | V | gV | H |
| coordinate system | world coordinate system | the first rectangular coordinate | the second rectangular coordinate | the third rectangular coordinate system |
| location of the coordinate origin | nodal point of the lens | nodal point of the lens | nodal point of the lens | nodal point of the lens |
| symbol of the intersection point with coordinate axes | | O | O' | O" |
| name of the object | (X, Y, Z) object point | (x, y, z) the first point | (x', y', z') the second point | (x", y", z") the third point |
| symbol of the object | Q | P | P' | P" |
| two-dimensional coordinate of the object point or the image point | | (x, y) | (x', y') | (x", y") |

Figure 15:
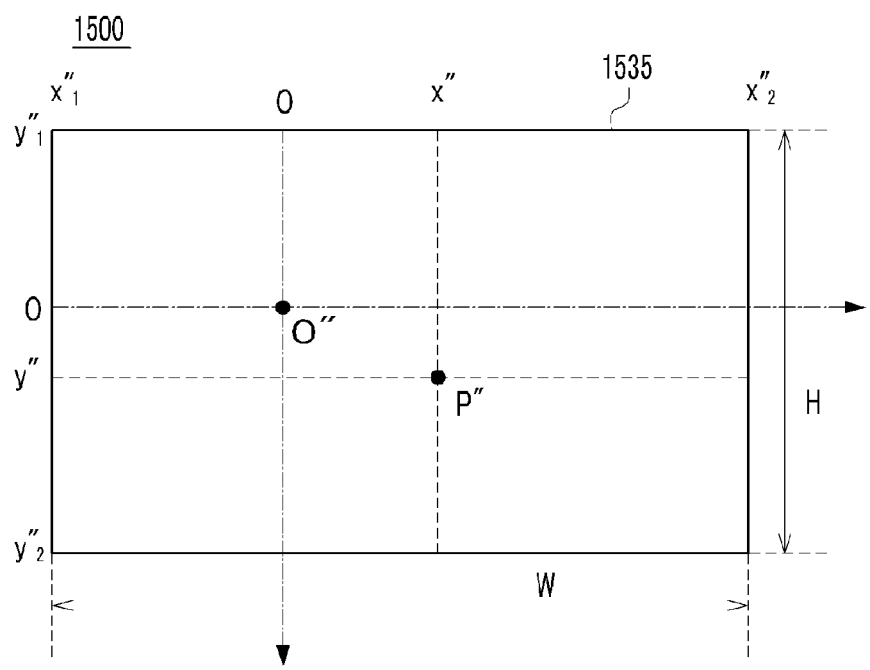
FIG. 15 is a conceptual drawing of a processed image plane that is displayed on an image displays means according to the first embodiment of the present invention.

FIG. 15 is a conceptual drawing of a rectified screen of the current invention, wherein the distortion has been removed. In other words, it is a conceptual drawing of a processed image plane (1535). The processed image plane (1535) has a rectangular shape, whereof the lateral side measures as W and the longitudinal side measures as H. Furthermore, a third rectangular coordinate system is assumed wherein x"-axis is parallel to the lateral side of the processed image plane, and y"-axis is parallel to the longitudinal side of the processed image plane. The z"-axis of the third rectangular coordinate system is parallel to the z-axis of the first rectangular coordinate system and the z'-axis of the second rectangular coordinate system. The intersection point O" between the said z"-axis and the processed image plane can take an arbitrary position, and it can even be located outside the processed image plane. In FIG. 15, the positive direction of the x"-axis runs from the left to the right, and the positive direction of the y"-axis runs from the top to the bottom. Here, the lateral coordinate x" of a third point P" on the processed image plane (1535) has a minimum value $x"_1$ and a maximum value $x"_2$ (i.e., $x"_1 \leq x" \leq x"_2$). By definition, the difference between the maximum lateral coordinate and the minimum lateral coordinate is the lateral dimension of the processed image plane (i.e., $x"_2 - x"_1 = W$). In the same manner, the longitudinal coordinate y" of the third point P" has a minimum value $y"_1$ and a maximum value $y"_2$ (i.e., $y"_1 \leq y" \leq y"_2$). By definition, the difference between the maximum longitudinal coordinate and the minimum longitudinal coordinate is the longitudinal dimension of the processed image plane (i.e., $y"_2 - y"_1 = H$).

Figure 16:
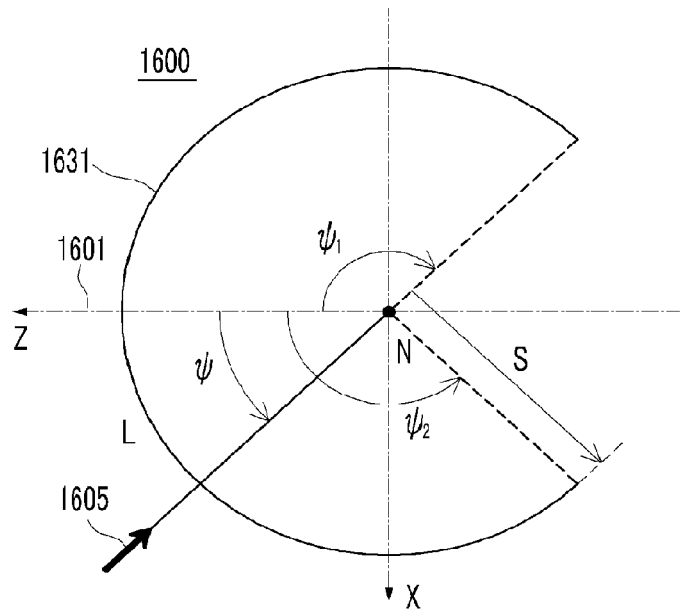
FIG. 16 is a conceptual drawing of a horizontal cross-section of an object plane according to the first embodiment of the present invention.

FIG. 16 shows the cross-section of the object plane in FIG. 12 in the X-Z plane. The horizontal FOV of the imaging system of the present invention is not necessarily 180°, and it can be smaller or larger than that. In this reason, illustrated in FIG. 16 is a case where the FOV is larger than 180°. The horizontal angle of incidence of an arbitrary incident ray (1605) impinging on the imaging system of the present invention, which is the angle subtended by the incident ray and the Y-Z plane, is Ψ. In other words, it is the incidence angle in the lateral direction with respect to the Z-axis (i.e., the optical axis) in the X-Z plane (i.e., the ground plane). Conventionally, an incident ray forming a sharp image on the focal plane by the imaging properties of a lens is assumed as to pass through the nodal point N of the lens.

Figure 17:
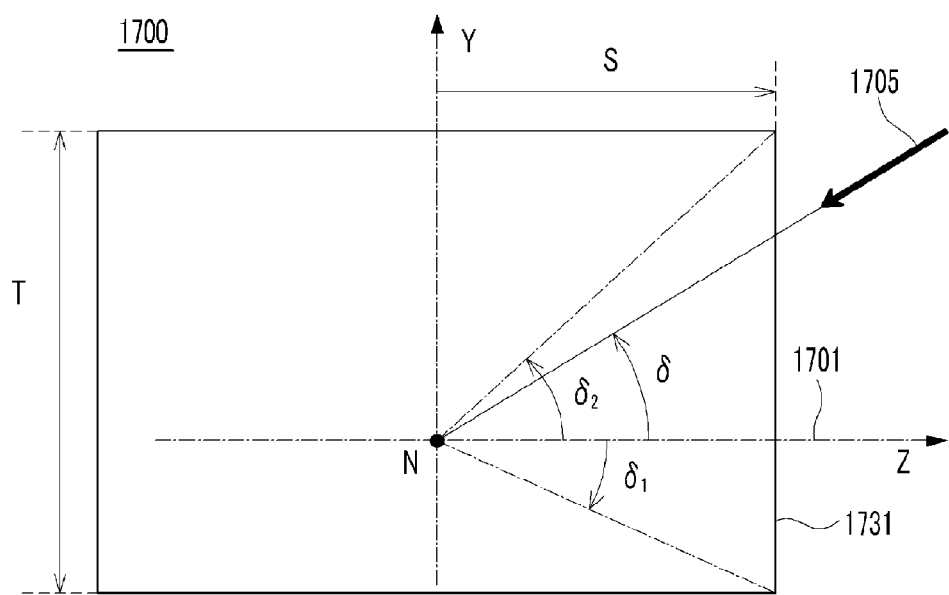
FIG. 17 is a conceptual drawing of a vertical cross-section of an object plane according to the first embodiment of the present invention.

The minimum value of the horizontal incidence angle is $\Psi_1$, the maximum incidence angle is $\Psi_2$ (i.e., $\Psi_1 \leq \Psi \leq \Psi_2$), and the horizontal FOV is $\Delta\Psi = \Psi_2 - \Psi_1$. In general, if the horizontal FOV is 180°, then a desirable range of the horizontal incidence angle will be given by $\Psi_2 = -\Psi_1 = 90°$. Since the radius of the object plane is S, the arc length of the said object plane is given by Eq. 17.

$$L = S(\Psi_2 - \Psi_1) = S\Delta\Psi \qquad \text{[Math Figure 17]}$$

Figure 18:
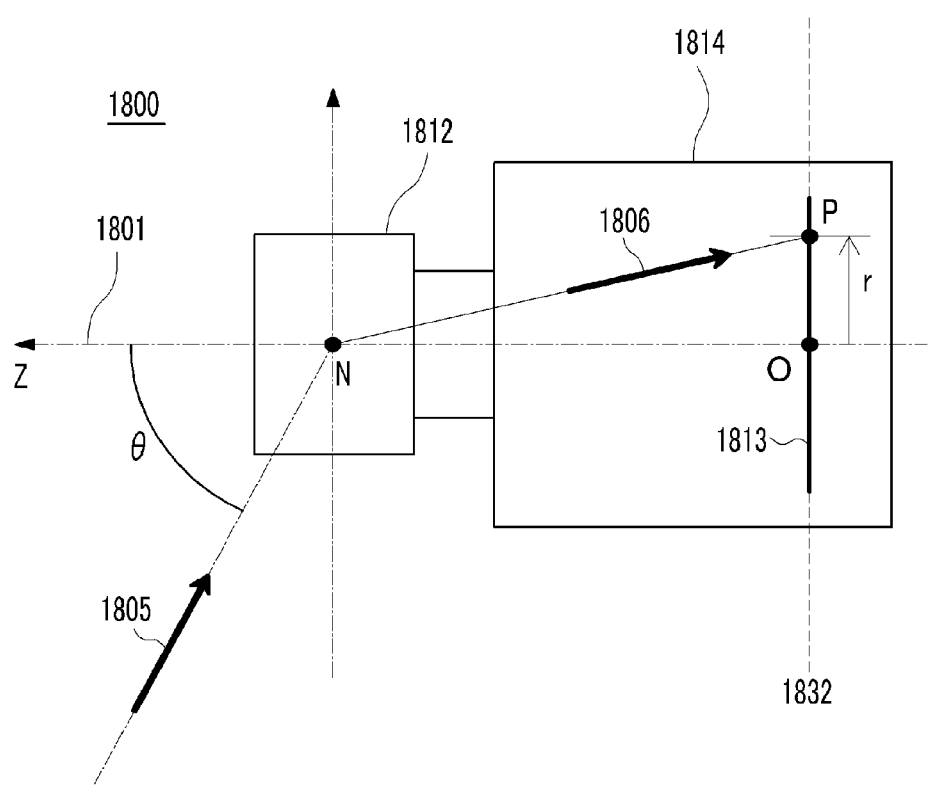
FIG. 18 is a conceptual drawing illustrating a real projection scheme of a general rotationally symmetric lens.

Here, it has been assumed that the unit of the field of view $\Delta\Psi$ is radian. This arc length L must be proportional to the lateral dimension W of the processed image plane. Therefore, if this proportionality constant is c, then the following equation 18 is satisfied.

$$L = cW \qquad \text{[Math Figure 18]}$$

Figure 19:
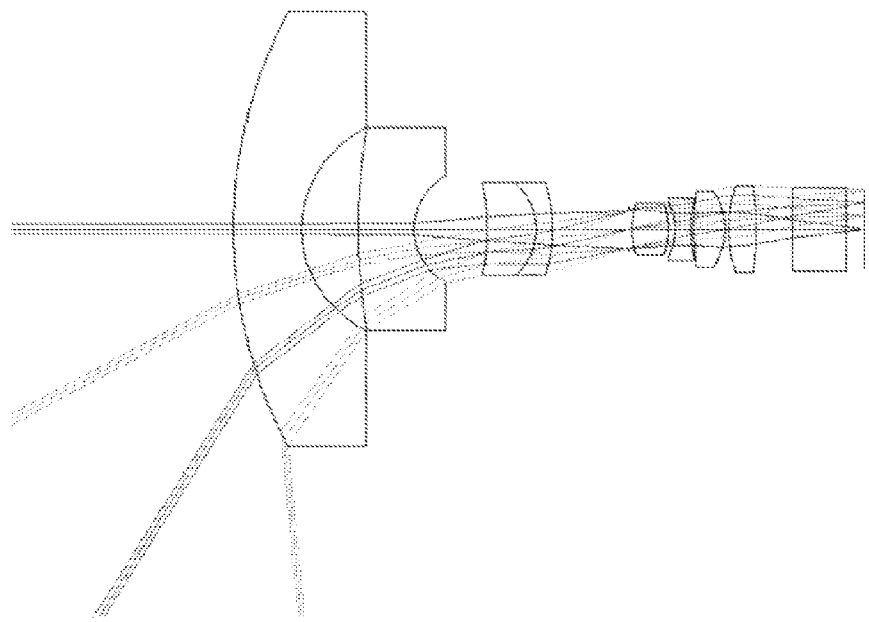
FIG. 19 is a diagram showing the optical structure of a fisheye lens with an equidistance projection scheme along with the traces of rays.

On the other hand, FIG. 17 shows the cross-section of the object plane in FIG. 12 in the Y-Z plane. The radius of the said object plane (1731) is S, and the height of the object plane is T. The vertical incidence angle of an incident ray (1705) entering into a lens of the present invention, which is the angle with respect to the Z-axis (i.e., the optical axis) in the Y-Z plane (i.e., a plane containing a vertical line), is δ. In other words, the vertical incidence angle the said incident ray (1705) makes with the X-Z plane is δ. The minimum value of this vertical incidence angle is $\delta_1$, and the maximum value is $\delta_2$ (i.e., $\delta_1 \leq \delta \leq \delta_2$). When the vertical FOV is $\Delta\delta = \delta_2 - \delta_1$, it is simpler if the range of the vertical incidence angle is given as $\delta_2 = -\delta_1 = \Delta\delta/2$, but according to the needs, it may be desirable if the two values are different. For example, if it is installed on the roof of a vehicle, then it is desirable to mainly monitor the area above the horizon, but if it is installed on an airplane, it is desirable to mainly monitor the area below the horizon. Here, the height T of the object plane seen from the origin N of the said coordinate system is given by Eq. 19.

$$T = S(\tan \delta_2 - \tan \delta_1) \qquad \text{[Math Figure 19]}$$

Figure 20:
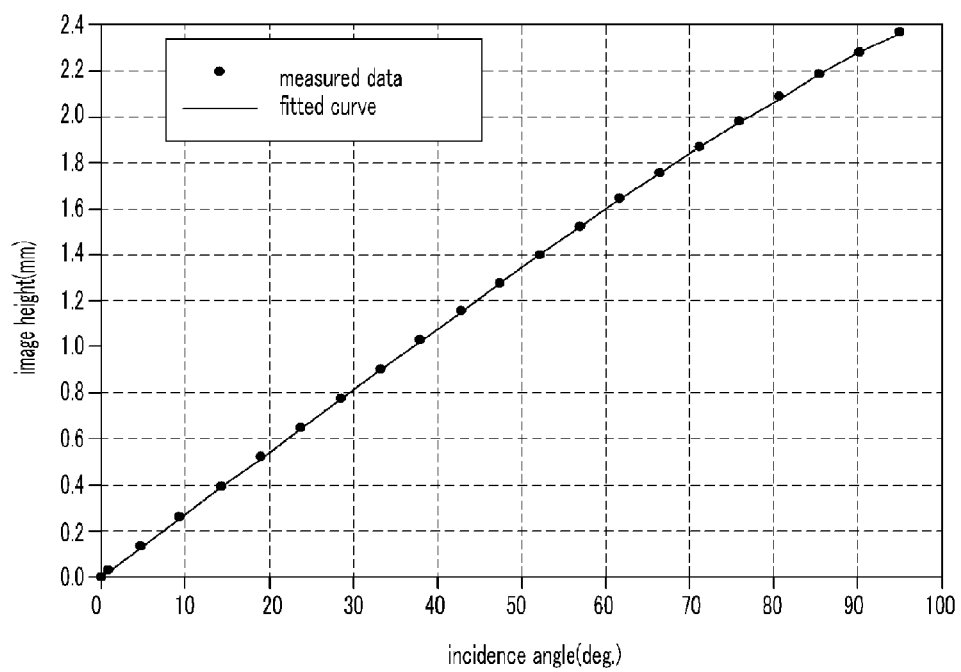
FIG. 20 is a graph showing the real projection scheme of the fisheye lens in FIG. 19.

Furthermore, the height T of the object plane must satisfy the same proportionality relation with the height H of the processed image plane.

$$T = cH$$ [Math Figure 20]

Figure 21:
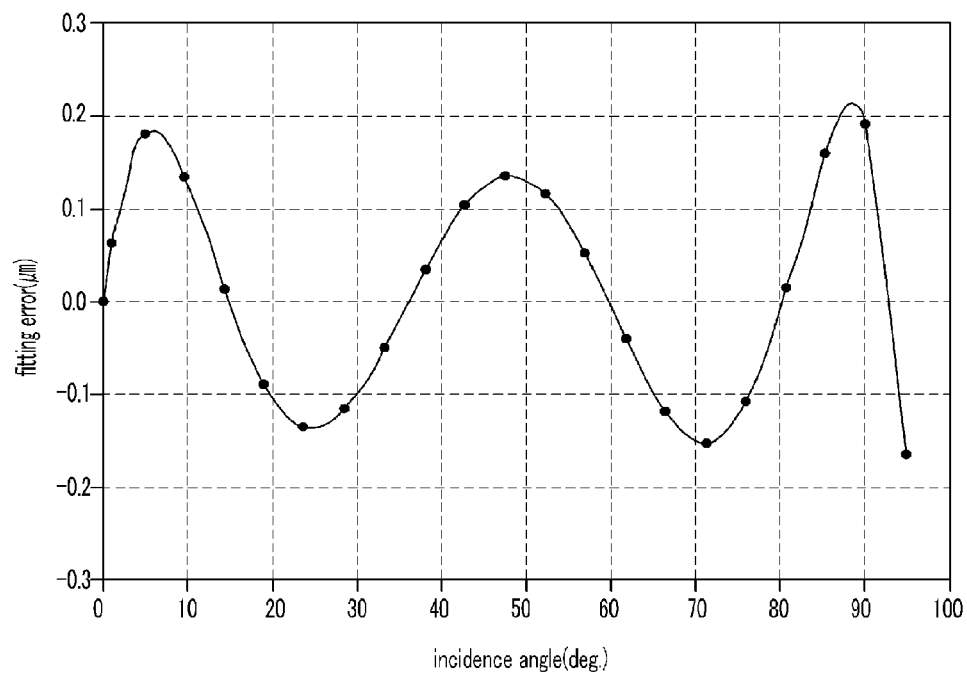
FIG. 21 is a graph showing the difference between the real projection scheme of the fisheye lens in FIG. 19 and a fitted projection scheme using the least square error method.

Equation 21 can be obtained from Eqs. 17 and 18, wherein A is a constant.

$$A \equiv \frac{S}{c} = \frac{W}{\Delta\psi}$$ [Math Figure 21]

Figure 22:
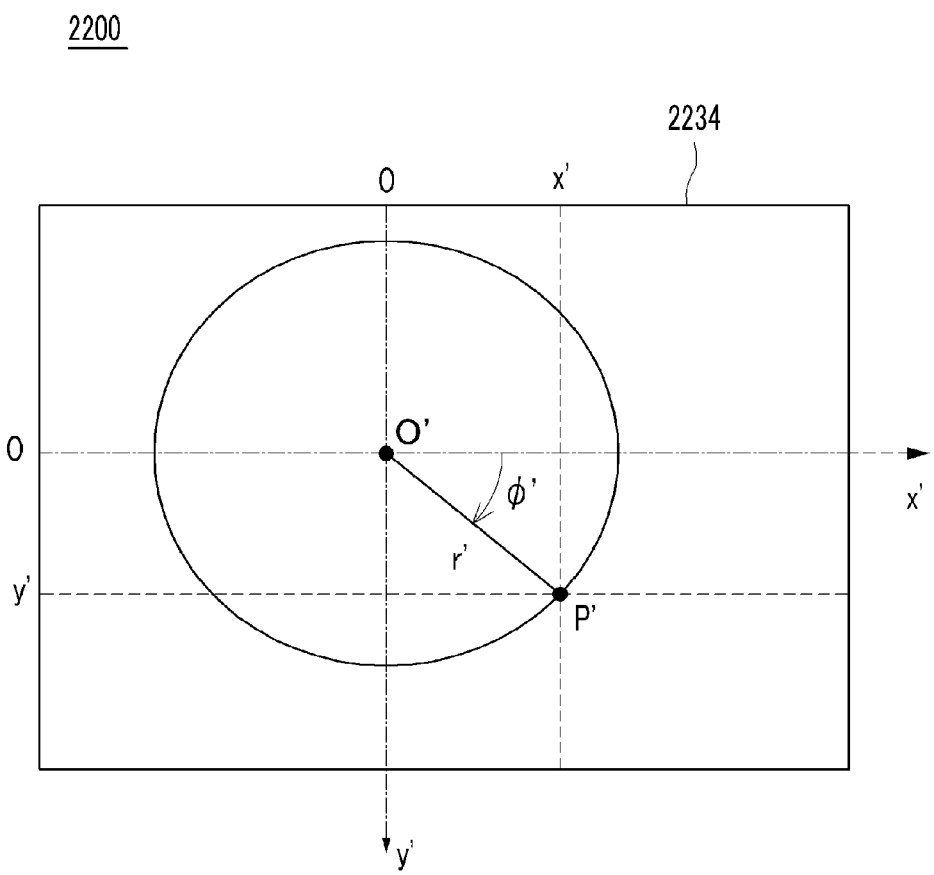
FIG. 22 is a conceptual drawing illustrating the conversion relation between the rectangular coordinate and the polar coordinate of an object point on an uncorrected image plane.

On the other hand, Eq. 22 can be obtained from Eqs. 19 and 20.

$$A = \frac{H}{\tan\delta_2 - \tan\delta_1}$$ [Math Figure 22]

Figure 23:
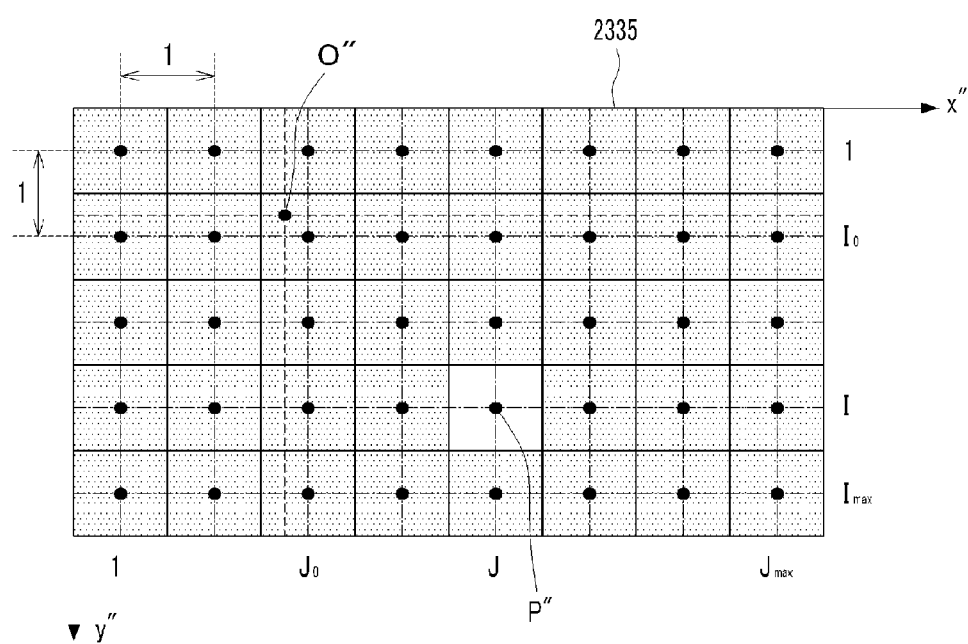
FIG. 23 is a conceptual drawing of a digitized processed image plane.

Therefore, from Eqs. 21 and 22, it can be seen that the following equation must be satisfied.

$$\frac{W}{H} = \frac{\Delta\psi}{\tan\delta_2 - \tan\delta_1}$$ [Math Figure 23]

Figure 24:
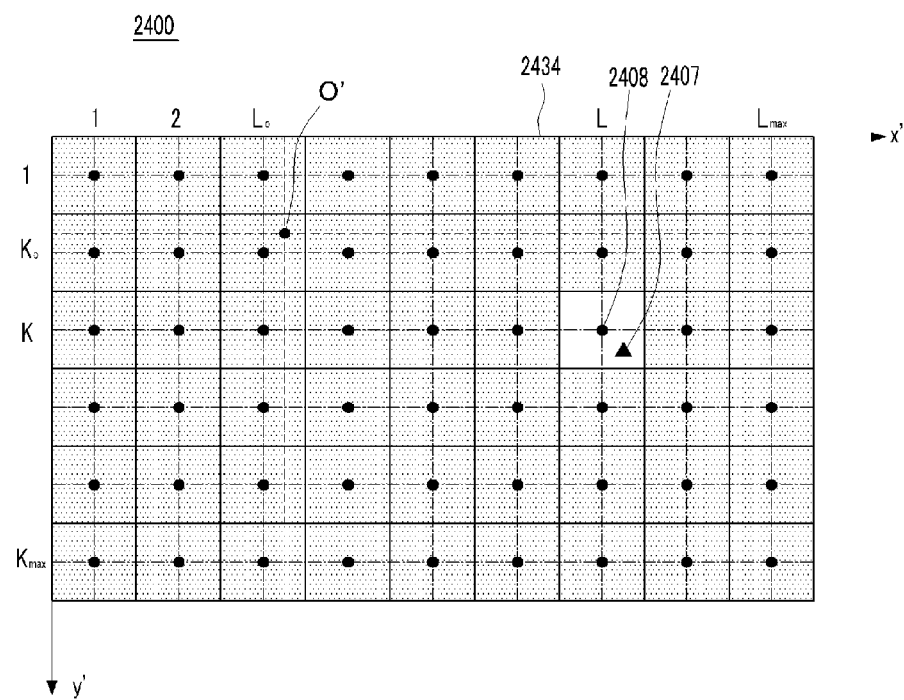
FIG. 24 is a conceptual drawing of a digitized uncorrected image plane for understanding the principle of distortion correction.

In most of the cases, it will be desirable if the range of the horizontal incidence angle and the range of the vertical incidence angle are symmetrical. Therefore, the horizontal FOV will be given as $\Delta\Psi = \Psi_2 - \Psi_1 = 2\Psi_2$, and the vertical FOV will be given as $\Delta\delta = \delta_2 - \delta_1 = 2\delta_2$. When designing a lens or evaluating the characteristics of a lens, the horizontal FOV $\Delta\Psi$ and the vertical FOV $\Delta\delta$ are important barometers. From Eq. 23, it can be seen that the vertical FOV must be given as in Eq. 24 as a function of the horizontal FOV.

$$\Delta\delta = 2\tan^{-1}\left(\frac{H}{2W}\Delta\psi\right).$$ [Math Figure 24]

Figure 25:
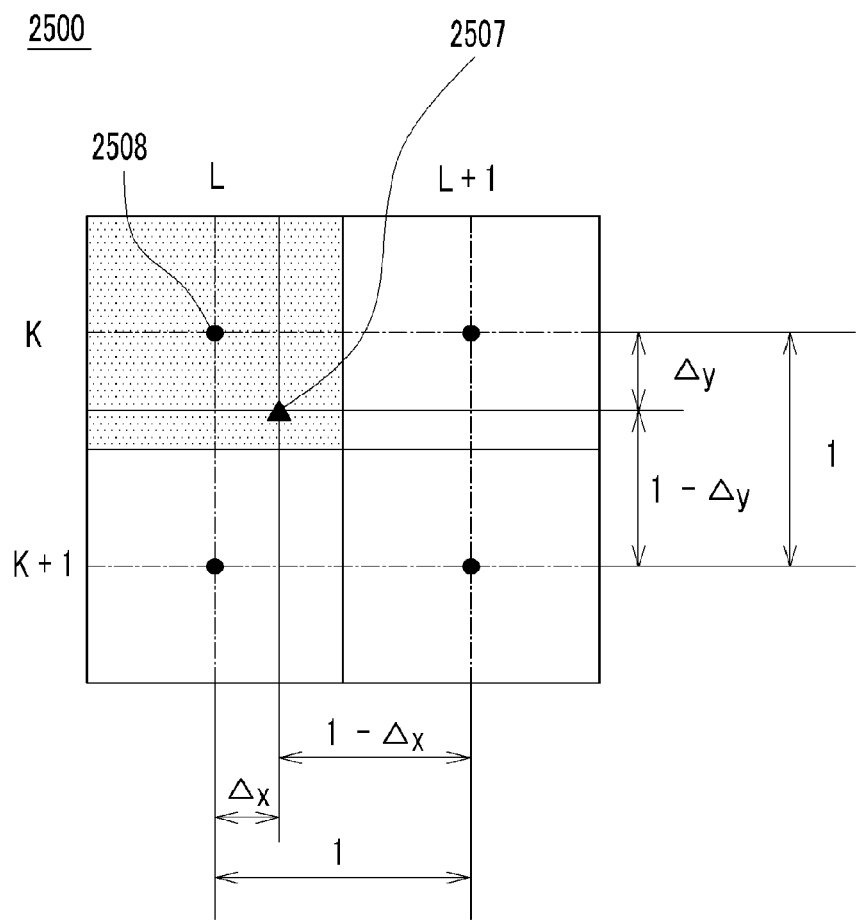
FIG. 25 is a conceptual drawing for understanding the principle of bilinear interpolation.

For example, if we assume that the horizontal FOV of the imaging system is 180°, and an ordinary image sensor plane having the 4:3 aspect ratio between the lateral dimension and the longitudinal dimension is employed, then the vertical FOV of a natural panoramic image is given by Eq. 25.

$$\Delta\delta = 2\tan^{-1}\left(\frac{3}{8}\pi\right) = 99.35°$$ [Math Figure 25]

Figure 26:
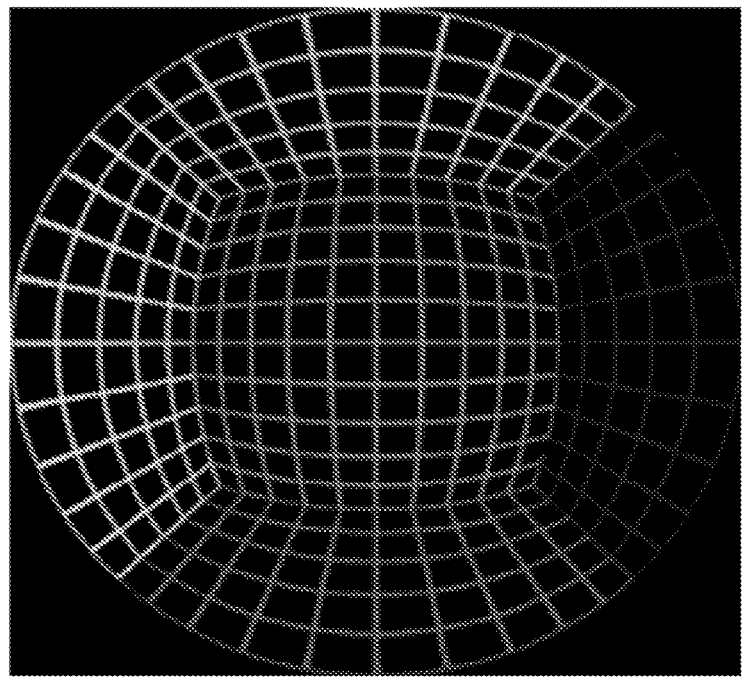
FIG. 26 is an exemplary fisheye image produced by a computer assuming that a fisheye lens with an equidistance projection scheme has been used to take the picture of an imaginary scene.

On the other hand, if we assume an image sensor having the 16:9 ratio, then the vertical FOV is given by Eq. 26.

$$\Delta\delta = 2\tan^{-1}\left(\frac{9}{32}\pi\right) = 82.93°$$ [Math Figure 26]

Therefore, even if an image sensor having the 16:9 ratio is used, the vertical FOV corresponds to an ultra wide-angle.

Figure 27:
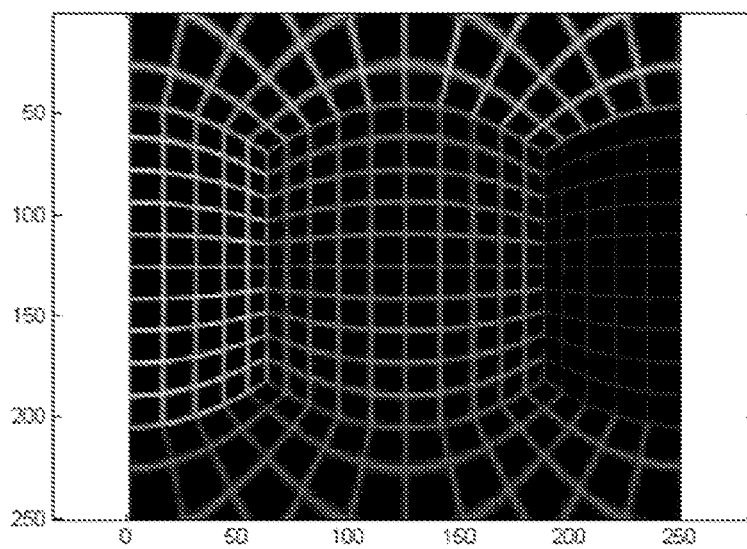
FIG. 27 is a panoramic image following a cylindrical projection scheme extracted from the fisheye image given in FIG. 26.

More generally, when the procedure from Eq. 17 through Eq. 23 is repeated on an interval containing the third intersection point O'', then Eq. 27 can be obtained.

$$A = \frac{H}{\tan\delta_2 - \tan\delta_1} = \frac{y''}{\tan\delta} = \frac{y_2''}{\tan\delta_2} = \frac{y_1''}{\tan\delta_1} = \frac{W}{\Delta\psi} = \frac{x''}{\psi} = \frac{x_1''}{\psi_1} = \frac{x_2''}{\psi_2}$$ [Math Figure 27]

Therefore, when setting-up the desirable size of the processed image plane and the FOV, it must be ensured that Eq. 27 is satisfied.

Figure 28:
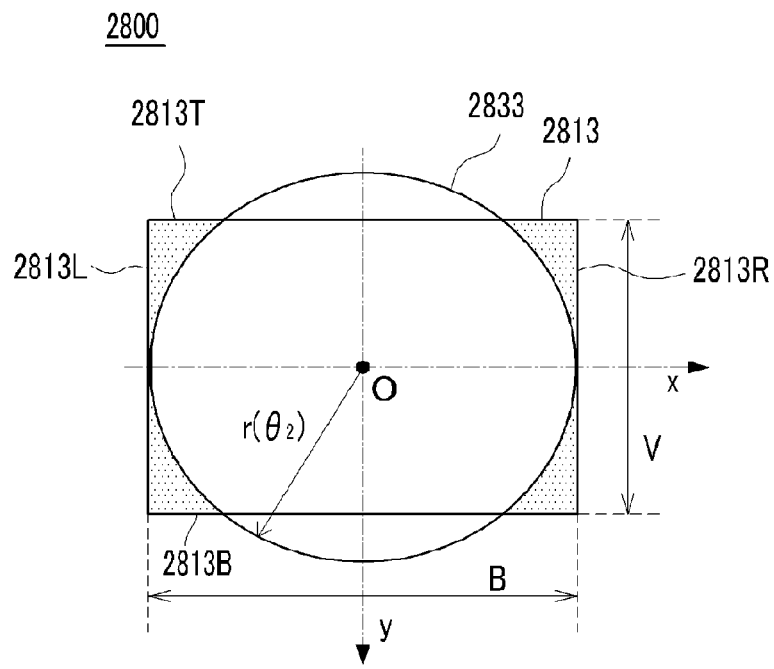
FIG. 28 is a schematic diagram showing the desirable size and the location of real image on an image sensor plane.

If the processed image plane in FIG. 15 satisfies the said projection scheme, then the horizontal incidence angle of an incident ray corresponding to the lateral coordinate x'' of a third point P''' on the said processed image plane is given by Eq. 28.

$$\psi = \frac{\Delta\psi}{W}x'' = \frac{x''}{A}.$$ [Math Figure 28]

Figure 29:
FIG. 29 is an exemplary image acquired using a fisheye lens.

Likewise, the vertical incidence angle of an incident ray corresponding to the third point having a longitudinal coordinate y'' is, from Eq. 27, given as Eq. 29.

$$\delta = \tan^{-1}\left(\frac{y''}{A}\right)$$ [Math Figure 29]

Therefore, the signal value of a third point on the processed image plane having an ideal projection scheme must be given as the signal value of an image point on the image sensor plane formed by an incident ray originating from an object point on the object plane having a horizontal incidence angle (i.e., the longitude) given by Eq. 28 and a vertical incidence angle (i.e., the latitude) given by Eq. 29.

Figure 7:
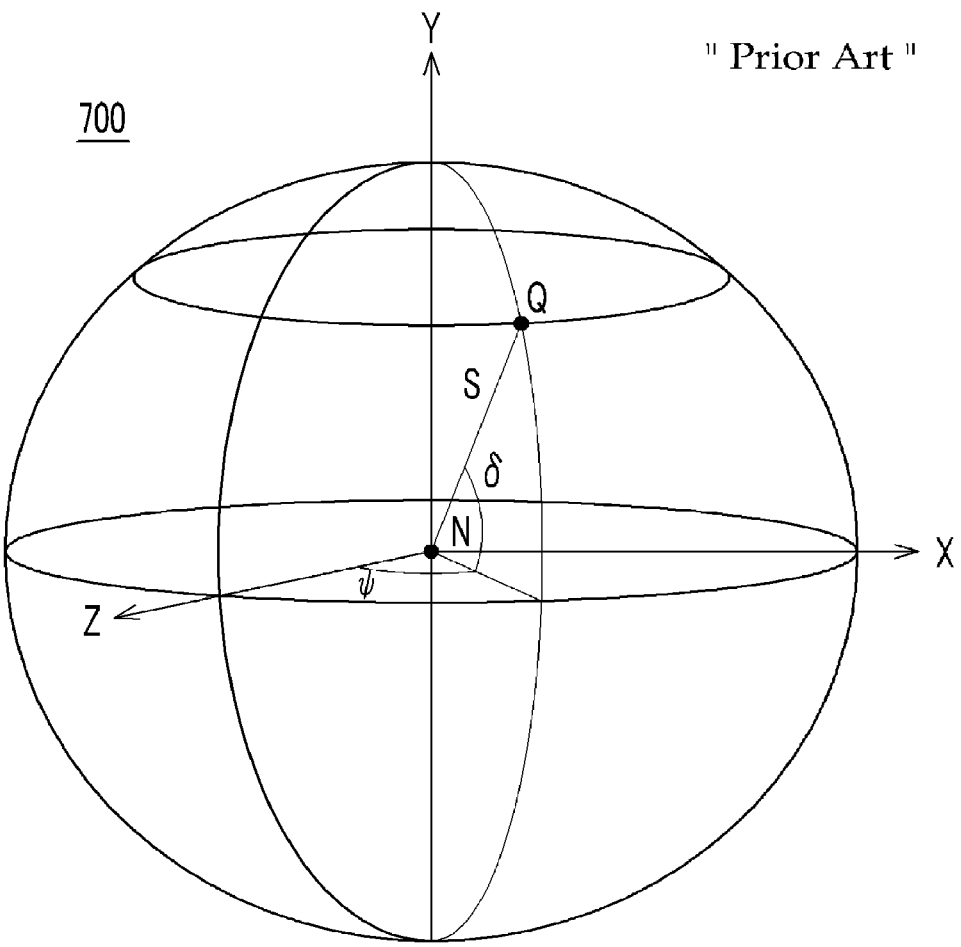
FIG. 7 is a conceptual drawing of the latitude and the longitude on a celestial sphere.
Figure 8:
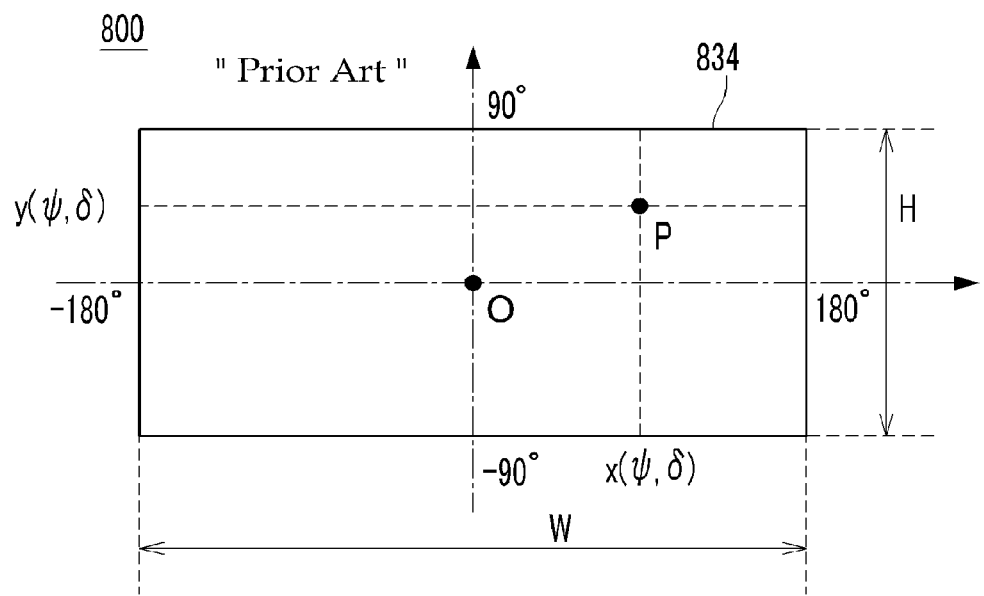
FIG. 8 is a conceptual drawing of a map with the equi-rectangular projection scheme.
Figure 9:
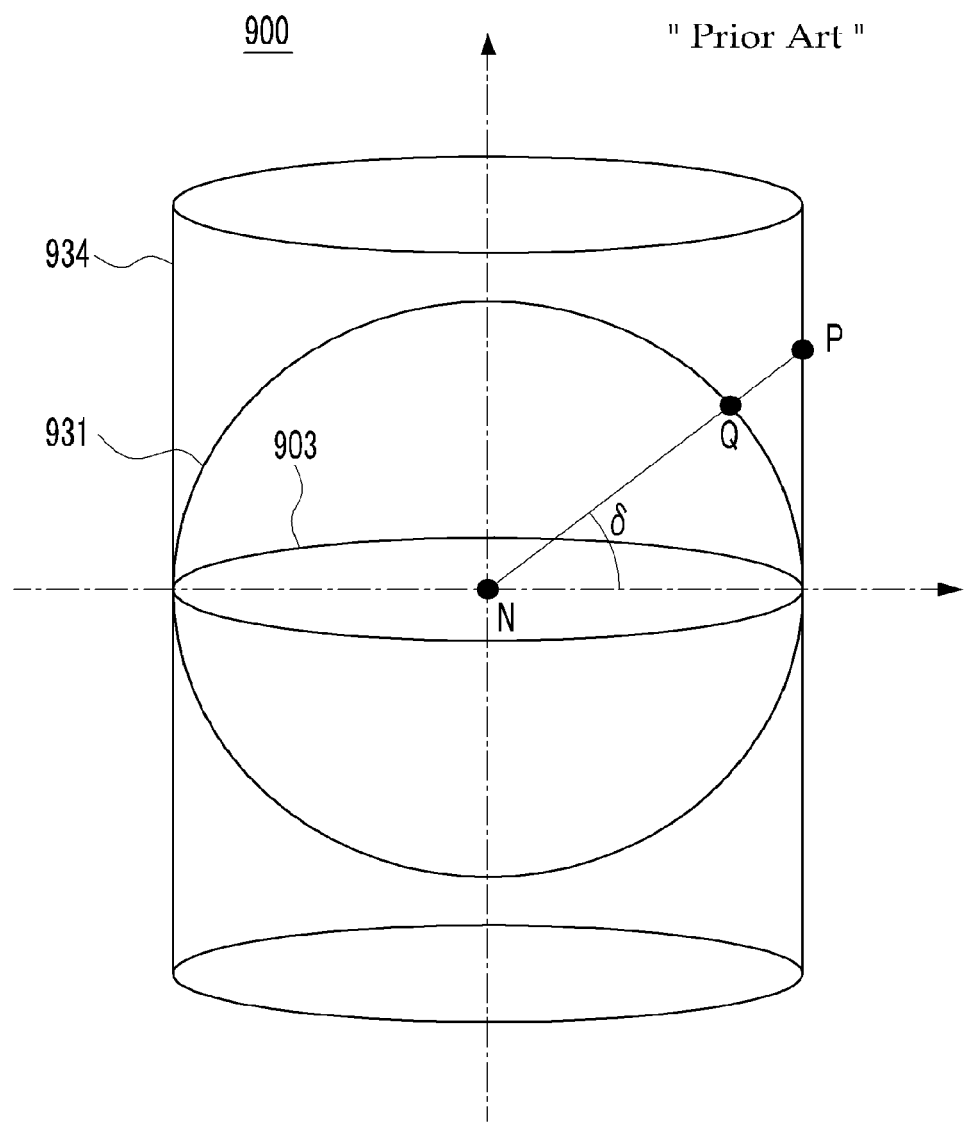
FIG. 9 is a conceptual drawing illustrating a cylindrical projection scheme.
Figure 10:
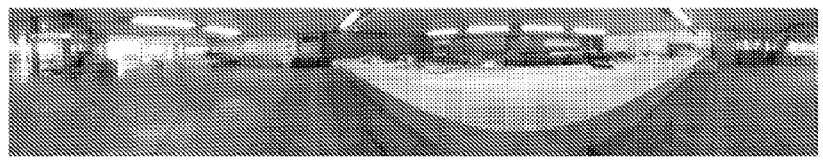
FIG. 10 is an exemplary unwrapped panoramic image following a cylindrical projection scheme.
Figure 11:
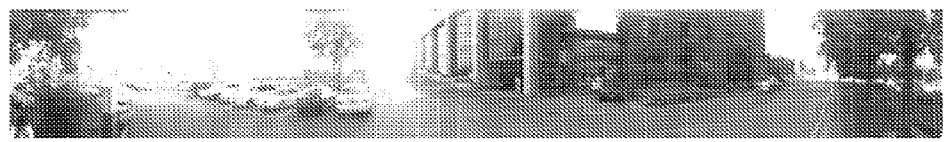
FIG. 11 is another exemplary unwrapped panoramic image following a cylindrical projection scheme.
Figure 30:
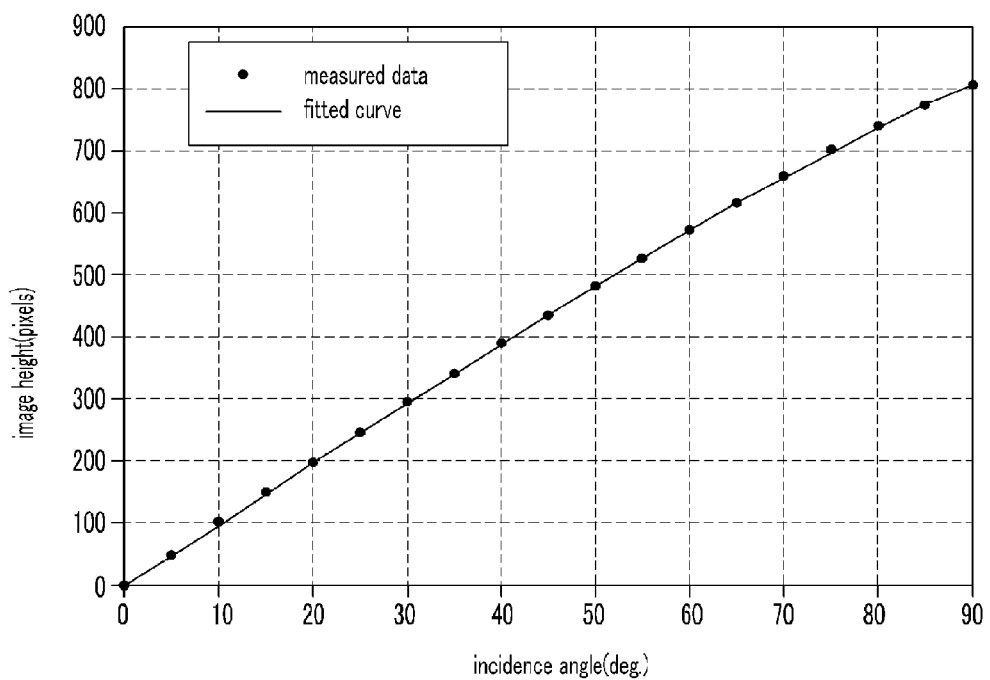
FIG. 30 is a graph showing the real projection scheme of the fisheye lens used to acquire the fisheye image given in FIG. 29.

The location of the object point Q on the object plane having said horizontal and vertical incidence angles can be obtained by the following method. Referring to FIG. 7, a vector from the origin N of the world coordinate system to an object point Q on the object plane having said horizontal and vertical incidence angles can be written as $\vec{R}$. The direction of this vector is the exact opposite of the propagation direction of the incident ray (1605, 1705), and the said vector in the world coordinate system can be written as Eq. 30.

$$\vec{R} = X\hat{X} + Y\hat{Y} + Z\hat{Z}$$ [Math Figure 30]

Figure 31:
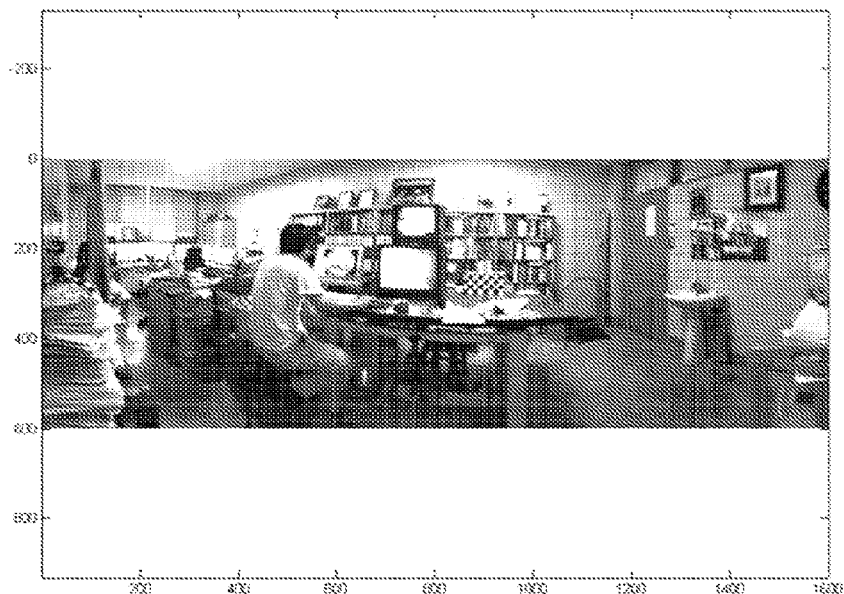
FIG. 31 is a panoramic image following a cylindrical projection scheme extracted from the fisheye image given in FIG. 29.

In Eq. 30, $\hat{X} = (1,0,0)$ is the unit vector along the X-axis, and likewise, $\hat{Y} = (0,1,0)$ and $\hat{Z} = (0,0,1)$ are the unit vectors along the Y-axis and the Z-axis, respectively. On the other hand, the said vector $\vec{R}$ can be given in the spherical polar coordinate system as a function of the zenith angle θ and the azimuth angle φ as given in Eq. 31.

$$\vec{R} = R\hat{R}(\theta, \phi)$$ [Math Figure 31]

Figure 32:
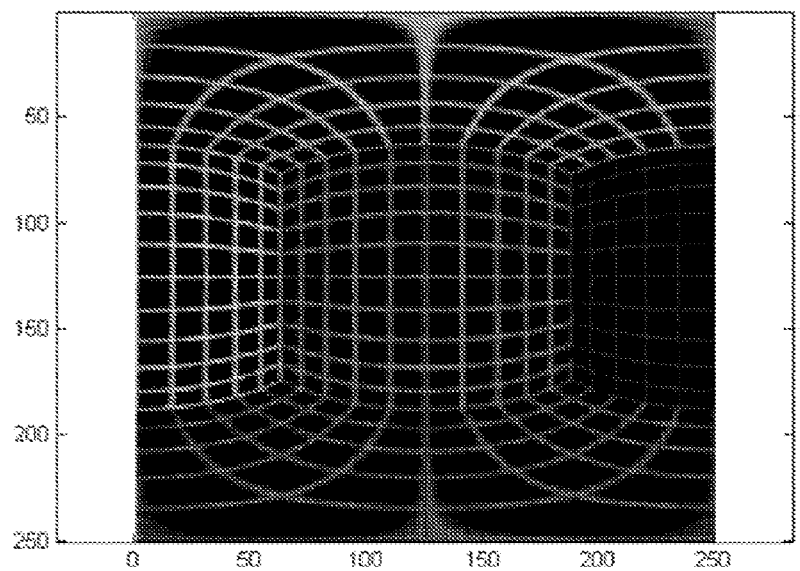
FIG. 32 is a panoramic image following an equi-rectangular projection scheme extracted from the fisheye image given in FIG. 26.
Figure 33:
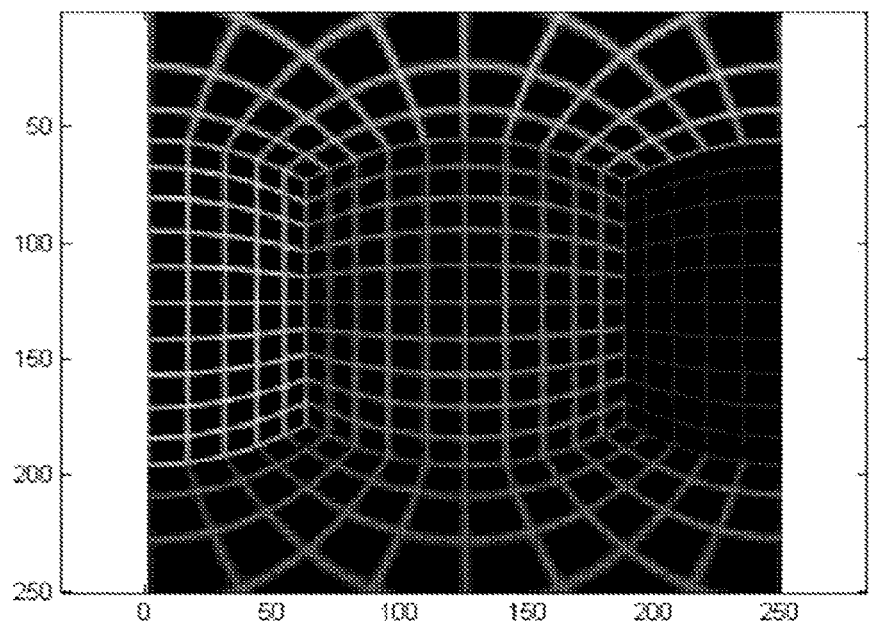
FIG. 33 is a panoramic image following a Mercator projection scheme extracted from the fisheye image given in FIG. 26.
Figure 34:
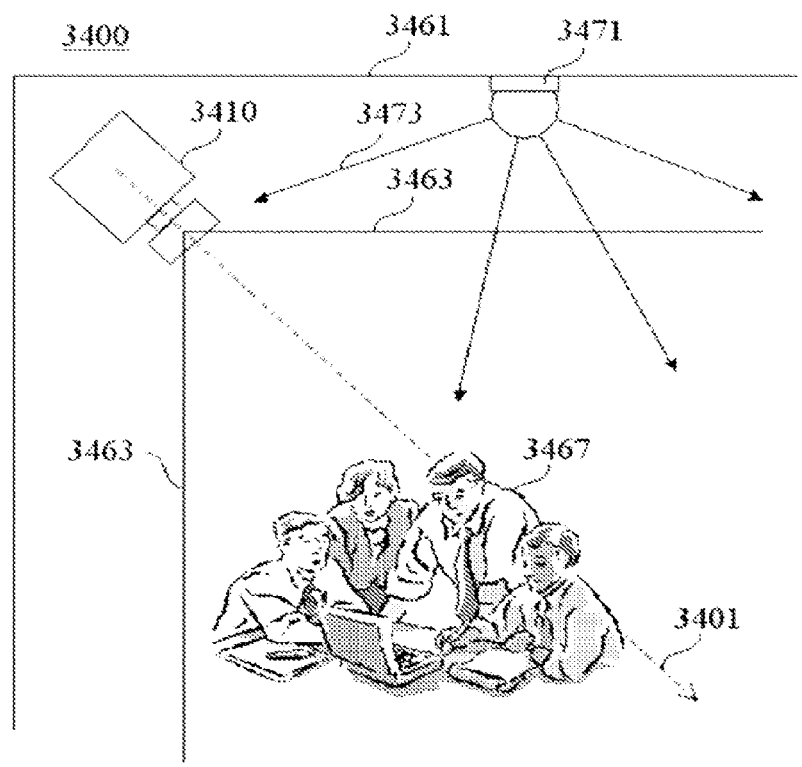
FIG. 34 is a conceptual drawing of a wide-angle camera of prior arts installed at an upper part of an interior wall for the purpose of monitoring the entire interior space.
Figure 35:
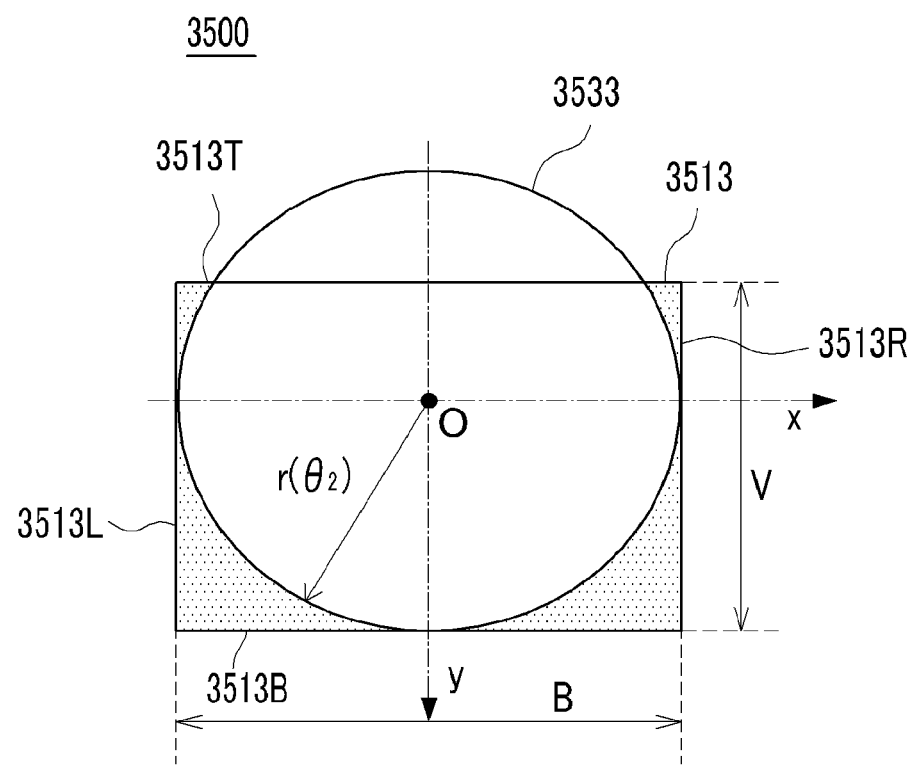
FIG. 35 is a schematic diagram showing the desirable size and the location of real image on an image sensor plane, which is most appropriate for the third embodiment of the present invention.

Here, R is the magnitude of the said vector $\vec{R}$, and $\hat{R}$ is the direction vector of the said vector. Then, the following relation holds between the rectangular coordinate and the spherical polar coordinate.

$$X = \hat{X} \cdot \vec{R} = R \sin\theta \cos\phi$$ [Math Figure 32]

$$Y = \hat{Y} \cdot \vec{R} = R \sin\theta \sin\phi$$ [Math Figure 33]

$$Z = \hat{Z} \cdot \vec{R} = R \cos\theta$$ [Math Figure 34]

$$\vec{R} \cdot \vec{R} = X^2 + Y^2 + Z^2 = R^2$$ [Math Figure 35]

In Eqs. 32 through 35, dot(•) represent a scalar product.

Figure 36:
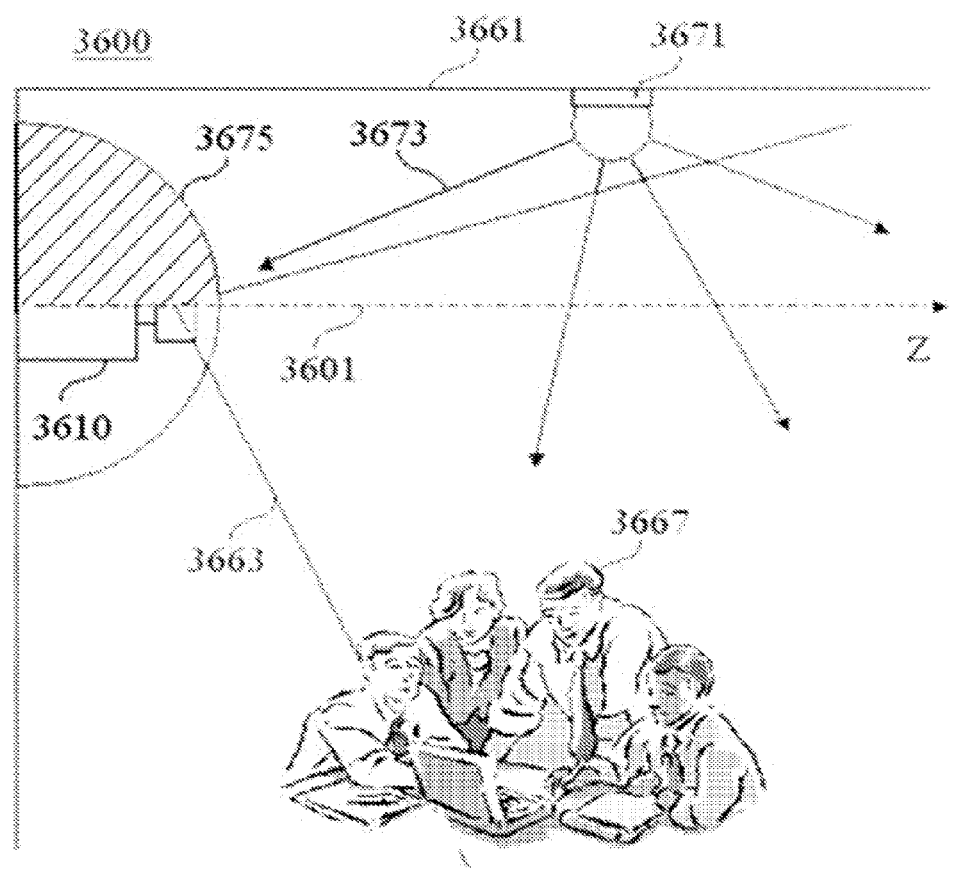
FIG. 36 is a conceptual drawing of an horizontal installation of an ultra wide-angle camera for the purpose of monitoring the entire interior space.

On the other hand, the said direction vector can be given by Eq. 36 as a function of two incidence angles describing the projection scheme of the current invention, namely the horizontal incidence angle $\Psi$ and the vertical incidence angle $\delta$. Hereinafter, this coordinate system will be referred to as a cylindrical polar coordinate system.

$$\vec{R} = R\hat{R}(\Psi, \delta) \qquad \text{[Math Figure 36]}$$

Figure 37:
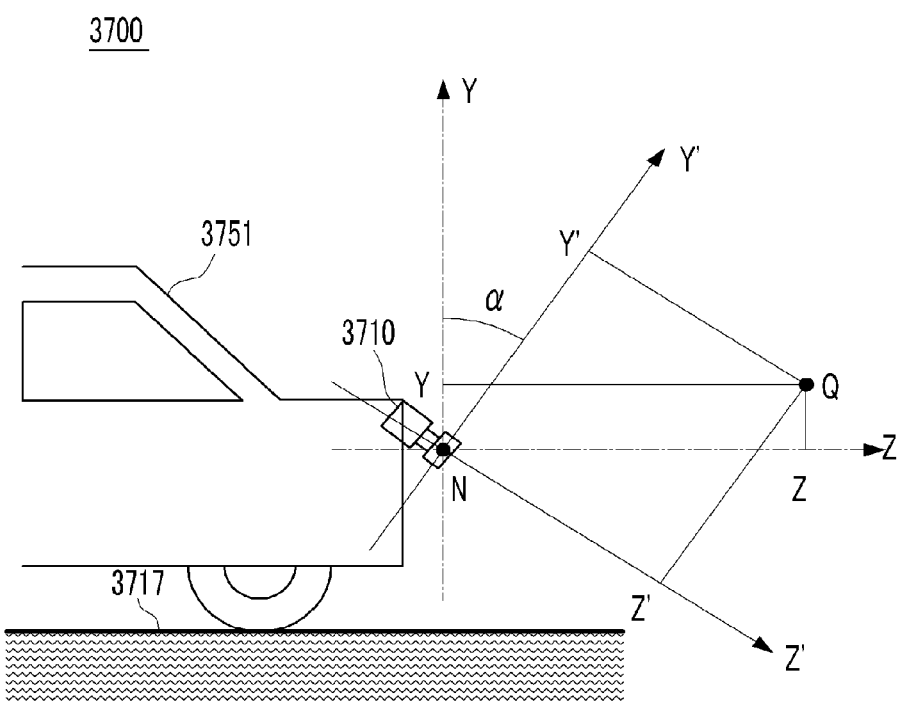
FIG. 37 is a schematic diagram of a car rear view camera employing a panoramic imaging system according to the fourth embodiment of the present invention.
Figure 38:
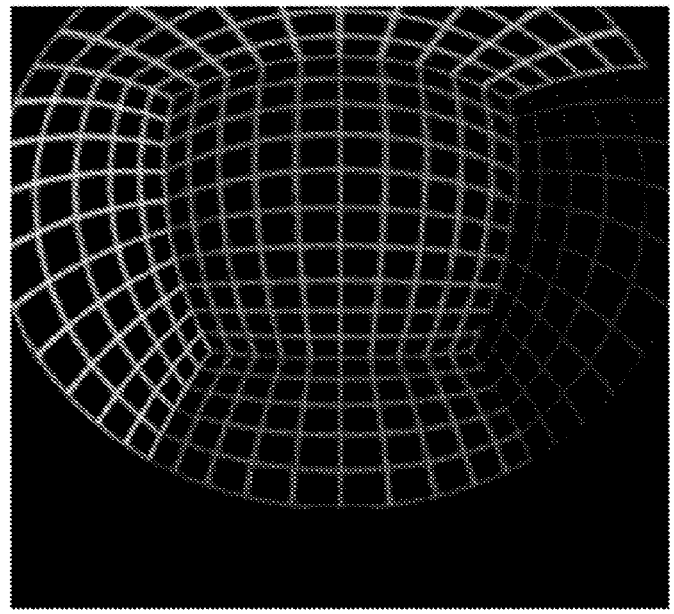
FIG. 38 is an example of an imaginary fisheye image captured by an inclined imaging system.
Figure 39:
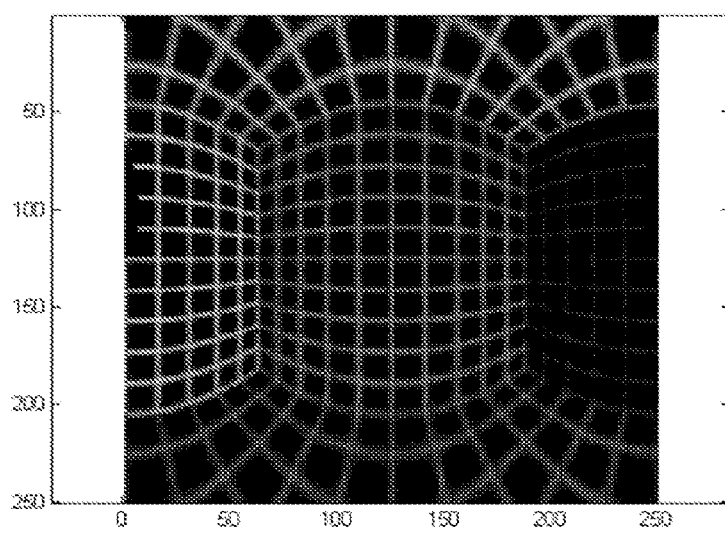
FIG. 39 is an exemplary panoramic image extracted from the fisheye image given in FIG. 38 according to the fourth embodiment of the present invention.

Using these two incidence angles, the rectangular coordinate can be given as follows.

$$X = R \cos \delta \sin \Psi \qquad \text{[Math Figure 37]}$$

$$Y = R \sin \delta \qquad \text{[Math Figure 38]}$$

$$Z = R \cos \delta \cos \Psi \qquad \text{[Math Figure 39]}$$

Figure 40:
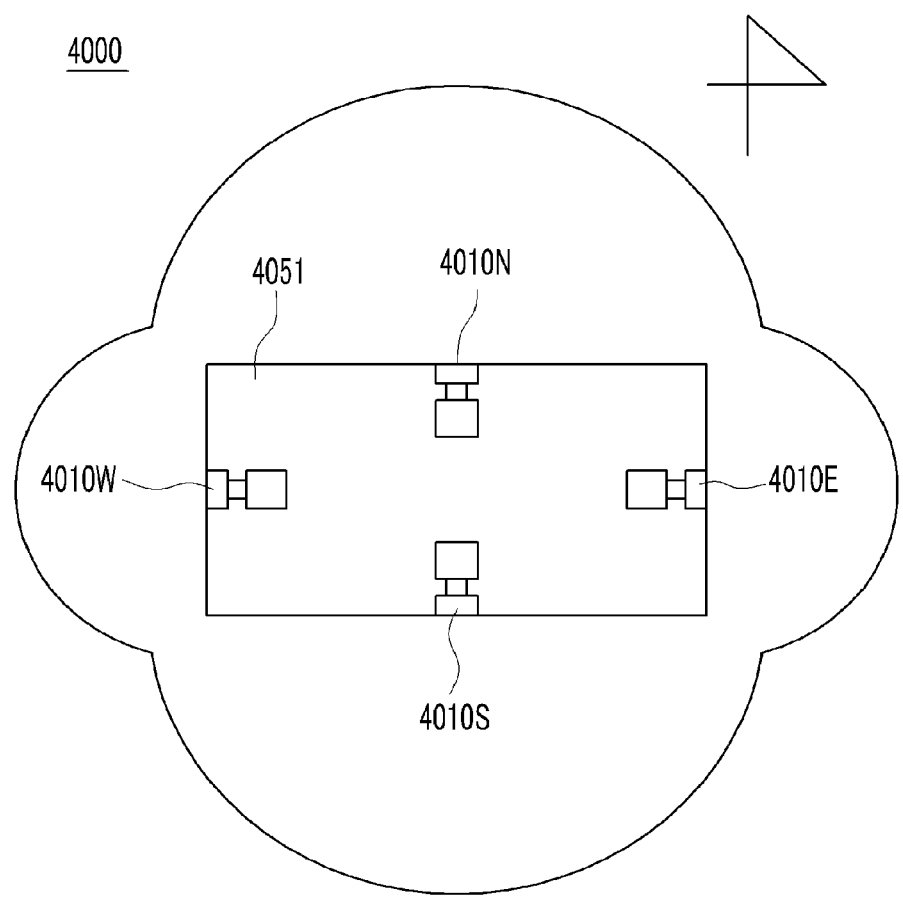
FIG. 40 is a schematic diagram of an imaging system for monitoring the entire 360° directions from a building or a large bus without any dead spot by employing panoramic imaging systems from the first thorough the fourth embodiments of the present invention.
Figure 41:
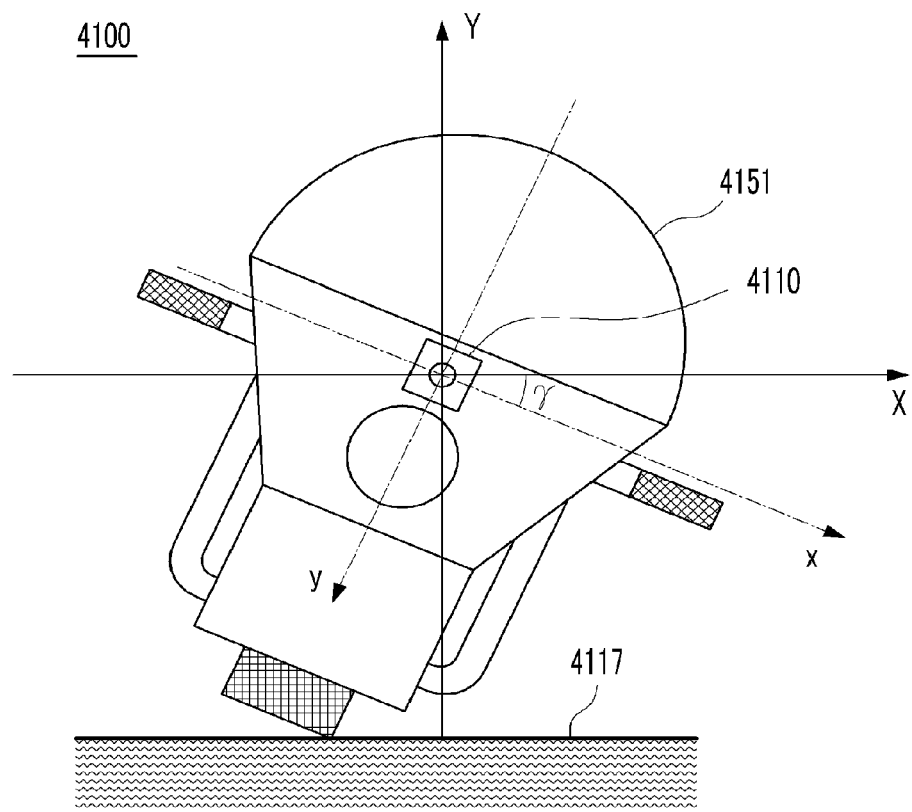
FIG. 41 is a schematic diagram of a device according to the sixth embodiment of the present invention, wherein vertical lines in the world coordinate system are not vertical lines in the first rectangular coordinate system.

Using Eqs. 37 through 39, the horizontal and the vertical incidence angles can be obtained from the rectangular coordinate (X, Y, Z) of the object point as in Eqs. 40 and 41.

$$\psi = \tan^{-1}\left(\frac{X}{Z}\right) \qquad \text{[Math Figure 40]}$$

$$\delta = \tan^{-1}\left(\frac{Y}{\sqrt{X^2 + Z^2}}\right) \qquad \text{[Math Figure 41]}$$

Figure 42:
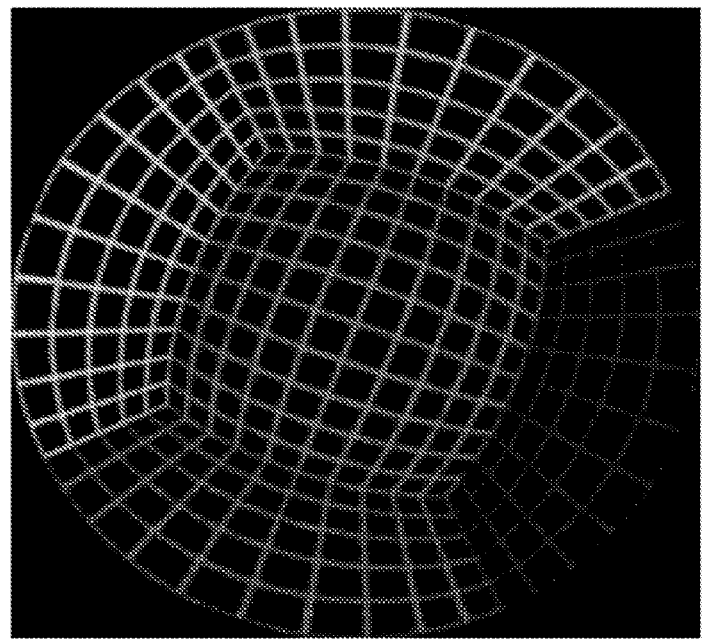
FIG. 42 is an example of an imaginary image captured by an inclined imaging system of the sixth embodiment of the present invention.
Figure 43:
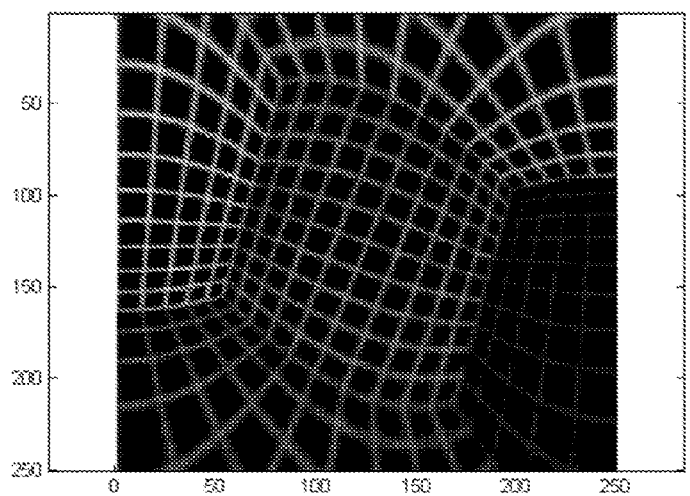
FIG. 43 is an exemplary panoramic image extracted from the image given in FIG. 42 using the method described in the first embodiment of the present invention.
Figure 44:
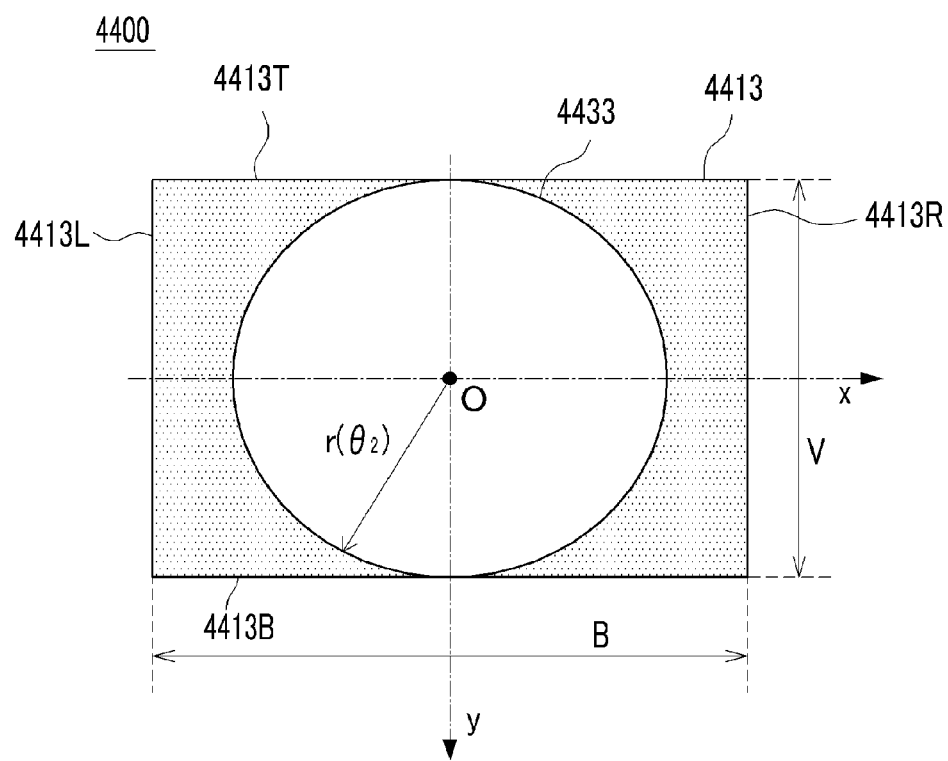
FIG. 44 is a schematic diagram showing the desirable size and the location of real image on an image sensor plane, which is most appropriate for the sixth embodiment of the present invention.

On the other hand, since the coordinates given in the spherical polar coordinate system and in the cylindrical polar coordinate system must agree, the following relations given in Eqs. 42 through 44 must hold.

$$\sin \theta \cos \phi = \cos \delta \sin \Psi \qquad \text{[Math Figure 42]}$$

$$\sin \theta \sin \phi = \sin \delta \qquad \text{[Math Figure 43]}$$

$$\cos \theta = \cos \delta \cos \Psi \qquad \text{[Math Figure 44]}$$

Figure 45:
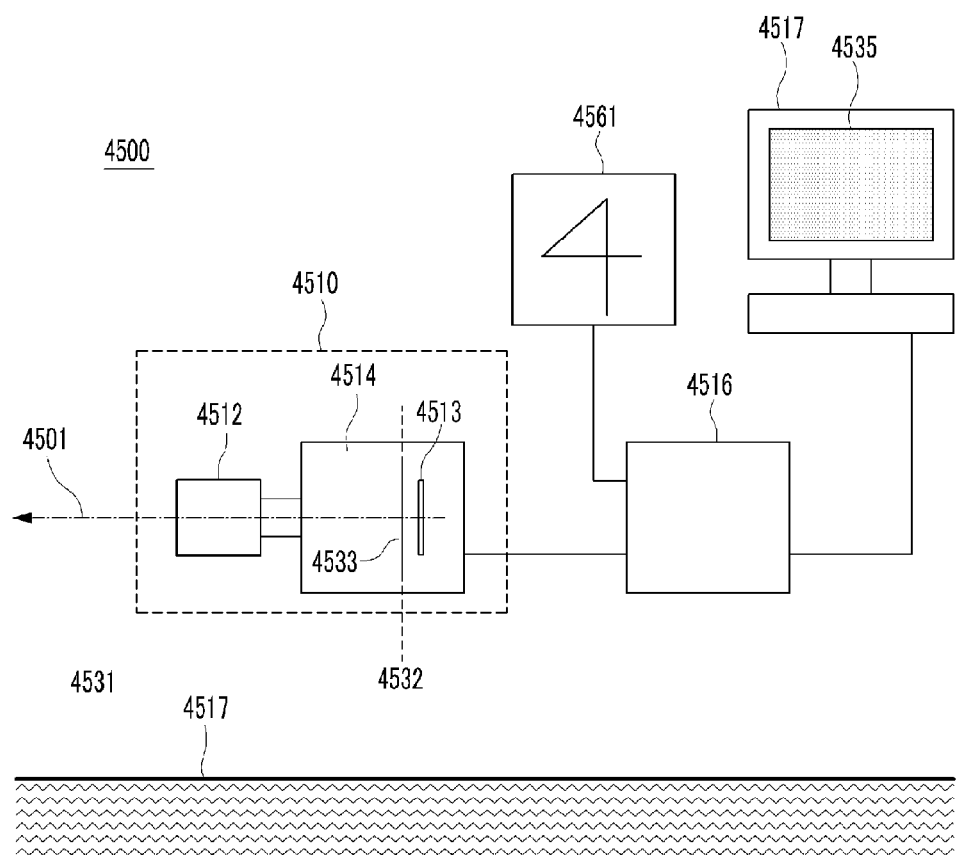
FIG. 45 is a schematic diagram of an imaging system according to the sixth embodiment of the present invention.

Eq. 45 can be obtained by dividing Eq. 43 by Eq. 42.

$$\tan \phi = \frac{\tan \delta}{\sin \psi} \qquad \text{[Math Figure 45]}$$

Figure 46:
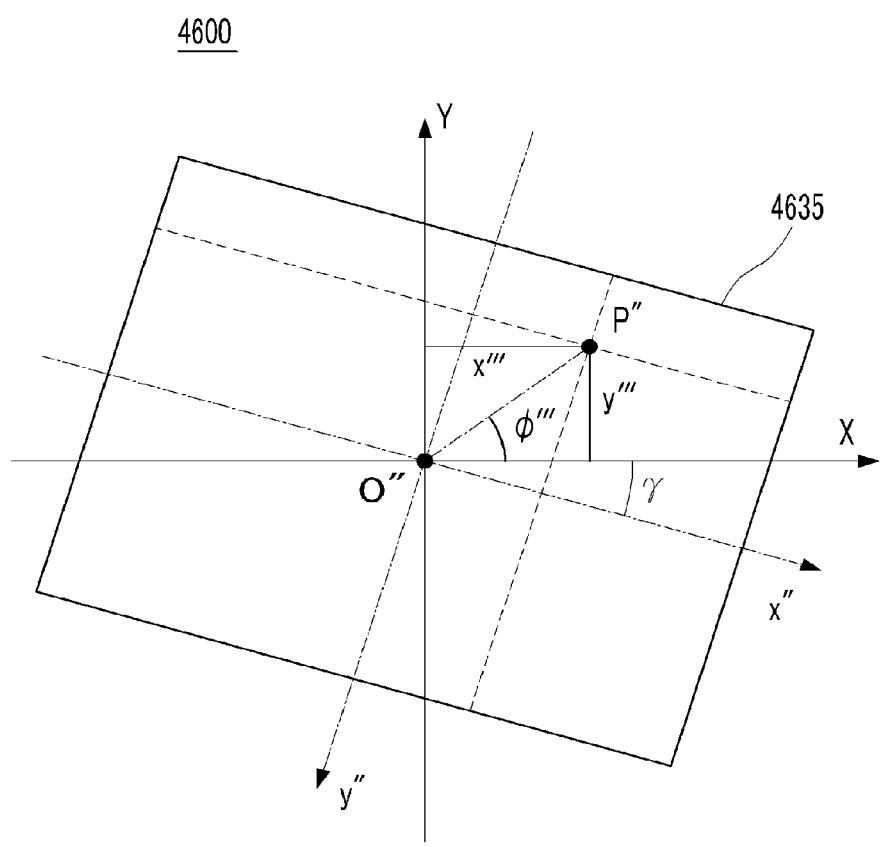
FIG. 46 is a conceptual drawing illustrating the relation between the third rectangular coordinate system and the world coordinate system in the sixth embodiment of the present invention.

Therefore, the azimuth angle $\phi$ is given by Eq. 46.

$$\phi = \tan^{-1}\left(\frac{\tan \delta}{\sin \psi}\right) \qquad \text{[Math Figure 46]}$$

Figure 47:
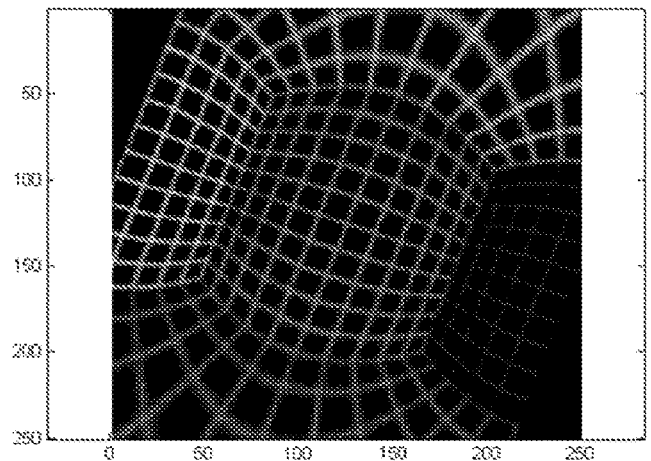
FIG. 47 is an exemplary panoramic image following a cylindrical projection scheme according to the sixth embodiment of the present invention.

On the other hand, from Eq. 44, the zenith angle $\theta$ is given by Eq. 47.

$$\theta = \cos^{-1}(\cos \delta \cos \Psi) \qquad \text{[Math Figure 47]}$$

Figure 48:
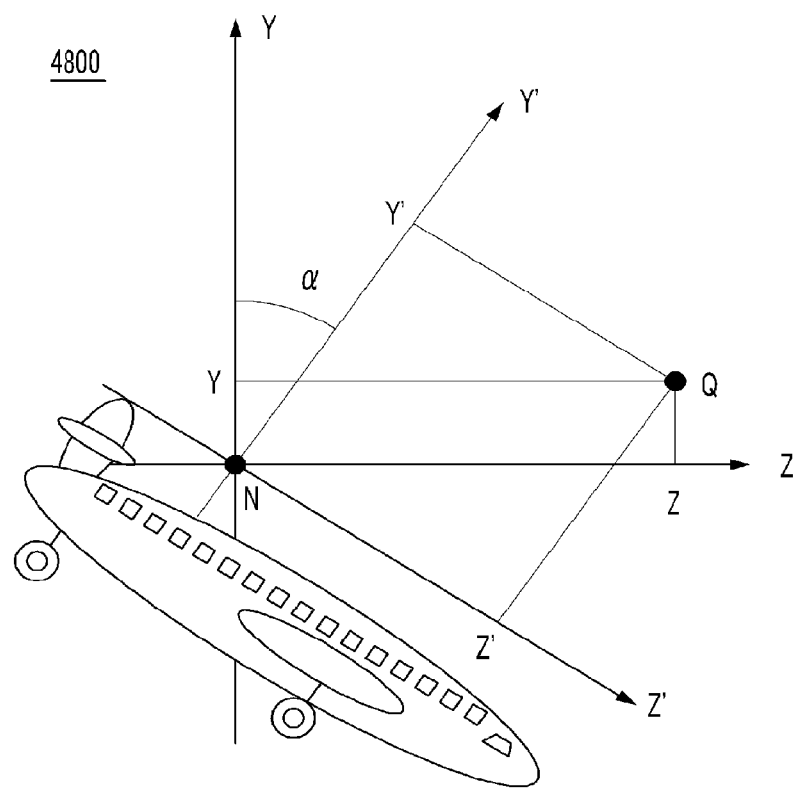
FIGS. 48 and 49 are conceptual drawings illustrating the relation between the first rectangular coordinate system and the world coordinate system in the seventh embodiment of the present invention.

In the reverse direction, to convert from the spherical polar coordinate to the cylindrical polar coordinate, Eq. 48 can be obtained by dividing Eq. 42 by Eq. 44.

$$\tan \Psi = \tan \theta \cos \phi \qquad \text{[Math Figure 48]}$$

Figure 49:
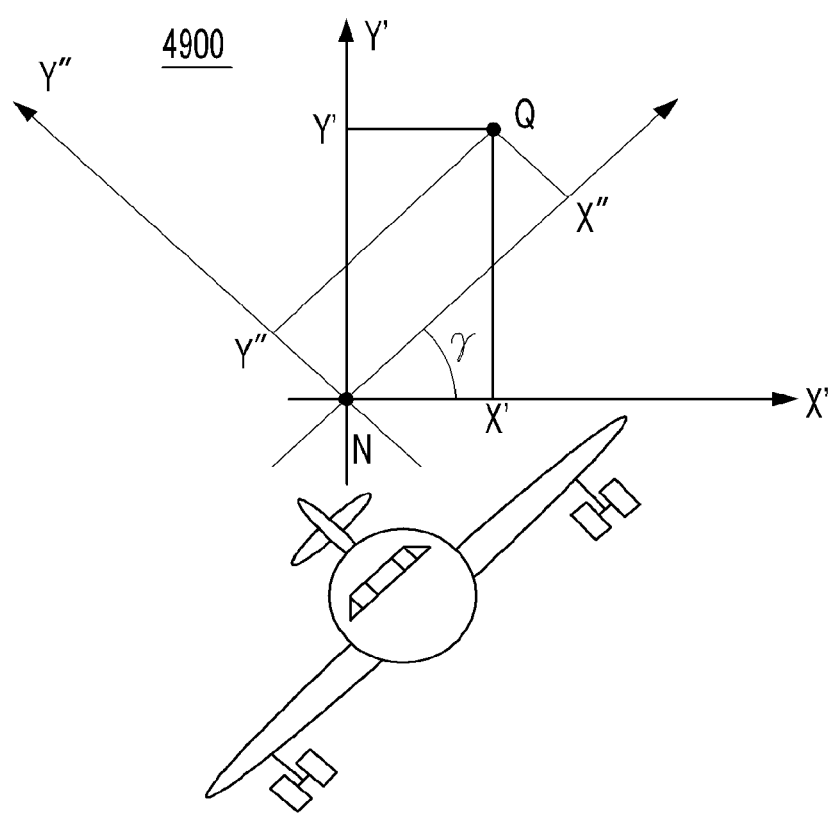

Therefore, the horizontal incidence angle is given by Eq. 49.

$$\Psi = \tan^{-1}(\tan \theta \cos \phi) \qquad \text{[Math Figure 49]}$$

Figure 50:
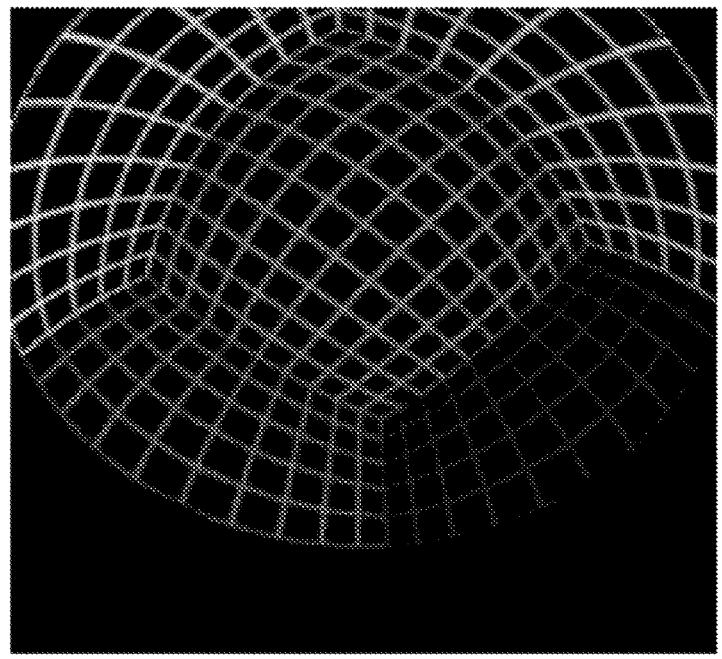
FIG. 50 is an example of an imaginary image captured by an inclined imaging system of the seventh embodiment of the present invention.

On the other hand, from Eq. 43, the vertical incidence angle is given by Eq. 50.

$$\delta = \sin^{-1}(\sin \theta \sin \phi) \qquad \text{[Math Figure 50]}$$

Therefore, an incident ray having a horizontal incidence angle $\Psi$ and a vertical incidence angle $\delta$ is an incident ray in the spherical polar coordinate system having a zenith angle $\theta$ given by Eq. 47 and an azimuth angle $\phi$ given by Eq. 46. In order to process an image, the position on the image sensor plane corresponding to an incident ray having such a zenith angle $\theta$ and an azimuth angle $\phi$ must be determined.

FIG. 18 is a conceptual drawing illustrating the real projection schemes of rotationally symmetric wide-angle lenses (1812) including fisheye lenses. The optical axis (1801) of the lens (1812) of the present embodiment coincides with the Z-axis of the coordinate system. An incident ray (1805) having a zenith angle $\theta$ with respect to the Z-axis is refracted by the lens (1812) and forms an image point P—i.e., the first point—on the sensor plane (1813) within the camera body (1814). The said image sensor plane (1813) is perpendicular to the optical axis, and to obtain a sharp image, the sensor plane must coincide with the focal plane (1832) of the lens. The distance between the said image point P and the intersection point O between the optical axis (1801) and the sensor plane (1813), in other words, the first intersection point, is r.

Figure 51:
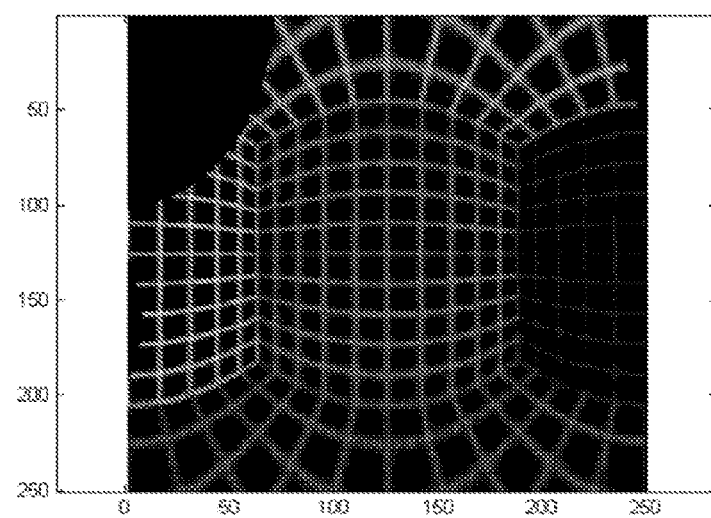
FIG. 51 is an exemplary panoramic image following a cylindrical projection scheme according to the seventh embodiment of the present invention.

For a fisheye lens with an ideal equidistance projection scheme, the image height r is given by Eq. 51.

$$r(\theta) = f\theta \qquad \text{[Math Figure 51]}$$

Figure 52:
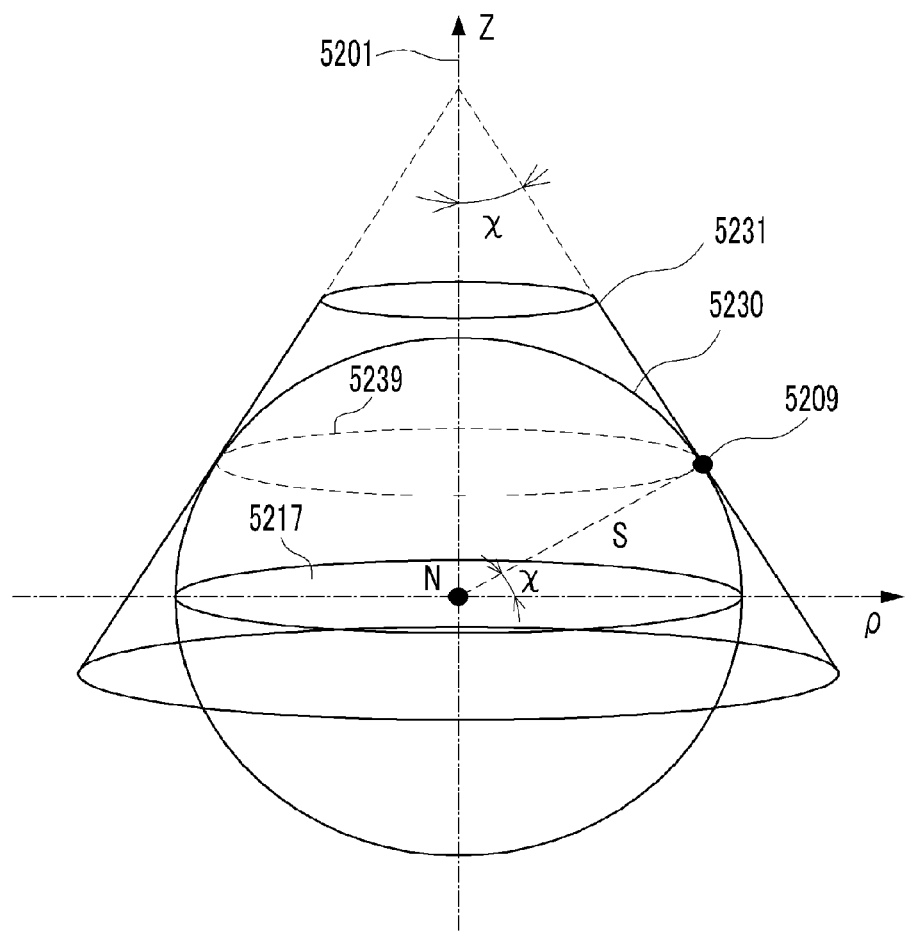
FIG. 52 is a conceptual drawing of an object plane according to the eighth embodiment of the present invention.

In Eq. 51, the unit of the incidence angle $\theta$ is radian, and f is the effective focal length of the fisheye lens. The unit of the image height r is identical to the unit of the effective focal length f. The difference between the ideal equidistance projection scheme given by Eq. 51 and the real projection scheme of the lens is the f-$\theta$ distortion. Nevertheless, it is considerably difficult for a fisheye lens to faithfully implement the projection scheme given by Eq. 51, and the discrepancy can be as large as 10%. Furthermore, the applicability of the present image processing algorithm is not limited to a fisheye lens with an equidistance projection scheme. Therefore, it is assumed that the projection scheme of a lens is given as a general function of the zenith angle $\theta$ of the incident ray as given in Eq. 52.

$$r = r(\theta) \qquad \text{[Math Figure 52]}$$

This function is a monotonically increasing function of the zenith angle $\theta$ of the incident ray.

Such a real projection scheme of a lens can be experimentally measured using an actual lens, or can be calculated from the lens prescription using dedicated lens design software such as Code V or Zemax. For example, the y-axis coordinate y of an image point on the focal plane by an incident ray having given horizontal and vertical incidence angles can be calculated using a Zemax operator REAY, and the x-axis coordinate x can be similarly calculated using an operator REAX.

FIG. 19 is a diagram showing the optical structure of a fisheye lens with an equidistance projection scheme along with the traces of rays, of which the complete lens prescription is given in reference 14. The FOV of this fisheye lens is 190°, the F-number is 2.8, and it has an enough resolution for a VGA-grade camera simultaneously in the visible and the near infrared wavelengths. Furthermore, the relative illumination is quite fair being over 0.8. This lens is comprised of only 8 spherical lens elements, and is appropriate for mass production since it has an enough fabrication tolerance.

Figure 53:
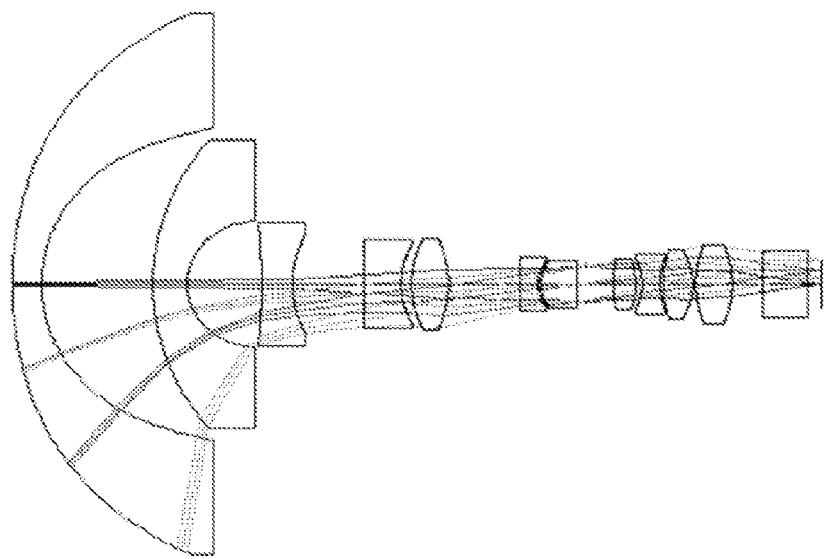
FIG. 53 is a diagram showing the optical structure of an exemplary dioptric fisheye lens with a stereograhic projection scheme along with the traces of rays.

FIG. 20 shows the real projection scheme (dotted line) of the fisheye lens given in FIG. 19 in the visible wavelength range, along with the fitted projection scheme (solid line) by a polynomial function. Here, the real projection scheme has been obtained using the said REAY operator based on the complete lens prescription, and this real projection scheme has been fitted to a fifth order polynomial passing through the origin as given in Eq. 53.

$$r(\theta) = a_1\theta + a_2\theta^2 + a_3\theta^3 + a_4\theta^4 + a_5\theta^5 \quad \text{[Math Figure 53]}$$

Table 2 shows the polynomial coefficients in Eq. 53.

TABLE 2

| variable | value |
|---|---|
| $a_1$ | 1.560778 |
| $a_2$ | $3.054932 \times 10^{-2}$ |
| $a_3$ | $-1.078742 \times 10^{-1}$ |
| $a_4$ | $7.612269 \times 10^{-2}$ |
| $a_5$ | $-3.101406 \times 10^{-2}$ |

FIG. 21 shows the error between the real projection scheme and the approximate projection scheme fitted to a polynomial given by Eq. 53 and table 2. As can be seen from FIG. 21, the error is less than 0.3 μm, and it is practically error-free considering the fact that the dimension of each side of a pixel is 7.5 μm in a VGA-grade ⅓-inch CCD sensor.

Figure 54:
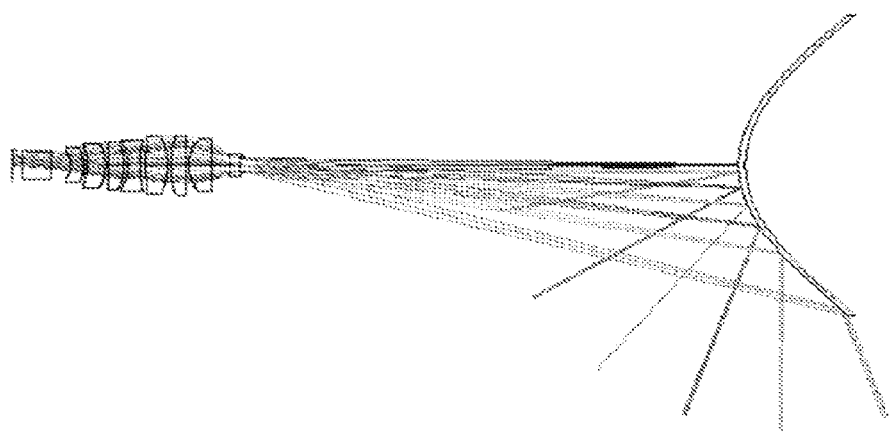
FIG. 54 is a diagram showing the optical structure of an exemplary catadioptric fisheye lens with a stereograhic projection scheme along with the traces of rays.
Figure 55:
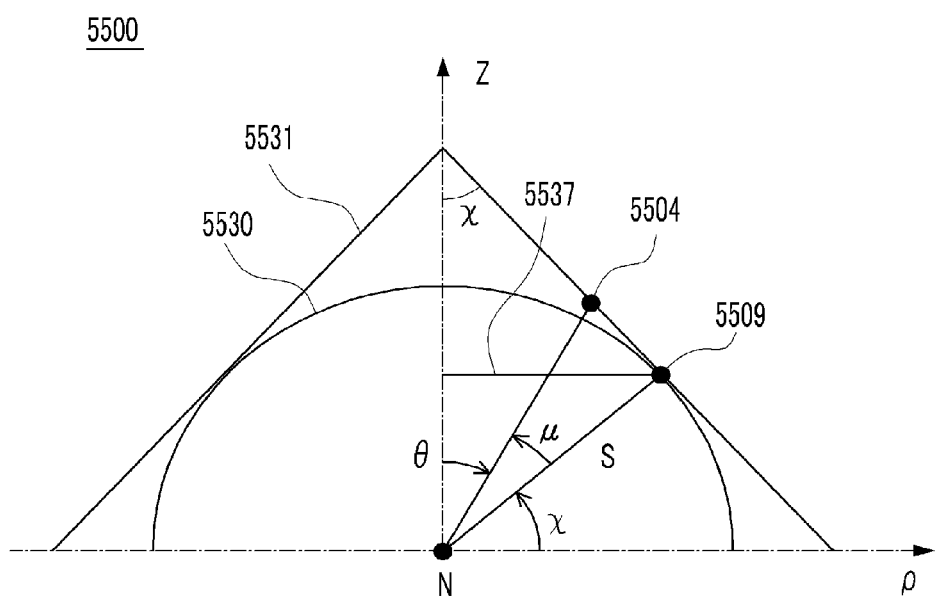
FIG. 55 is a conceptual drawing of an incidence plane according to the eighth embodiment of the present invention.

FIG. 22 is a conceptual drawing illustrating the conversion relation between the rectangular coordinate and the polar coordinate of the second point P' on the uncorrected image plane (2234) corresponding to the first point on the sensor plane. Referring to FIG. 22, the two-dimensional rectangular coordinate (x', y') of the second point on the uncorrected image plane can be obtained from the two-dimensional polar coordinate (r', φ'≡φ) as in Eqs. 54 and 55.

$$x' = gr(\theta)\cos\phi \quad \text{[Math Figure 54]}$$

$$y' = gr(\theta)\sin\phi \quad \text{[Math Figure 55]}$$

Using Eqs. 27 through 55, a panoramic image having an ideal projection scheme can be extracted from an image acquired using a fisheye lens exhibiting a distortion aberration. First, depending on the user's need, a desirable size (W, H) of the panoramic image and the location of the third intersection point O" are determined. The said third intersection point can be located even outside the processed image plane. In other words, the range of the lateral coordinate ($x''_1 \leq x'' \leq x''_2$) on the processed image plane as well as the range of the longitudinal coordinate ($y''_1 \leq y'' \leq y''_2$) can take arbitrary real numbers. Also, the horizontal FOV ΔΨ of this panoramic image (i.e., the processed image plane) is determined. Then, the horizontal incidence angle Ψ and the vertical incidence angle δ of an incident ray corresponding to the third point in the panoramic image having a rectangular coordinate (x", y") can be obtained using Eqs. 28 and 29. Then, the zenith angle θ and the azimuth angle φ of an incident ray having the said horizontal and the vertical incidence angles are calculated using Eqs. 47 and 46. Next, the real image height r corresponding to the zenith angle θ of the incident ray is obtained using Eq. 52. Utilizing the real image height r, the magnification ratio g, and the azimuth angle φ of the incident ray, the rectangular coordinate (x', y') of the image point on the uncorrected image plane is obtained using Eqs. 54 and 55. In this procedure, the coordinate of the second intersection point on the uncorrected image plane, or equivalently the location of the first intersection point on the sensor plane has to be accurately determined. Such a location of the intersection point can be easily found using various methods including image processing method. Since such technique is well known to the people in this field, it will not be described in this document. Finally, the video signal (i.e., RGB signal) from the image point by the fisheye lens having this rectangular coordinate is given as the video signal for the image point on the panoramic image having the rectangular coordinate (x", y"). A panoramic image having an ideal projection scheme can be obtained by image processing for all the image points on the processed image plane by the above-described method.

However, in reality, a complication arises due to the fact that all the image sensors and display devices are digitized devices. FIG. 23 is a schematic diagram of a digitized processed image plane, and FIG. 24 is a schematic diagram of an uncorrected image plane. Said processed image plane has pixels in the form of a two-dimensional array having $J_{max}$ columns in the lateral direction and $I_{max}$ lows in the longitudinal direction. Although, in general, each pixel has a square shape with both the lateral dimension and the longitudinal dimension measuring as p, the lateral and the longitudinal dimensions of a pixel are considered as 1 in the image processing field. To designate a particular pixel P''', the low number I and the column number J are used. In FIG. 23, the coordinate of the said pixel P''' is given as (I, J). Therefore, the signal stored on this pixel can be designated as S(I, J). A pixel has a finite area. To correct the distortion of a digitized image, the physical coordinate of an arbitrary pixel P''' is taken as the center position of the pixel, which is marked as a filled circle in FIG. 23.

There is an image point—i.e., the first point—on the image sensor plane corresponding to a pixel P''' on the said processed image plane (2335). The horizontal incidence angle of an incident ray in the world coordinate system forming an image at this first point can be written as $\Psi_{I,J} \equiv \Psi(I, J)$. Also, the vertical incidence angle can be written as $\delta_{I,J} \equiv \delta(I, J)$. Incidentally, the location of this first point does not generally coincide with the exact location of any one pixel.

Figure 56:
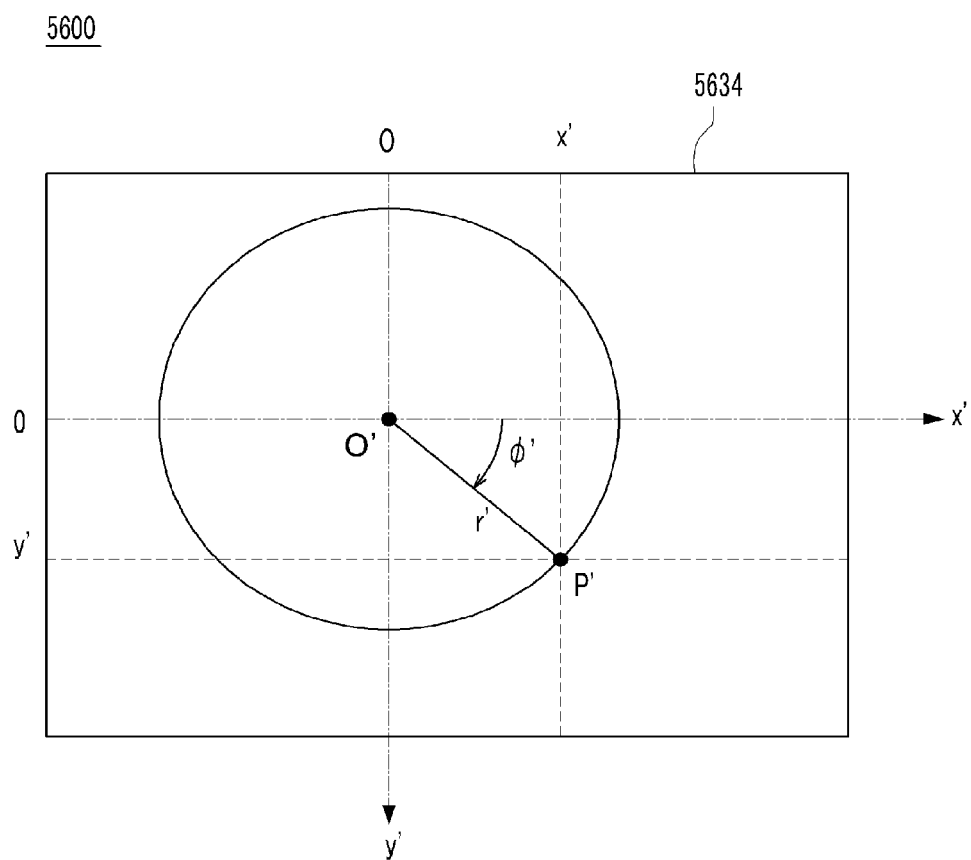
FIG. 56 is a conceptual drawing of an uncorrected image plane according to the eighth embodiment of the present invention.

Here, if the said screen (2335) corresponds to a panoramic image, then as given by Eq. 56, the horizontal incidence angle must be a sole function of the lateral pixel coordinate J.

$$\Psi_{I,J} = \Psi_J = \Psi(J) \quad \text{[Math Figure 56]}$$

Figure 57:
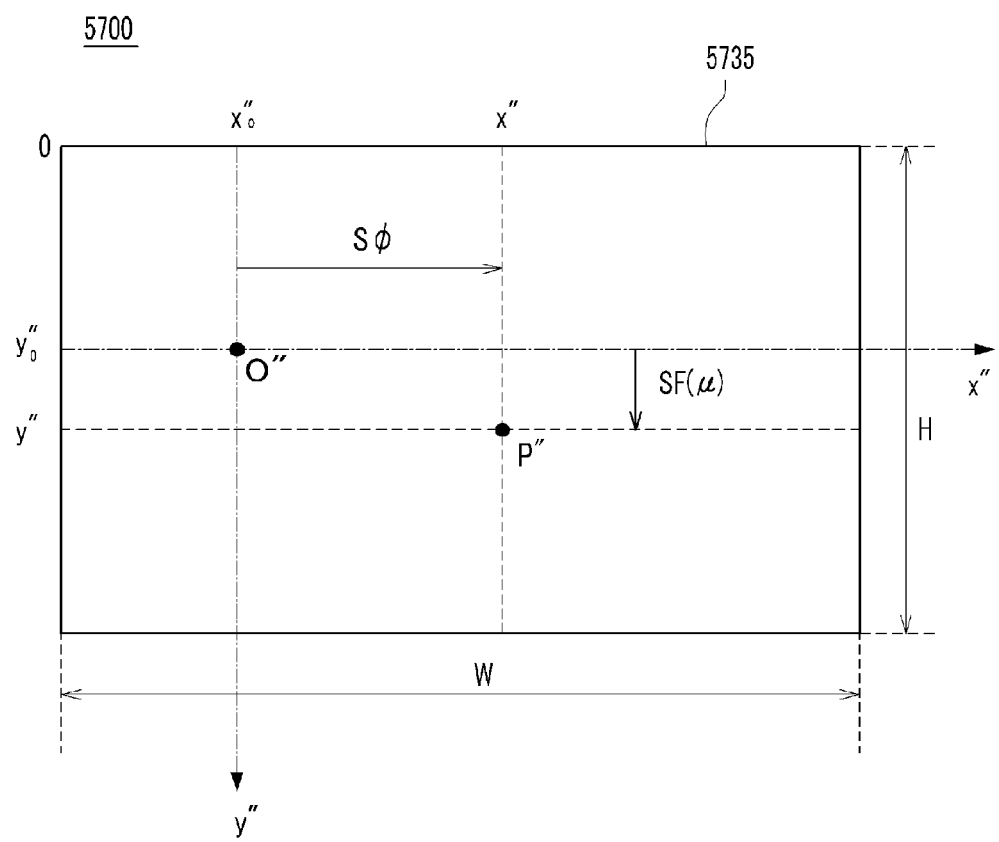
FIG. 57 is a conceptual drawing of a processed image plane according to the eighth embodiment of the present invention.

Likewise, the vertical incidence angle must be a sole function of the longitudinal pixel coordinate I.

$$\delta_{I,J} = \delta_I = \delta(I) \quad \text{[Math Figure 57]}$$

Figure 58:
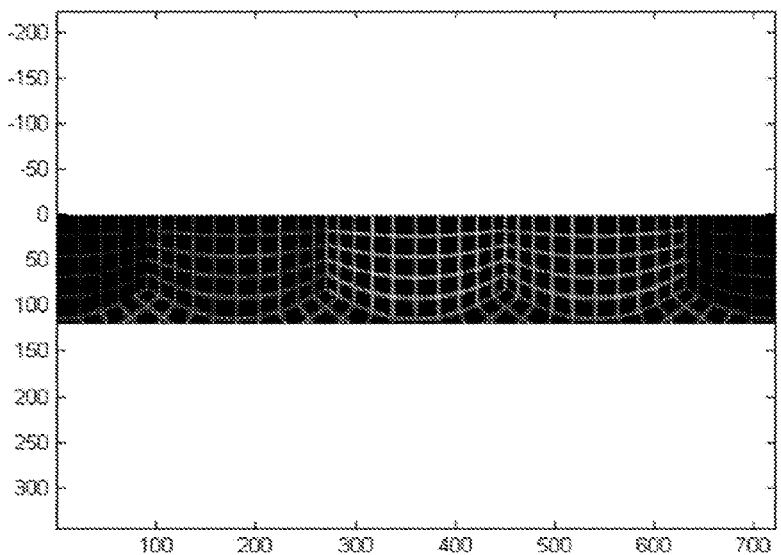
FIGS. 58 and 59 are exemplary panoramic images according to the eighth embodiment of the present invention.

Furthermore, if an equidistance projection scheme is satisfied in the lateral direction, and a rectilinear projection scheme is satisfied in the longitudinal direction, then the range of the horizontal incidence angle and the range of the vertical incidence angle must satisfy the relation given in Eq. 58.

$$\frac{J_{max} - 1}{\psi_{J_{max}} - \psi_1} = \frac{I_{max} - 1}{\tan\delta_{I_{max}} - \tan\delta_1} \quad \text{[Math Figure 58]}$$

Figure 59:
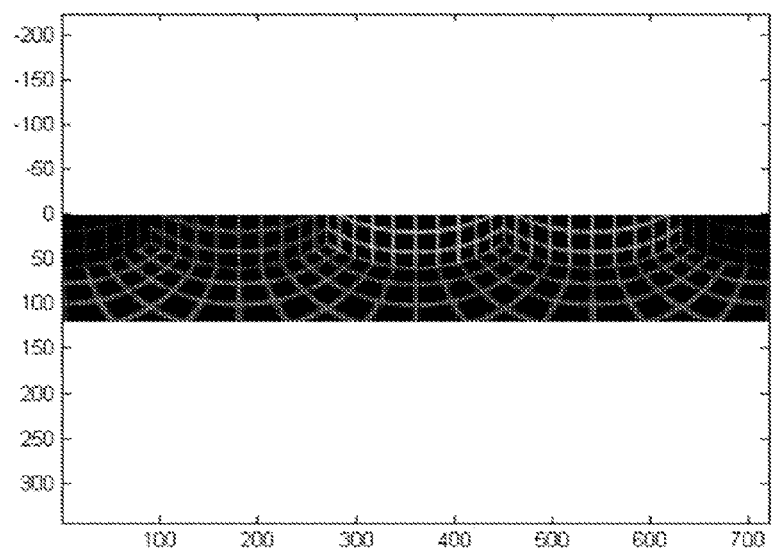

Comparing with the image correction method described previously, image correction method for a digitized image goes through the following procedure. First, the real projection scheme of the wide-angle lens that is meant to be used in the image processing is obtained either by experiment or based on the accurate lens prescription. Herein, when an incident ray having a zenith angle θ with respect to the optical axis forms a sharp image point on the image sensor plane by the image forming properties of the lens, the real projection scheme of the lens refers to the distance r from the intersection point O between the said image sensor plane and the optical axis to the said image point obtained as a function of the zenith angle θ of the incident ray.

$$r = r(\theta) \quad \text{[Math Figure 59]}$$

Figure 60:
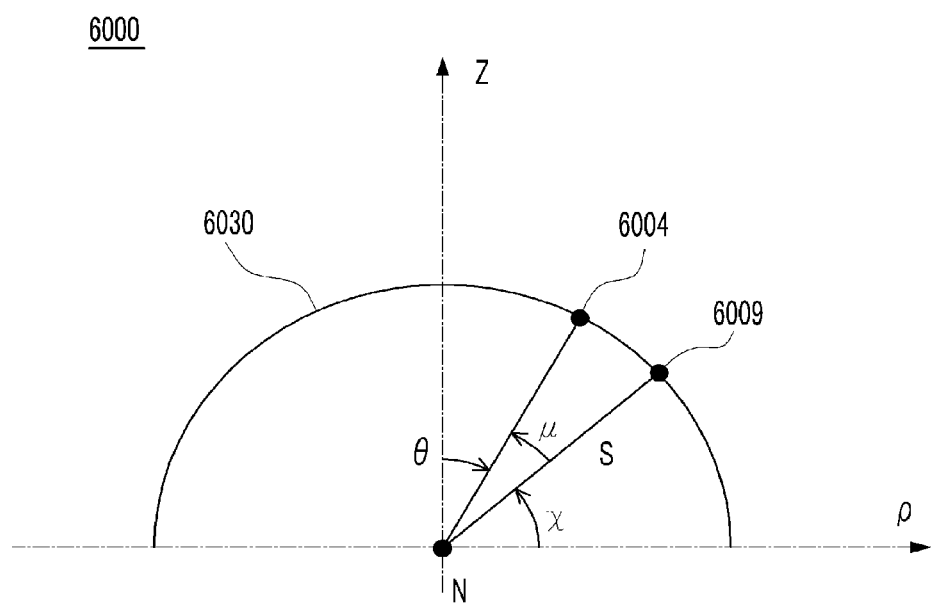
FIG. 60 is a conceptual drawing of an incidence plane according to the ninth embodiment of the present invention.

Said function is a monotonically increasing function of the zenith angle θ. Next, the location of the optical axis on the uncorrected image plane, in other words, the location of the second intersection point O' corresponding to the first intersection point O on the image sensor plane is obtained. The pixel coordinate of this second intersection point is assumed as $(K_o, L_o)$. In addition to this, the magnification ratio g of the pixel distance r' on the uncorrected image plane over the real image height r on the image sensor plane is obtained. This magnification ratio g is given by Eq. 60.

$$g = \frac{r'}{r}. \quad \text{[Math Figure 60]}$$

Figure 61:
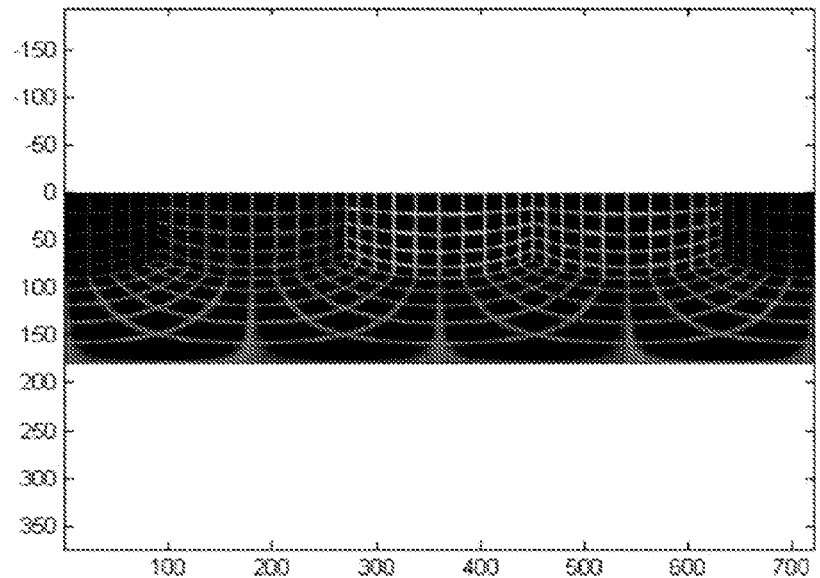
FIGS. 61 and 62 are exemplary panoramic images according to the ninth embodiment of the present invention.
Figure 62:
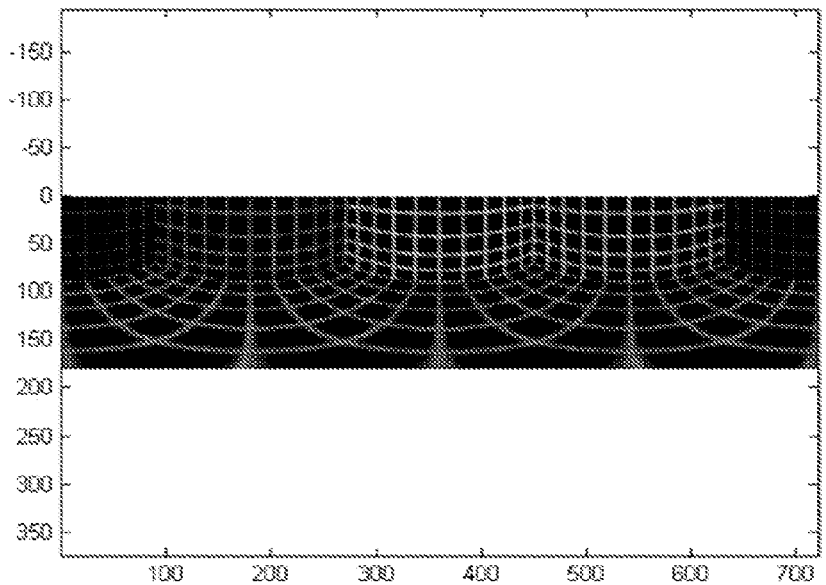

Once such a series of preparatory stages have been completed, then a camera mounted with the said fisheye lens is installed with its optical axis aligned parallel to the ground plane, and a raw image (i.e., an uncorrected image plane) is acquired. Next, the desirable size of the processed image plane and the location $(I_o, J_o)$ of the third intersection point is determined, and then the horizontal incidence angle $\Psi_J$ and the vertical incidence angle $\delta_1$ given by Eqs. 61 and 62 are computed for all the pixels (I, J) on the said processed image plane.

$$\psi_J = \frac{\psi_{Jmax} - \psi_1}{J_{max} - 1}(J - J_o) \quad \text{[Math Figure 61]}$$

$$\delta_I = \tan^{-1}\left\{\frac{\psi_{Jmax} - \psi_1}{J_{max} - 1}(I - I_o)\right\} \quad \text{[Math Figure 62]}$$

Figure 63:
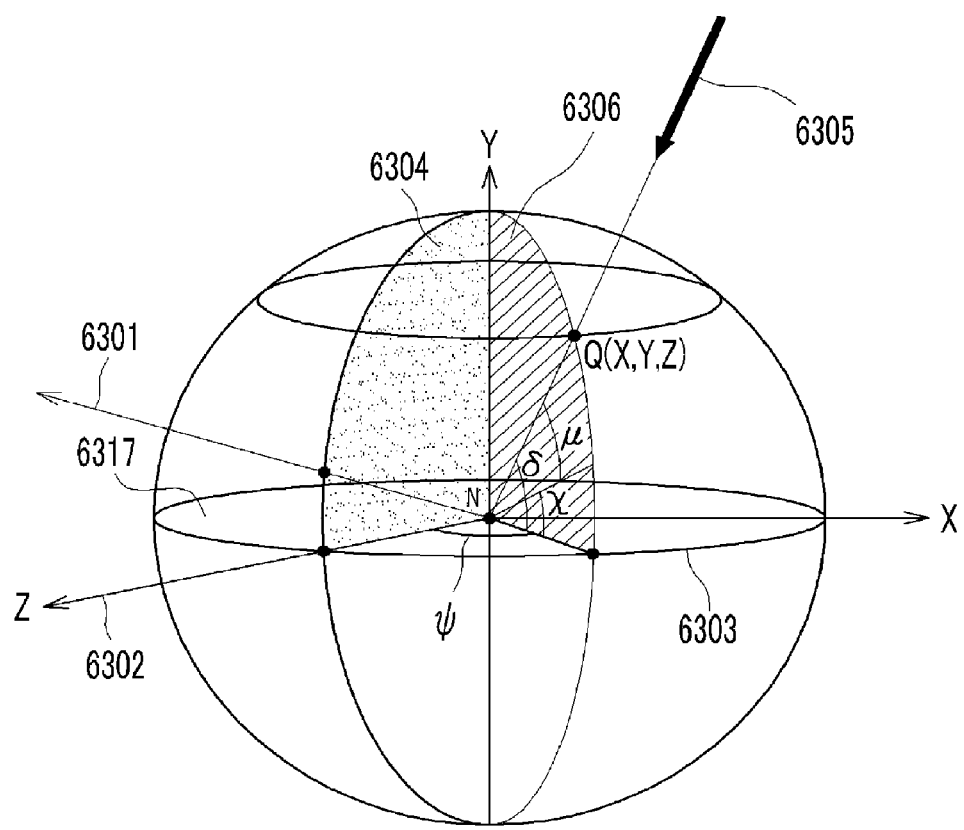
FIG. 63 is a conceptual drawing of the world coordinate system according to the tenth embodiment of the present invention.
Figure 64:
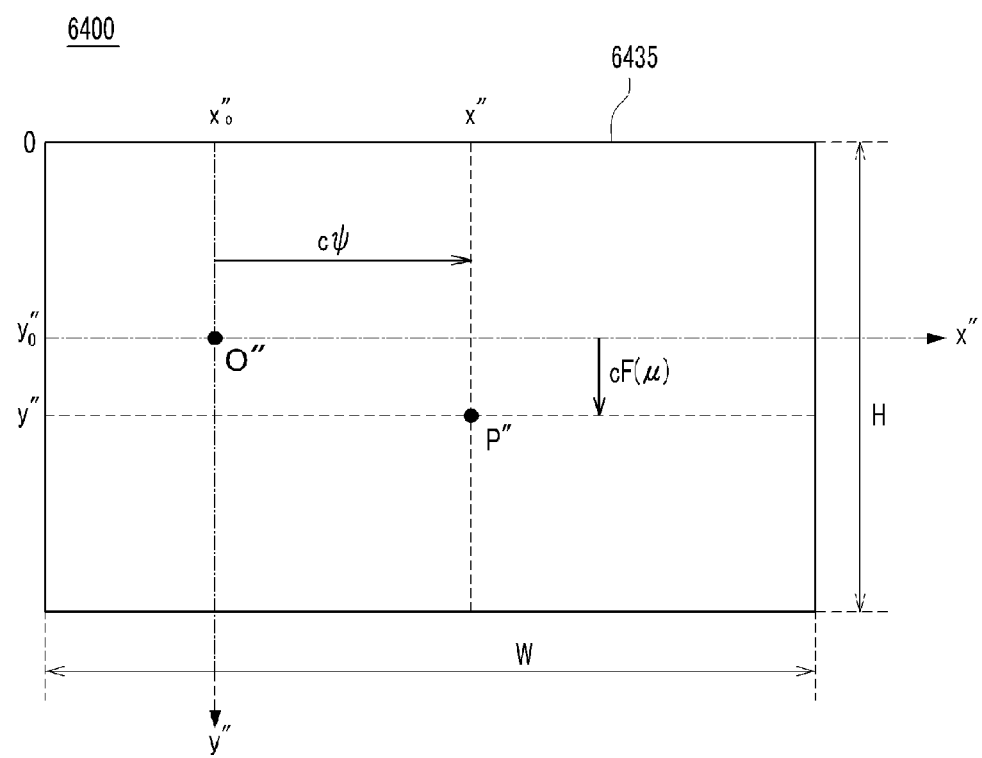
FIG. 64 is a conceptual drawing of a processed image plane according to the tenth embodiment of the present invention.

From these horizontal and vertical incidence angles, the zenith angle $\theta_{I,J}$ and the azimuth angle $\Phi_{I,J}$ of the incident ray in the first rectangular coordinate system are obtained using Eqs. 63 and 64.

$$\theta_{I,J} = \cos^{-1}(\cos \delta_I \cos \Psi_J) \quad \text{[Math Figure 63]}$$

$$\phi_{I,J} = \tan^{-1}\left(\frac{\tan\delta_I}{\sin\psi_J}\right) \quad \text{[Math Figure 64]}$$

Next, the image height $r_{I,J}$ on the image sensor plane is obtained using Eqs. 63 and 59.

$$r_{I,J} = r(\theta_{I,J}) \quad \text{[Math Figure 65]}$$

Next, using the location $(K_o, L_o)$ of the second intersection point on the uncorrected image plane and the magnification ratio g, the location of the second point (2407) on the uncorrected image plane is obtained using Eqs. 66 and 67.

$$x'_{I,J} = L_o + g r_{I,J} \cos \phi_{I,J} \quad \text{[Math Figure 66]}$$

$$y'_{I,J} = K_o + g r_{I,J} \sin \phi_{I,J} \quad \text{[Math Figure 67]}$$

The location of the said second point does not exactly coincide with the location of any one pixel. Therefore, $(x'_{I,J}, y'_{I,J})$ can be considered as the coordinate of a virtual pixel on the uncorrected image plane corresponding to the third point on the processed image plane, and has a real number in general.

Since the said second point does not coincide with any one pixel, an interpolation method must be used for image processing. The coordinate of a pixel (2408) that is nearest to the location of the said second point can be obtained using Eqs. 68 and 69.

$$K = \text{int}(y'_{I,J}) \quad \text{[Math Figure 68]}$$

$$L = \text{int}(x'_{I,J}) \quad \text{[Math Figure 69]}$$

Here, int{x} is a function whose output is an integer closest to the real number x. Then, the signal value P(K, L) stored at that pixel is copied and assigned as the signal value S(I, J) for the corresponding pixel in the unwrapped panoramic image.

$$S(I,J) = P(K,L) \quad \text{[Math Figure 70]}$$

Such a geometrical transformation is very simple, but it has the advantage of fast execution time even for a case where there is a large number of pixels in the panoramic image.

Unwrapped panoramic image that is image processed by this most simple method has a shortcoming in that the boundary between two different objects appear jagged like that of a saw tooth when the number of pixels is not sufficient in the image sensor, or when the unwrapped panoramic image is magnified. To remedy this shortcoming, bilinear interpolation method can be employed. Referring to FIG. 25, the position (x', y') of the second point (2507) on the distorted uncorrected image plane corresponding to the pixel P" having a coordinate (I, J) on the distortion-free processed image plane is marked as a dark triangle. Here, the lateral and the longitudinal intervals between neighboring pixels are all 1, and the said second point is separated from the pixel (2508) by $\Delta_x$ pixel in the lateral direction and by $\Delta_y$ pixel in the longitudinal direction. Said pixel (2508) is a pixel, whereof the coordinate is given by an integer value (K, L) that is obtained by truncating the real numbered coordinate of the said second point. In other words, if x' is given as x'=103.9, for example, then int(x')=104, but this value is not used in the bilinear interpolation method. Instead, the largest integer 103 which is smaller than x' becomes the L value. In mathematical terminology, it is designated as L=floor(x') and K=floor(y'). Then, the signal value of the pixel calculated using the bilinear interpolation method is given by Eq. 71.

$$S(I,J) = (1-\Delta_y)(1-\Delta_x)P(K,L) + \Delta_y(1-\Delta_x)P(K+1,L) + (1-\Delta_y)\Delta_x P(K,L+1) + \Delta_y\Delta_x P(K+1,L+1) \quad \text{[Math Figure 71]}$$

When such a bilinear interpolation method is used, the image becomes sharper. However, since the computational load is increased, it can become an obstacle in an imaging system operating in real time such as the one generating live video signals. On the other hand, if interpolation methods such as bi-cubic interpolation or spline interpolation methods are used, then a more satisfactory image can be obtained, but the computational load is increased still more. To prevent the decrease in speed (i.e., frame rate) due to such an increase in the computational load, the image processing can be done by hardware such as FPGA chips.

On the other hand, still other problems may occur when the image is magnified or downsized, in other words, when the image is zoomed-in or zoomed-out by software. For example, the image can appear blurry when the image is excessively scaled up, and moire effect can happen when the image is scaled down. Furthermore, due to an image processing, the image can be scaled-up and scaled-down within the same screen and the two adverse effects can simultaneously appear. To improve on these problems, filtering operations can be undertaken in general.

FIG. 26 is an imaginary interior scene produced by professor Paul Bourke by using a computer, and it has been assumed that the lens used to capture the imaginary scene is a fisheye lens with 180° FOV having an ideal equidistance projection scheme. This image is a square image, whereof both the lateral and the longitudinal dimensions are 250 pixels. Therefore, the coordinate of the optical axis, in other words, the coordinate of the second intersection point, is (125.5, 125.5), and the image height for an incident ray with a zenith angle of 90° is given as r'(π/2)=125.5−1=124.5. Since this imaginary fisheye lens follows an equidistance projection scheme, the projection scheme of this lens is given by Eq. 72.

$$r'(\theta) = \frac{124.5}{\left(\frac{\pi}{2}\right)}\theta = 79.26\theta$$ [Math Figure 72]

On the other hand, FIG. 27 is a panoramic image following a cylindrical projection scheme that has been extracted from the image in FIG. 26, where the lateral and the longitudinal dimensions are all 250 pixels, and the third intersection point is located at the center of the processed image plane. Furthermore, the horizontal FOV of the processed image plane is 180° (i.e., π). As can be seen from FIG. 27, all the vertical lines in the three walls, namely the front, the left, and the right walls in FIG. 26 appear as straight lines in FIG. 27. The fact that all the vertical lines in the world coordinate system appear as straight lines in the processed image plane is the characteristic of the present invention.

FIG. 28 is a diagram schematically illustrating the desirable size and the location of real image (2833) on the image sensor plane (2813). The fisheye lens suitable for the present embodiment is a fisheye lens with a FOV greater than 180° and following an equidistance projection scheme. Furthermore, the intersection point O between the optical axis of the fisheye lens and the image sensor plane is located at the center of the image sensor plane. Therefore, the range of the lateral coordinate is (−B/2≤x≤B/2), and the range of the longitudinal coordinate is (−V/2≤y≤V/2).

If the maximum FOV of this fisheye lens is given as $2\theta_2$, then the image height of an incident ray at the image sensor plane having the maximum zenith angle is given as $r_2=r(\theta_2)$. Here, the desirable image height is given by Eq. 73.

$$r(\theta_2) = \frac{B}{2}$$ [Math Figure 73]

Therefore, the image circle (2833) contacts the left edge (2813L) and the right edge (2813R) of the image sensor plane (2813). In this configuration, the imaging system uses the most out of the pixels on the image sensor plane and provides a satisfactory processed image plane.

FIG. 29 is an exemplary fisheye image acquired using a commercial fisheye lens having a 185° FOV, and FIG. 30 is an experimentally measured real projection scheme of this fisheye lens, wherein the image height on the unprocessed image plane is given as a function of the zenith angle θ of the incident ray as r'(θ)=gr(θ). If this fisheye lens is an ideal fisheye lens, then the graph in FIG. 30 must be given as a straight line. However, it can be noticed that the graph deviates considerably from a straight line. The real projection scheme shown in FIG. 30 can be given as a simple polynomial of the zenith angle θ as given in Eq. 74.

$$r(\theta) = a_1\theta + a_2\theta^2 + a_3\theta^3$$ [Math Figure 74]

Here, the unit of the zenith angle is radian. Table 3 shows the coefficients of the third order polynomial.

TABLE 3

| variable | value |
| --- | --- |
| $a_1$ | 561.5398 |
| $a_2$ | 18.5071 |
| $a_3$ | −30.3594 |

Due to the experimental measurement error, it is conjectured that the discrepancy between the approximate projection scheme given by Table 3 and the real projection scheme of the lens is larger than 3 pixels.

This algorithm can be verified using a scientific program such as the MatLab. Following is the algorithm for extracting a panoramic image having a horizontal FOV of 180° from the image given in FIG. 29.

```
% Image processing of a panoramic image.
%
%********** Real projection scheme ***************************
coeff = [−30.3594, 18.5071, 561.5398, 0.0];
%
% *** Read in the graphic image **********
picture = imread('image', 'jpg');
[Kmax, Lmax, Qmax] = size(picture);
CI = double(picture) + 1;
%
Lo = 1058; % x position of the optical axis in the raw image
Ko = 806; % y position of the optical axis in the raw image
%
% Draw an empty canvas
Jmax = 1600; % canvas width
Imax = 600; % canvas height
EI = zeros(Imax, Jmax, 3); % dark canvas
%
Jo = (1 + Jmax) / 2;
Io = 200;
Dpsi = pi;
A = (Jmax − 1) / Dpsi;
%
% Virtual screen
for I = 1 : Imax
    for J = 1 : Jmax
        p = J − Jo;
        q = I − Io;
        psi = p / A;
        delta = atan(q / A);
        phi = atan2(tan(delta), sin(psi));
        theta = acos(cos(delta) * cos(psi));
        r = polyval(coeff, theta);
        x = r * cos(phi) + Lo;
        y = r * sin(phi) + Ko;
        Km = floor(y);
        Kp = Km + 1;
        dK = y − Km;
        Lm = floor(x);
        Lp = Lm + 1;
        dL = x − Lm;
        if((Km >= 1) & (Kp <= Kmax) & (Lm >= 1) & (Lp <= Lmax))
            EI(I, J, :) = (1 − dK) * (1 − dL) * CI(Km, Lm, :) ...
                + dK * (1 − dL)* CI(Kp, Lm, :) ...
                + (1 − dK) * dL * CI(Km, Lp, :) ...
                + dK * dL * CI(Kp, Lp, :);
        else
            EI(I, J, :) = zeros(1, 1, 3);
        end
    end
end
DI = uint8(EI − 1);
imagesc(DI);
axis equal;
```

FIG. 31 is an exemplary panoramic image extracted using this algorithm, where the rectangular processed image plane is 1600 pixels wide in the lateral direction, and 600 pixels high in the longitudinal direction. The coordinate of the origin is (800.5, 200.5), and the horizontal FOV is 180°. Slight errors noticeable in FIG. 31 is mainly due to the error in aligning the optical axis parallel to the ground plane and the error in locating the position of the second intersection point.

Second Embodiment

As has been stated previously, a cylindrical projection scheme in the strict sense of the words is not used widely. Although it provides a mathematically most precise panoramic image, the image does not appear natural to the naked eye when the vertical FOV (i.e., $\Delta\delta=\delta_2-\delta_1$) is large.

The cylindrical projection scheme of the first embodiment can be generalized as follows. The lateral coordinate x" on the processed image plane is proportional to the horizontal incidence angle. Therefore, as in the first embodiment, a relation given in Eq. 75 holds.

$$A = \frac{W}{\Delta\psi} = \frac{x''}{\psi}$$ [Math Figure 75]

On the other hand, the longitudinal coordinate y" on the processed image plane is proportional to a monotonic function of the vertical incidence angle as given in Eq. 76.

$$y'' \propto F(\delta)$$ [Math Figure 76]

Here, $F(\delta)$ is a continuous and monotonic function of the vertical incidence angle $\delta$. Therefore, a relation given by Eq. 77 corresponding to the Eq. 22 holds as follows.

$$A = \frac{H}{F(\delta_2) - F(\delta_1)} = \frac{y''}{F(\delta)}$$ [Math Figure 77]

Therefore, the span of the horizontal incidence angle, the span of the vertical incidence angle, and the size of the processed image plane satisfy the following relation.

$$\frac{W}{H} = \frac{\Delta\psi}{F(\delta_2) - F(\delta_1)}$$ [Math Figure 78]

Also, the horizontal incidence angle corresponding to the third point on the processed image plane having a lateral coordinate x" and a longitudinal coordinate y" is given by Eq. 79, and the vertical incidence angle is given by Eq. 80.

$$\psi = \frac{x''}{A}$$ [Math Figure 79]

$$\delta = F^{-1}\left(\frac{y''}{A}\right)$$ [Math Figure 80]

Here, $F^{-1}$ is the inverse function of the function $F()$. The said cylindrical projection scheme in the first embodiment is a case where the function F is given by Eq. 81.

$$F(\delta) = \tan\delta$$ [Math Figure 81]

On the other hand, if the said general projection scheme is specifically an equi-rectangular projection scheme, then the said function is given by Eq. 82.

$$F(\delta) = \delta$$ [Math Figure 82]

Therefore, the ranges of the horizontal and the vertical incidence angles and the size of the processed image plane satisfy the following relation.

$$\frac{W}{H} = \frac{\Delta\psi}{\delta_2 - \delta_1}$$ [Math Figure 83]

Also, the vertical incidence angle is given by Eq. 84.

$$\delta = \frac{y''}{A}$$ [Math Figure 84]

On the other hand, if the said general projection scheme is specifically a Mercator projection scheme, then the said function is given by Eq. 85.

$$F(\delta) = \ln\left\{\tan\left(\frac{\delta}{2} + \frac{\pi}{4}\right)\right\}$$ [Math Figure 85]

Also, the ranges of the horizontal and the vertical incidence angles and the size of the processed image plane satisfy the following relation.

$$\frac{W}{H} = \frac{\Delta\psi}{\ln\left[\frac{\tan\left(\frac{\pi}{4} + \frac{\delta_2}{2}\right)}{\tan\left(\frac{\pi}{4} + \frac{\delta_1}{2}\right)}\right]}$$ [Math Figure 86]

On the other hand, the vertical incidence angle is given by Eq. 87.

$$\delta = 2\tan^{-1}\left[\exp\left(\frac{y''}{A}\right)\right] - \frac{\pi}{2}$$ [Math Figure 87]

As in the first embodiment of the present invention, considering the fact that the image sensor plane, the uncorrected image plane and the processed image plane are all digitized, the image processing methods of the first and the second embodiments are comprised of a stage of acquiring an uncorrected image plane while the optical axis of a camera mounted with a rotationally-symmetric wide-angle lens and the lateral sides of the image sensor plane are aligned parallel to the ground plane, and an image processing stage of extracting a processed image plane from the uncorrected image plane. Said uncorrected image plane is a two dimensional array having $K_{max}$ rows and $L_{max}$ columns, the pixel coordinate of the optical axis on the said uncorrected image plane is ($K_o$, $L_o$), and the real projection scheme of the said lens is given as a function given in Eq. 88.

$$r = r(\theta)$$ [Math Figure 88]

Here, the real projection scheme of the lens refers to the image height r obtained as a function of the zenith angle $\theta$ of the incident ray, and the magnification ratio g of the said camera is given by Eq. 89, wherein r' is a pixel distance on the uncorrected image plane corresponding to the image height r.

$$g = \frac{r'}{r}$$ [Math Figure 89]

Said processed image plane is a two dimensional array having $I_{max}$ rows and $J_{max}$ columns, the pixel coordinate of the optical axis on the processed image plane is $(I_o, J_o)$, and the horizontal incidence angle $\Psi_{I,J}=\Psi(I,J)\Psi_J$ of an incident ray corresponding to a pixel having a coordinate (I, J) on the said processed image plane is given by Eq. 90 as a sole function of the said pixel coordinate J.

$$\psi_J = \frac{\psi_{Jmax} - \psi_1}{J_{max} - 1}(J - J_o)$$ [Math Figure 90]

Here, $\Psi_1$ is a horizontal incidence angle corresponding to J=1, and $\Psi_{Jmax}$ is a horizontal incidence angle corresponding to J=$J_{max}$. On the other hand, the vertical incidence angle $\delta_{I,J}\equiv\delta(I, J)=\delta_I$ of the said incident ray is given by Eq. 91 as a sole function of the said pixel coordinate I.

$$\delta_I = F^{-1}\left\{\frac{\psi_{Jmax} - \psi_1}{J_{max} - 1}(I - I_o)\right\}$$ [Math Figure 91]

Here, $F^{-1}$ is the inverse function of a continuous and monotonically increasing function $F(\delta)$ of the incidence angle $\delta$, and the signal value of a pixel having a coordinate (I, J) on the said processed image plane is given by the signal value of a virtual pixel having a coordinate $(x'_{I,J}, y'_{I,J})$ on the uncorrected image plane, wherein the said coordinate $(x'_{I,J}, y'_{I,J})$ of the virtual pixel is obtained from the series of equations given in Eqs. 92 through 96.

$$\theta_{I,J} = \cos^{-1}(\cos \delta_I \cos \Psi_J)$$ [Math Figure 92]

$$\phi_{I,J} = \tan^{-1}\left(\frac{\tan\delta_I}{\sin\psi_J}\right)$$ [Math Figure 93]

$$r_{I,J} = r(\theta_{I,J})$$ [Math Figure 94]

$$x'_{I,J} = L_o + gr_{I,J}\cos\phi_{I,J}$$ [Math Figure 95]

$$y'_{I,J} = K_o + gr_{I,J}\sin\phi_{I,J}$$ [Math Figure 96]

If the projection scheme of the panoramic image is a cylindrical projection scheme, then the said function F is given by Eq. 97, and the said vertical incidence angle is given by Eq. 98.

$$F(\delta) = \tan \delta$$ [Math Figure 97]

$$\delta_I = \tan^{-1}\left\{\frac{\psi_{Jmax} - \psi_1}{J_{max} - 1}(I - I_o)\right\}$$ [Math Figure 98]

If the projection scheme of the panoramic image is an equi-rectangular projection scheme, then the said function F is given by Eq. 99, and the said vertical incidence angle is given by Eq. 100.

$$F(\delta) = \delta$$ [Math Figure 99]

$$\delta_I = \frac{\psi_{Jmax} - \psi_1}{J_{max} - 1}(I - I_o)$$ [Math Figure 100]

If the projection scheme of the panoramic image is a Mercator projection scheme, then the said function F is given by Eq. 101, and the said vertical incidence angle is given by Eq. 102.

$$F(\delta) = \ln\left\{\tan\left(\frac{\delta}{2} + \frac{\pi}{4}\right)\right\}$$ [Math Figure 101]

$$\delta_I = 2\tan^{-1}\left[\exp\left\{\frac{\psi_{Jmax} - \psi_1}{J_{max} - 1}(I - I_o)\right\}\right] - \frac{\pi}{2}$$ [Math Figure 102]

The procedure for finding the location of the image point corresponding to given horizontal and vertical incidence angles and interpolating the image is identical to the procedure given in Eqs. 63 through 71.

FIG. 32 is a panoramic image following an equi-rectangular projection scheme extracted from the fisheye image given in FIG. 26, and FIG. 33 is a panoramic image following a Mercator projection scheme. Especially in the panoramic image in FIG. 32 with an equi-rectangular projection scheme, the horizontal and the vertical FOVs are both 180°.

Third Embodiment

Field of view of typical wide-angle lenses used in security and surveillance area is 90° at the maximum, and a security lens having this amount of FOV generally exhibits a considerable degree of distortion. A lens having a FOV larger than this is not widely used because such a lens exhibits excessive distortion and causes psychological discomfort.

FIG. 34 is a conceptual drawing of an imaging system (3400) for monitoring the entire interior space using a typical wide-angle camera having a FOV near 90°. Usually, security cameras must be installed at a high place that is out of reach from the people. Therefore, in order to monitor the entire interior place while kept out of reach from the people, the camera (3410) is installed at a corner where the ceiling and two walls meet, and camera is facing down toward the interior. The optical axis (3401) of the camera is inclined both against a horizontal line and a vertical line, and the camera captures the objects (3467) at a slanted angle. When such a camera with a FOV near 90° is used, the region (3463) captured by the camera can contain the entire interior space, but there is a large difference in distances between the closer and the further sides, and visual information for the further side can be insufficient.

Usually, lighting (3471) is installed at an interior ceiling. Since typical wide-angle camera is installed facing down toward the interior at an angle, the said lighting is out of the field of view (3463) of the camera, and the intense rays (3473) from the lighting are not captured by the camera.

FIG. 35 is a diagram schematically illustrating the desirable size and the location of real image (3533) on an image sensor plane (3513) in the third embodiment of the present invention. The fisheye lens suitable for the present embodiment is a fisheye lens with a FOV greater than 180° and following an equidistance projection scheme. Furthermore, the intersection point O between the optical axis of the fisheye lens and the image sensor plane is located higher than the very center of the image sensor plane. If the maximum FOV of this fisheye lens is given as $2\theta_2$, then the image height of an incident ray at the image sensor plane having the maximum zenith angle is given as $r_2 \equiv r(\theta_2)$. Here, the desirable image height is given by Eq. 73. Desirably, the image cicle (3533) contacts the left edge (3513L), the right edge (3513R) and the bottom edge (3513B) of the image sensor plane (3513). In this configuration, the imaging system uses the most out of the pixels on the image sensor plane and monitors the entire interior space while installed near the ceiling of the interior space.

FIG. 36 is a conceptual drawing of a desirable installation state of an imaging system (3600) using an ultra wide-angle lens with a FOV larger than those of typical wide-angle lenses for the purpose of monitoring the entire interior space. If an ultra wide-angle lens with a FOV much larger than those of typical wide-angle lenses is used, then the camera needs not be installed at a slanted angle as in FIG. 34 in order to monitor the entire interior space.

In order to acquire a natural-looking panoramic image, the optical axis (3601) of the image acquisition means (3610) must be parallel to the ground plane. Also, the security camera must be installed at a high place that is out of reach from the people. Therefore, as schematically illustrated in FIG. 36, the camera must be installed at a high place below the ceiling with the optical axis aligned parallel to the ground plane. However, if the camera is installed in this way, then typically the half of the screen will be occupied by the ceiling, and the area below the ceiling that has to be monitored occupies only a portion of the screen. Therefore, through an arrangement of the image sensor plane shown in FIG. 35, the vertical FOV needs to be made asymmetrical. Furthermore, since the camera is installed horizontally, the lighting (3671) can be contained within the field of view (3663) of the camera. Since the image cannot be not satisfactory when such intense rays are captured by the camera, a cover (3675) blocking the region above the horizon as illustrated in FIG. 36 can be useful.

Under this physical environment, a panoramic image with a horizontal FOV around 180° can be obtained such as the ones shown in the first and the second embodiments of the present invention, while the vertical FOV is made asymmetrical. Also, a cylindrical projection scheme is desirable when the vertical FOV is near the standard FOV around 60°, and a Mercator projection scheme is desirable when the FOV is larger. Also, in an application example where any dead zone in the security monitoring either in the ceiling or the floor cannot be tolerated, then an equi-rectangular projection scheme can be used. In this case, the horizontal FOV as well as the vertical FOV will be both 180°.

Fourth Embodiment

FIG. 37 is a schematic diagram of an ordinary car rear view camera (3710). For a car rear view camera, it is rather common that a wide-angle lens with more than 150° FOV is used, and the optical axis of the lens is typically inclined toward the ground plane (3717) as illustrated in FIG. 37. By installing the camera in this way, parking lane can be easily recognized when backing up the car. Furthermore, since the lens surface is oriented downward toward the ground, precipitation of dust is prevented, and partial protection is provided from rain and snow.

It is desirable to install the image acquisition means (3710) of the fourth embodiment of the present invention on top of the trunk of a passenger car, and to align the optical axis at a certain angle with the ground plane. Furthermore, a fisheye lens with a FOV larger than 180° and following an equidistance projection scheme is most preferable, and the image display means is desirably installed next to the driver seat.

Using a wide-angle camera with its optical axis inclined toward the ground plane, it is possible to obtain a panoramic image such as those shown in the first and the second embodiments of the present invention. The world coordinate system of this embodiment takes the nodal point N of the imaging system (3710) as the origin, and takes a vertical line that is perpendicular to the ground plane (3717) as the Y-axis, and the Z-axis is set parallel to the car (3751) axle. According to the convention of right handed coordinate system, the positive direction of the X-axis is the direction directly plunging into the paper in FIG. 37. Therefore, if the lens optical axis is inclined below the horizon with an angle $\alpha$, then a coordinate system fixed to the camera has been rotated around the X-axis of the world coordinate system by angle $\alpha$. This coordinate system is referred to as the first world coordinate system, and the three axes of this first world coordinate system are named as X', Y' and Z'-axis, respectively. In FIG. 37, it appears that the first world coordinate system has been rotated around the X-axis clockwise by angle $\alpha$ relative to the world coordinate system. However, considering the direction of the positive X-axis, it has been in fact rotated counterclockwise by angle $\alpha$. Since direction of rotation considers counterclockwise rotation as the positive direction, the first world coordinate system in FIG. 37 has been rotated by $+\alpha$ around the X-axis of the world coordinate system.

Regarding the rotation of coordinate system, it is convenient to use the Euler matrices. For this, the coordinate of an object point Q in a three-dimensional space is designated as a three-dimensional vector as given below.

$$\vec{Q} = \begin{pmatrix} X \\ Y \\ Z \end{pmatrix} \quad \text{[Math Figure 103]}$$

Here, $\vec{Q}$ represents a vector in the world coordinate system starting at the origin and ending at the point Q in the three-dimensional space. Then, the coordinate of a new point obtainable by rotating the point Q in the space by an angle $-\alpha$ around the X-axis is given by multiplying the matrix given in Eq. 104 on the above vector.

$$M_X(\alpha) = \begin{pmatrix} 1 & 0 & 0 \\ 0 & \cos\alpha & \sin\alpha \\ 0 & -\sin\alpha & \cos\alpha \end{pmatrix} \quad \text{[Math Figure 104]}$$

Likewise, the matrix given in Eq. 105 can be used to find the coordinate of a new point which is obtainable by rotating the point Q by angle $-\beta$ around the Y-axis, and the matrix given in Eq. 106 can be used to find the coordinate of a new point which is obtainable by rotating the point Q by angle $-\gamma$ around the Z-axis.

$$M_Y(\beta) = \begin{pmatrix} \cos\beta & 0 & -\sin\beta \\ 0 & 1 & 0 \\ \sin\beta & 0 & \cos\beta \end{pmatrix}$$ [Math Figure 105]

$$M_Z(\gamma) = \begin{pmatrix} \cos\gamma & \sin\gamma & 0 \\ -\sin\gamma & \cos\gamma & 0 \\ 0 & 0 & 1 \end{pmatrix}$$ [Math Figure 106]

Matrices in Eqs. 104 through 106 can describe the case where the coordinate system is fixed and the point in space has been rotated, but also the same matrices can describe the case where the point in space is fixed and the coordinate system has been rotated in the reverse direction. These two cases are mathematically equivalent. Therefore, the coordinate of a point Q in the first world coordinate system that is obtained by rotating the world coordinate system by angle $\alpha$ around the X-axis as indicated in FIG. 37 is given by Eq. 107.

$$\vec{Q}' = \begin{pmatrix} X' \\ Y' \\ Z' \end{pmatrix} = M_X(\alpha) \begin{pmatrix} X \\ Y \\ Z \end{pmatrix}$$ [Math Figure 107]

Using the matrix given in Eq. 104, the coordinate in the first world coordinate system can be given as follows in terms of the coordinate in the world coordinate system.

$X' = X$ [Math Figure 108]

$Y' = Y\cos\alpha + Z\sin\alpha$ [Math Figure 109]

$Z' = -Y\sin\alpha + Z\cos\alpha$ [Math Figure 110]

Referring to FIG. 37, let's assume that an imaging system has been installed with its optical axis inclined toward the ground plane, and nevertheless, it is desired to obtain a panoramic image that is parallel to the ground plane. FIG. 38 is a wide-angle image with $\alpha = 30°$. In this case, the following algorithm can be used to obtain a panoramic image that is parallel to the ground plane. First, under the assumption that the said imaging system is parallel to the ground plane, the size of the processed image plane, the location of the intersection point, and the field of view are determined by the same method as in the examples of the previous embodiments. Then, the horizontal incidence angle corresponding to the lateral coordinate x" on the processed image plane and the vertical incidence angle corresponding to the longitudinal coordinate y" are given by Eqs. 111 through 113.

$$\psi = \frac{x''}{A}$$ [Math Figure 111]

$$A = \frac{W}{\Delta\psi}$$ [Math Figure 112]

$$\delta = F^{-1}\left(\frac{y''}{A}\right)$$ [Math Figure 113]

Next, it is assumed that an incident ray having these horizontal and vertical incidence angles has been originated from an object point on a hemisphere with a radius 1 and having its center at the nodal point of the lens. Then, the coordinate of the said object point in the world coordinate system is given by Eqs. 114 through 116.

$X = \cos\delta \sin\Psi$ [Math Figure 114]

$Y = \sin\delta$ [Math Figure 115]

$Z = \cos\delta \cos\Psi$ [Math Figure 116]

The coordinate of this object point in the first world coordinate system is given by Eqs. 108 through 110. The X', Y' and Z'-axes of this first world coordinate system are parallel to the x, y, and z-axes of the first rectangular coordinate system, respectively. Therefore, the zenith and the azimuth angles of the incident ray are given by Eqs. 117 and 118 by the same method in the first embodiment.

$\theta = \cos^{-1}(Z')$ [Math Figure 117]

$$\phi = \tan^{-1}\left(\frac{Y'}{X'}\right)$$ [Math Figure 118]

Finally, the location of the first point on the image sensor plane having these zenith and azimuth angles can be obtained by the same methods as in the first and the second embodiments.

Identical to the previous examples, considering the fact that all the image sensors and display devices are digital devices, image processing procedure must use the following set of equations. After a series of preparatory stages have been taken as in the first and the second embodiments, the desirable size of the processed image plane and the location ($I_o$, $J_o$) of the third intersection point are determined, and then the horizontal incidence angle $\Psi_J$ and the vertical incidence angle $\delta_1$ given by Eqs. 119 and 120 are computed for all the pixels (I, J) on the said processed image plane.

$$\psi_J = \frac{\psi_{Jmax} - \psi_1}{J_{max} - 1}(J - J_o)$$ [Math Figure 119]

$$\delta_I = F^{-1}\left\{\frac{\psi_{Jmax} - \psi_1}{J_{max} - 1}(I - I_o)\right\}$$ [Math Figure 120]

From these horizontal and vertical incidence angles, the coordinate of an imaginary object point in the world coordinate system is calculated using Eqs. 121 through 123.

$X_{I,J} = \cos\delta_1 \sin\Psi_J$ [Math Figure 121]

$Y_{I,J} = \sin\delta_1$ [Math Figure 122]

$Z_{I,J} = \cos\delta_1 \cos\Psi_J$ [Math Figure 123]

From this coordinate of the object point in the world coordinate system, the coordinate of the object point in the first world coordinate system is obtained using Eqs. 124 through 126.

$X'_{I,J} = X_{I,J}$ [Math Figure 124]

$Y'_{I,J} = Y_{I,J}\cos\alpha + Z_{I,J}\sin\alpha$ [Math Figure 125]

$Z'_{I,J} = -Y_{I,J}\sin\alpha + Z_{I,J}\cos\alpha$ [Math Figure 126]

From this coordinate, the zenith angle $\theta_{I,J}$ and the azimuth angle $\Phi_{I,J}$ of the incident ray are computed using Eqs. 127 and 128.

$$\theta_{I,J} = \cos^{-1}(Z'_{I,J}) \qquad \text{[Math Figure 127]}$$

$$\phi_{I,J} = \tan^{-1}\left(\frac{Y'_{I,J}}{X'_{I,J}}\right) \qquad \text{[Math Figure 128]}$$

Next, the image height $r_{I,J}$ on the image sensor plane is calculated using Eq. 129.

$$r_{I,J} = r(\theta_{I,J}) \qquad \text{[Math Figure 129]}$$

Then, the position $(K_o, L_o)$ of the second intersection point on the uncorrected image plane and the magnification ratio g are used to find the position of the second point on the uncorrected image plane.

$$x'_{I,J} = L_o + g r_{I,J} \cos(\phi_{I,J})$$

$$y'_{I,J} = K_o + g r_{I,J} \sin(\phi_{I,J}) \qquad \text{[Math Figure 131]}$$

Once the position of the corresponding second point has been found, then interpolation methods such as described in the first and the second embodiments can be used to obtain a panoramic image.

FIG. 39 is a panoramic image obtained using this method where a cylindrical projection scheme has been employed. As can be seen from FIG. 39, a panoramic image identical to that in the first embodiment has been obtained despite the fact that the optical axis is not parallel to the ground plane. Using such a panoramic imaging system as a car rear view camera, the backside of a vehicle can be entirely monitored without any dead spot.

One point which needs special attention when using such an imaging system as a car rear view camera is the fact that for a device (i.e., a car) of which the moving direction is the exact opposite of the optical axis direction of the image acquisition means, it can cause a great confusion to the driver if a panoramic image obtained by the methods in the first through the fourth embodiments is displayed without any further processing. Since a car rear view camera is heading toward the backside of the car, the right end of the car appears as the left end on a monitor showing the images captured by the rear view camera. However, the driver can fool himself by thinking that the image is showing the left end of the car from his own viewpoint of looking at the front end of the car, and thus, there is a great danger of possible accidents. To prevent such a perilous confusion, it is important to switch the left and the right sides of the image obtained using a car rear view camera before displaying it on the monitor. The video signal S'(I, J) for the pixel in the mirrored (i.e., the left and the right sides are exchanged) processed image plane with a coordinate (I, J) is given by the video signal $S(I, J_{max}-J+1)$ from the pixel in the processed image plane with a coordinate $(I, J_{max}-J+1)$.

$$S'(I,J) = S(I, J_{max}-J+1) \qquad \text{[Math Figure 132]}$$

On the other hand, an identical system can be installed near the room mirror, frontal bumper, or the radiator grill in order to be used as a recording camera connected to a car black box for the purpose of recording vehicle's driving history.

Above embodiment has been described in relation to a car rear view camera, but it must be obvious that the usefulness of the invention described in this embodiment is not limited to a car rear view camera.

Fifth Embodiment

For large buses and trucks, it is necessary to monitor the lateral sides of the vehicle as well as the rear side of the vehicle. Such a side monitoring imaging system will be especially useful when making a turn in a narrow alley, or when changing lanes in a highway. Also, it will be useful as a security-monitoring camera for the purpose of preventing accidents when passengers are boarding on the bus or getting off from the bus. FIG. 40 is a conceptual drawing of such a device, and it shows an aerial view of the device seen from above. When image acquisition means of the present invention, in other words, video cameras equipped with an equidistance projection fisheye lens with 180° FOV, are installed near the top of the front, the rear, and the two side walls of the said vehicle (4051), then each camera monitors 180° on their respective walls without any dead spot, and as a whole, the entire surroundings of the vehicle can be monitored without any dead zone. Also, by installing cameras in the same way on the outer walls of a building, all the directions can be monitored without any dead zone. The optical axes of the cameras can be parallel to the ground plane as in the first through the third embodiments of the present invention, or it can be slanted at an angle as in the fourth embodiment.

Sixth Embodiment

FIG. 41 illustrates an application example where the longitudinal side of the image sensor plane may not be perpendicular to the ground plane. If a wide-angle camera (4110) is installed on a motorcycle (4151) shown in FIG. 41 for the purpose of recording the driving history, the longitudinal side of the image sensor plane can happen to be not perpendicular to the ground plane (4117). Illustrated in FIG. 41 is a case where the X-axis of the world coordinate system that is fixed to the ground plane and the x-axis of the first rectangular coordinate system that is fixed to the motorcycle differ by an angle γ. Especially, if the motorcycle has to change its moving direction, then the motorcycle has to be inclined toward that direction, and therefore, such a situation inevitably occurs. Similar situations occur for a ship floating in a sea with high waves, or for an airplane or an UAV (unmanned aerial vehicle) performing acrobatic flights. Also, identical situation can occur for a vehicle on an excessively slanted road.

FIG. 42 is an imaginary fisheye image acquired using an imaging system, whereof the longitudinal sides of the image sensor plane are slanted by 20° with respect to a vertical line. On the other hand, FIG. 43 is a panoramic image following a cylindrical projection scheme described in the first embodiment extracted from the image given in FIG. 42. As can be seen from FIG. 43, the image appears quite unnatural. This is because the imaging systems in the first and the second embodiments are imaging systems that capture straight lines parallel to the longitudinal sides of the image sensor plane as straight lines, and therefore, desirable panoramic image cannot be obtained if a vertical line and the longitudinal sides of the image sensor plane are not parallel to each other.

FIG. 44 is a diagram schematically illustrating the desirable size and the location of real image (4433) on the image sensor plane (4413) according to the sixth embodiment of the present invention. The fisheye lens suitable for the present embodiment is a fisheye lens with a FOV greater than 180° and following an equidistance projection scheme. Furthermore, the intersection point O between the optical axis of the fisheye lens and the image sensor plane is located at the center of the image sensor plane. Therefore, the range of the lateral coordinate is (−B/2≤x≤B/2), and the range of the longitudinal coordinate is (−V/2≤y≤V/2).

If the maximum FOV of this fisheye lens is given as $2\theta_2$, then the image height of an incident ray on the image sensor plane having the maximum zenith angle is given as $r_2 \equiv r(\theta_2)$. Here, the desirable image height is given by Eq. 133.

$$r(\theta_2) = \frac{V}{2}$$ [Math Figure 133]

Therefore, the image cicle (4433) contacts the top edge (4413T) and the bottom edge (4413B) of the image sensor plane (4413). In this configuration, always the same horizontal FOV can be obtained even if the imaging system is slanted at an arbitrary angle with respect to the ground plane.

FIG. 45 is a schematic diagram of the sixth embodiment of the present invention, which is a device that mainly includes an image acquisition means (4510), an image processing means (4516), image display means (4517) as well as a direction sensing means (4561). Said direction sensing means (4561) indicates the slanting angle γ between the first rectangular coordinate system describing the said image acquisition means and the world coordinate system describing the objects around the imaging system. Here, the angle γ is the slanting angle between the X-axis of the world coordinate system and the x-axis of the first rectangular coordinate system, or the slanting angle between the Y-axis of the world coordinate system and the minus (−) y-axis of the first rectangular coordinate system. Since said direction sensing means are widespread as to be embedded in most of the camera phones and digital cameras, a detailed description will be omitted. The device of the sixth embodiment of the present invention is characterized in that it provides a panoramic image referencing on the Y-axis of the world coordinate system using the angle γ obtained from the said direction sensing means.

Referring to FIG. 46, the third point P" on the processed image plane (4635) has a rectangular coordinate (x", y"). Incidentally, if the longitudinal sides of the processed image plane is parallel to the Y-axis of the world coordinate system, then the coordinate of this third point will be comprised of a lateral coordinate x''' given by Eq. 134 and a longitudinal coordinate y''' given by Eq. 135.

$$x'''=x'' \cos\gamma + y'' \sin\gamma$$ [Math Figure 134]

$$y'''=-x'' \sin\gamma + y'' \cos\gamma$$ [Math Figure 135]

Therefore, the horizontal and the vertical incidence angles of an incident ray corresponding to this third point must be given by Eq. 136 and Eq. 137, respectively.

$$\psi = \frac{\Delta\psi}{W} x''' = \frac{x'''}{A}$$ [Math Figure 136]

$$\delta = F^{-1}\left(\frac{y'''}{A}\right)$$ [Math Figure 137]

Therefore, the signal value of the third point on the processed image plane having an ideal projection scheme must be the signal value of an image point on the image sensor plane formed by an incident ray originated from an object point on the object plane having a horizontal incidence angle (i.e., the longitude) given by Eq. 136 and a vertical incidence angle (i.e., the latitude) given by Eq. 137. The zenith angle of this incident ray is given by Eq. 138, the azimuth angle is given by Eq. 139, and the image height is given by Eq. 140.

$$\theta = \cos^{-1}(\cos\delta \cos\Psi)$$ [Math Figure 138]

$$\phi = \tan^{-1}\left(\frac{\tan\delta}{\sin\psi}\right)$$ [Math Figure 139]

$$r = r(\theta)$$ [Math Figure 140]

The image point corresponding to an object point having these zenith and azimuth angles has a two-dimensional rectangular coordinate given by Eqs. 141 and 142 in the second rectangular coordinate system, which is a coordinate system with the axes rotated by angle γ with respect to the Y-axis.

$$x' = gr(\theta)\cos(\gamma+\phi)$$ [Math Figure 141]

$$y' = gr(\theta)\sin(\gamma+\phi)$$ [Math Figure 142]

Therefore, it suffice to assign the signal value of an image point on the uncorrected image plane having this rectangular coordinate as the signal value of the third point on the processed image plane.

Identical to the previous examples, considering the fact that all the image sensors and display devices are digital devices, image processing procedure must use the following set of equations. After a series of preparatory stages have been taken as in the first through the fifth embodiments, the desirable size of the processed image plane and the location ($I_o$, $J_o$) of the third intersection point are determined, and then the horizontal incidence angle $\Psi_{I,J}$ and the vertical incidence angle $\delta_{I,J}$ given by Eqs. 143 and 144 are computed for all the pixels (I, J) on the said processed image plane.

$$\psi_{I,J} = \frac{\psi_{Jmax} - \psi_1}{J_{max} - 1}\{(J - J_0)\cos\gamma + (I - I_0)\sin\gamma\}$$ [Math Figure 143]

$$\delta_{I,J} = F^{-1}\left[\frac{\psi_{Jmax} - \psi_1}{J_{max} - 1}\{-(J - J_0)\sin\gamma + (I - I_0)\cos\gamma\}\right]$$ [Math Figure 144]

From these horizontal and vertical incidence angles, the zenith angle $\theta_{I,J}$ and the azimuth angle $\phi_{I,J}$ of an incident ray in the world coordinate system are calculated using Eqs. 145 and 146.

$$\theta_{I,J} = \cos^{-1}(\cos\delta_{I,J} \cos\Psi_{I,J})$$ [Math Figure 145]

$$\phi_{I,J} = \tan^{-1}\left(\frac{\tan\delta_{I,J}}{\sin\psi_{I,J}}\right)$$ [Math Figure 146]

Next, the image height $r_{I,J}$ on the image sensor plane is calculated using Eq. 147.

$$r_{I,J} = r(\theta_{I,J})$$ [Math Figure 147]

Next, the position ($K_o$, $L_o$) of the second intersection point on the uncorrected image plane and the magnification ratio g are used to find the position of the second point on the uncorrected image plane.

$$x'_{I,J}=L_o+gr_{I,J}\cos(\gamma+\theta_{I,J})$$ [Math Figure 148]

$$y'_{I,J}=K_o+gr_{I,J}\sin(\gamma+\theta_{I,J})$$ [Math Figure 149]

Once the position of the corresponding second point has been found, then interpolation methods such as described in the first through the third embodiments can be used to obtain a panoramic image.

The desirable examples of the monotonically increasing function F(δ) of the incidence angle in this embodiment can be given by Eqs. 97, 99 and 101. FIG. 47 is a panoramic image acquired using this method, and a cylindrical projection scheme given in Eq. 97 has been used. As can be seen from FIG. 47, vertical lines appear as straight lines slanted at an angle γ. Such an imaging system provides a satisfactory panoramic image as well as an accurate feedback about the vertical direction.

Seventh Embodiment

When an airplane takes off from the ground, or when it is landing down, or when it is making a turn, the airplane body is leaning sideways as well as toward the moving direction. FIGS. 48 and 49 illustrate such an application example. The imaging system is assumed as has been installed parallel to the airplane body. The world coordinate system of the present embodiment takes the nodal point of the imaging system as the origin, and takes a vertical line that is perpendicular to the ground plane as the Y-axis, and the direction the airplane is heading while the airplane is maintaining its body in a horizontal posture is the direction of the Z-axis. Incidentally, if the airplane is leaning forward by an angle α, then a coordinate system fixed to the airplane has been rotated by angle α around the X-axis of the world coordinate system. This coordinate system is the first world coordinate system, and the three axes of this first world coordinate system are referred to as X', Y', and Z'-axis, respectively. On the other hand, if the airplane has been also inclined laterally by angle γ as has been illustrated in FIG. 49, then a coordinate system fixed to the airplane has been rotated by angle γ around the Z'-axis of the first world coordinate system. This coordinate system is called as the second world coordinate system, and the three axes of this second world coordinate system are referred to as X", Y", and Z"-axis, respectively.

Regarding the rotation of coordinate system, it is convenient to use the Euler matrices as in the fourth embodiment. The coordinate of the said one point in the first world coordinate system, which is a coordinate system that has been rotated by angle α around the X-axis as shown in FIG. 48, is given by Eq. 150.

$$\vec{Q}' = \begin{pmatrix} X' \\ Y' \\ Z' \end{pmatrix} = M_X(\alpha) \begin{pmatrix} X \\ Y \\ Z \end{pmatrix}$$ [Math Figure 150]

On the other hand, referring to FIG. 49, the second world coordinate system is the first world coordinate system that has been rotated by angle γ around the Z'-axis of the first world coordinate system. Therefore, the coordinate of the said one point in the second world coordinate system is given by Eq. 151.

$$\vec{Q}'' = \begin{pmatrix} X'' \\ Y'' \\ Z'' \end{pmatrix} = M_{Z'}(\gamma)\vec{Q}' = M_{Z'}(\gamma)M_X(\alpha)\begin{pmatrix} X \\ Y \\ Z \end{pmatrix}$$ [Math Figure 151]

Here, a rotational operation by angle γ around the Z'-axis is a completely different operation from a rotational operation by angle γ around the Z-axis. However, using the Euler matrices, a rotational matrix referring to the axes in the first world coordinate system can be written in terms of rotational matrices in the world coordinate system.

$$M_{Z'}(\gamma)=M_X(\alpha)M_Z(\gamma)M_X(-\alpha)$$ [Math Figure 152]

Therefore, Eq. 151 can be simplified as follows.

$$\begin{pmatrix} X'' \\ Y'' \\ Z'' \end{pmatrix} = M_X(\alpha)M_Z(\gamma)\begin{pmatrix} X \\ Y \\ Z \end{pmatrix}$$ [Math Figure 153]

Using the rotational matrices given in Eqs. 104 and 106, the coordinate in the second world coordinate system can be written in terms of the coordinate in the world coordinate system as follows.

$$X''=X\cos\gamma+Y\sin\gamma$$ [Math Figure 154]

$$Y''=-X\cos\alpha\sin\gamma+Y\cos\alpha\cos\gamma+Z\sin\alpha$$ [Math Figure 155]

$$Z''=X\sin\alpha\sin\gamma-Y\sin\alpha\cos\gamma+Z\cos\alpha$$ [Math Figure 156]

Referring to FIGS. 48 and 49, let's assume that an imaging system has been installed parallel to the airplane body, and let's further assume that it is desired to obtain a panoramic image that is parallel to the ground plane, irrespective of the inclination of the airplane to the ground plane. Such a configuration can be useful when it is required to monitor the area around the horizon at all times, including the time when the airplane is taking off from the ground, landing down, or making a turn. Also, the same demands may exist for motorcycles or ships, and it may be necessary to monitor the area around the horizon at all times by military purposes, such as by interceptor missiles.

If a wide-angle imaging system is installed parallel to the body of a device such as an airplane and a ship as illustrated in FIG. 48, then a panoramic image can not be obtained from an image acquired using such a fisheye lens by the methods described in the first through the sixth embodiments of the present invention. FIG. 50 shows an exemplary wide-angle image when the leaning angles are given as α=30° and γ=40°.

In this case, the following algorithm can be used to obtain a panoramic image that is parallel to the ground plane irrespective of the inclination angles of the device. First, such a system needs a direction sensing means as in the sixth embodiment, and this direction sensing means must provide two angular values α and γ to the image processing means.

Then, under the assumption that the said imaging system is parallel to the ground plane, the size of the processed image plane, the location of the intersection point, and the field of view are determined by the same method as in the examples of the previous embodiments. Therefore, the horizontal incidence angle corresponding to the lateral coordinate x" on the processed image plane and the vertical incidence angle corresponding to the longitudinal coordinate y" are given by Eqs. 157 through 159.

$$\psi = \frac{x''}{A} \quad \text{[Math Figure 157]}$$

$$A = \frac{W}{\Delta \psi} \quad \text{[Math Figure 158]}$$

$$\delta = F^{-1}\left(\frac{y''}{A}\right) \quad \text{[Math Figure 159]}$$

Next, it is assumed that an incident ray having these horizontal and vertical incidence angles has been originated from an object point on a hemisphere with a radius 1 and having its center at the nodal point of the said lens. Then, the coordinate of the said object point in the world coordinate system is given by Eqs. 160 through 162.

$$X = \cos \delta \sin \Psi \quad \text{[Math Figure 160]}$$

$$Y = \sin \delta \quad \text{[Math Figure 161]}$$

$$Z = \cos \delta \cos \Psi \quad \text{[Math Figure 162]}$$

The coordinate of this object point in the second world coordinate system is given by Eqs. 154 through 156. The X'', Y'' and Z''-axes of this second world coordinate system are parallel to the x, y, and z-axes of the first rectangular coordinate system, respectively. Therefore, the zenith and the azimuth angles of the incident ray are given by Eqs. 163 and 164 by the same method of the first embodiment.

$$\theta = \cos^{-1}(Z'') \quad \text{[Math Figure 163]}$$

$$\phi = \tan^{-1}\left(\frac{Y''}{X''}\right) \quad \text{[Math Figure 164]}$$

Finally, the location of the first point on the image sensor plane having these zenith and azimuth angles can be obtained by the same methods as in the first through the fourth embodiments.

Identical to the previous examples, considering the fact that all the image sensors and display devices are digital devices, image processing procedure must use the following set of equations. After a series of preparatory stages have been taken as in the first through the fourth embodiments, the desirable size of the processed image plane and the location $(I_o, J_o)$ of the third intersection point are determined, and then the horizontal incidence angle $\Psi_J$ and the vertical incidence angle $\delta_I$ given by Eqs. 165 and 166 are computed for all the pixels (I, J) on the said processed image plane.

$$\psi_J = \frac{\psi_{Jmax} - \psi_1}{J_{max} - 1}(J - J_o) \quad \text{[Math Figure 165]}$$

$$\delta_I = F^{-1}\left\{\frac{\psi_{Jmax} - \psi_1}{J_{max} - 1}(I - I_o)\right\} \quad \text{[Math Figure 166]}$$

From these horizontal and vertical incidence angles, the coordinate of the imaginary object point in the world coordinate system is calculated using Eqs. 167 through 169.

$$X_{I,J} = \cos \delta_1 \sin \Psi_J \quad \text{[Math Figure 167]}$$

$$Y_{I,J} = \sin \delta_1 \quad \text{[Math Figure 168]}$$

$$Z_{I,J} = \cos \delta_1 \cos \Psi_J \quad \text{[Math Figure 169]}$$

From this coordinate of the object point in the world coordinate system, the coordinate of the object point in the second world coordinate system is obtained using Eqs. 170 through 172.

$$X''_{I,J} = X_{I,J} \cos \gamma + Y_{I,J} \sin \gamma \quad \text{[Math Figure 170]}$$

$$Y''_{I,J} = -X_{I,J} \cos \alpha \sin \gamma + Y_{I,J} \cos \alpha \cos \gamma + Z_{I,J} \sin \alpha \quad \text{[Math Figure 171]}$$

$$Z''_{I,J} = X_{I,J} \sin \alpha \sin \gamma - Y_{I,J} \sin \alpha \cos \gamma + Z_{I,J} \cos \alpha \quad \text{[Math Figure 172]}$$

From this coordinate, the zenith angle $\theta_{I,J}$ and the azimuth angle $\phi_{I,J}$ of the incident ray, are computed using Eqs. 173 and 174.

$$\theta_{I,J} = \cos^{-1}(Z''_{I,J}) \quad \text{[Math Figure 173]}$$

$$\phi_{I,J} = \tan^{-1}\left(\frac{Y''_{I,J}}{X''_{I,J}}\right) \quad \text{[Math Figure 174]}$$

Next, the image height $r_{I,J}$ on the image sensor plane is calculated using Eq. 175.

$$r_{I,J} = r(\theta_{I,J}) \quad \text{[Math Figure 175]}$$

Then, the position $(K_o, L_o)$ of the second intersection point on the uncorrected image plane and the magnification ratio g are used to find the position of the second point on the uncorrected image plane.

$$x'_{I,J} = L_o + g r_{I,J} \cos(\phi_{I,J}) \quad \text{[Math Figure 176]}$$

$$y'_{I,J} = K_o + g r_{I,J} \sin(\phi_{I,J}) \quad \text{[Math Figure 177]}$$

Once the position of the corresponding first point has been found, then interpolation methods such as described in the first and the second embodiments can be used to obtain a panoramic image.

The desirable examples of the monotonically increasing function $F(\delta)$ of the incidence angle in this embodiment can be given by Eqs. 97, 99 and 101. FIG. 51 is a panoramic image acquired using this method, and a Mercator projection scheme given in Eq. 101 has been used. As can be seen from FIG. 51, vertical lines all appear as vertical lines.

It can be seen that the fourth embodiment is a special case of the seventh embodiment. In other words, the fourth embodiment is the seventh embodiment with a constraint of $\gamma = 0°$.

Eighth Embodiment

Figure 1:
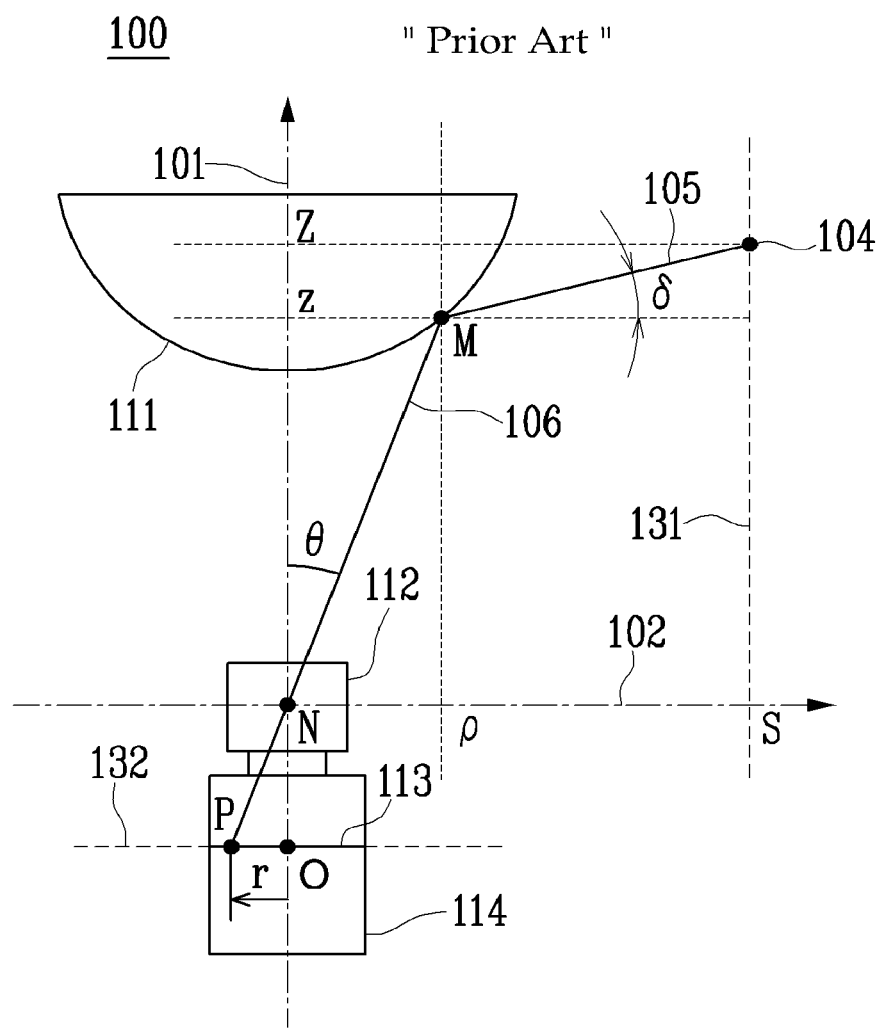
FIG. 1 is a schematic diagram of a catadioptric panoramic imaging system of a prior art.
Figure 2:
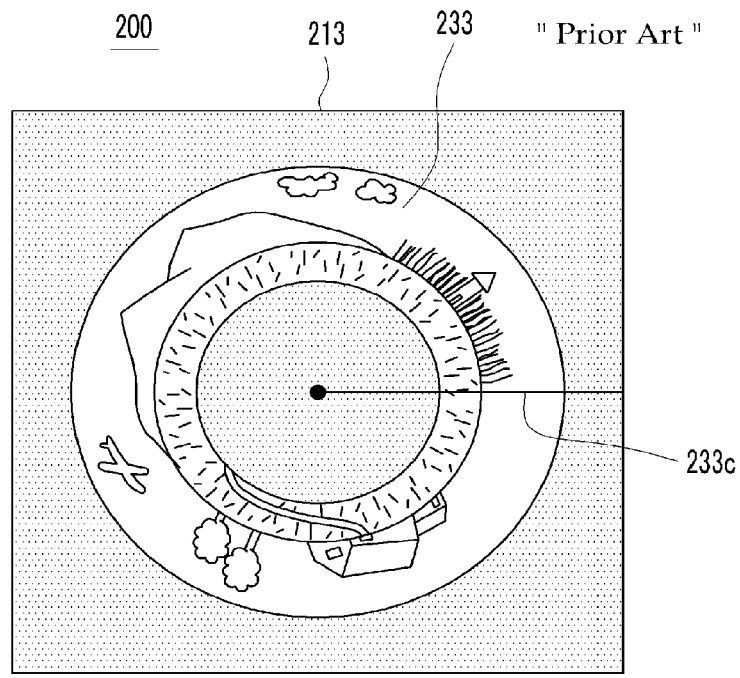
FIG. 2 is a conceptual drawing of an exemplary raw panoramic image acquired using the catadioptric panoramic imaging system schematically illustrated in FIG. 1.

FIG. 52 is a conceptual drawing of an object plane according to the eighth embodiment of the present invention. In this embodiment, a wide-angle lens is used to obtain the views of every 360° direction from an observer, and it is preferable that the optical axis (5201) of the wide-angle lens is perpendicular to the ground plane. Furthermore, all kind of wide-angle lenses that are rotationally symmetric about optical axes can be used, which include a refractive fisheye lens with a stereographic projection scheme shown in FIG. 53, a catadioptric fisheye lens with a stereographic projection scheme shown in FIG. 54, and a catadioptric panoramic lens schematically illustrated in FIG. 1, as well as a fisheye lens with an equidistance projection scheme.

In this embodiment, a celestial sphere (5230) with a radius S is assumed that takes the nodal point N of the lens as the center of the sphere. When all the points (5209) having a latitude angle χ from the ground plane (5217), i.e., the X-Y plane, are marked, then the collection of these points form a small circle (5239) on the celestial sphere. A cone is further assumed, whereof the tangential points with this celestial sphere comprise the said small circle. Then, the vertex half-angle of this cone is also χ, and the rotational symmetry axis of the cone coincides with the Z-axis. Hereinafter, this vertex half-angle is referred to as the reference angle.

FIG. 55 shows a cross-section of the said cone in an incidence plane containing the Z-axis. An object point (5504) on the said cone has an elevation angle μ with respect to a line segment connecting the nodal point N of the lens and the said tangential point (5509). The panoramic imaging system of the present embodiment is an imaging system taking a part of the said cone having an elevation angle between $μ_1$ and $μ_2$ with respect to the said tangential point as an object plane (5531).

The elevation angle and the azimuth angle of an incident ray originating from the said object point (5504) on the object plane can be obtained by the following method. Identical to the first embodiment, a vector from the origin N in the world coordinate system to the said object point (5504) on the object plane can be written as $\vec{R}$. The direction of this vector is the exact opposite of the propagation direction of the incident ray, and this vector can be written in the world coordinate system as in Eq. 178.

$$\vec{R} = R\hat{R}(\theta, \phi) = X\hat{X} + Y\hat{Y} + Z\hat{Z}$$ [Math Figure 178]

In Eq. 178, $\hat{X}=(1,0,0)$ is the unit vector along the X-axis direction, and likewise, $\hat{Y}=(0,1,0)$ and $\hat{Z}=(0,0,1)$ are the unit vectors along the Y-axis and the Z-axis directions, respectively, and $\hat{R}$ is the direction vector of the said vector, and R is the size of the said vector. Then, the following relations hold between the rectangular coordinate and the polar coordinate.

$$X = \hat{X} \cdot \vec{R} = R \sin\theta \cos\phi$$ [Math Figure 179]

$$Y = \hat{Y} \cdot \vec{R} = R \sin\theta \sin\phi$$ [Math Figure 180]

$$Z = \hat{Z} \cdot \vec{R} = R \cos\theta$$ [Math Figure 181]

Therefore, using Eqs. 179 through 181, the zenith angle θ and the azimuth angle φ of the incident ray can be obtained from the rectangular coordinate (X, Y, Z) of the object point.

$$\phi = \tan^{-1}\left(\frac{Y}{X}\right)$$ [Math Figure 182]

$$\theta = \frac{\pi}{2} - \tan^{-1}\left(\frac{Z}{\sqrt{X^2 + Y^2}}\right)$$ [Math Figure 183]

Furthermore, referring to FIG. 55, the zenith angle θ and the elevation angle μ of the incident ray satisfy the relation given in Eq. 184.

$$\mu = \frac{\pi}{2} - \theta - \chi$$ [Math Figure 184]

FIG. 56 is a conceptual drawing of an uncorrected image plane according to the eighth embodiment of the present invention, and FIG. 57 is a conceptual drawing of a processed image plane. As has been marked in FIG. 57, the lateral dimension of the processed image plane is W, and the longitudinal dimension is H. Unlike in the examples of the previous embodiments, the reference point O″ on the processed image plane does not correspond to the intersection point between the optical axis and the image sensor plane, but corresponds to the intersection point between the said small circle (5239) and the X-Z plane (i.e., the reference plane). The coordinate of the said reference point is ($x″_o$, $y″_o$). Furthermore, the lateral distance from the said reference point to the third point P″ on the processed image plane is proportional to the azimuth angle of the said object point (5504), and the longitudinal distance is proportional to a monotonic function G(μ) of the elevation angle passing through the origin. If the longitudinal distance in the processed image plane is made proportional to the longitudinal distance in the object plane, then the said monotonic function is given by Eq. 185.

$$G(\mu) = \tan \mu$$

Eq. 185 has the same geometrical meaning as in the first embodiment of the present invention.

The distance from the said tangential point (5509) to the optical axis, in other words, the axial radius (5537), is given as S cos χ. In this embodiment, this distance is considered as the radius of the object plane. Therefore, the lateral dimension of the object plane must satisfy the following Eq. 186, where c is proportionality constant.

$$2\pi S \cos \chi = cW$$ [Math Figure 186]

Furthermore, considering the range of the said elevation angle, the following relation given in Eq. 187 must holds.

$$SG(\mu) = c(y″ - y″_o)$$ [Math Figure 187]

Therefore, Eq. 188 must be satisfied.

$$B \equiv \frac{S}{c} = \frac{W}{2\pi \cos\chi} = \frac{y″ - y″_o}{G(\mu)}$$ [Math Figure 188]

Here, B is a constant. On the other hand, another monotonic function F(μ) is defined as in Eq. 189.

$$F(\mu) \equiv \frac{G(\mu)}{\cos\chi}$$ [Math Figure 189]

Therefore, Eq. 190 can be obtained from Eqs. 188 and 189.

$$A \equiv B\cos\chi = \frac{W}{2\pi} = \frac{y″ - y″_o}{F(\mu)}$$ [Math Figure 190]

The following equation can be obtained from Eqs. 185, 189 and 190.

$$F(\mu) = \frac{\tan\mu}{\cos\chi} = \frac{y″ - y″_o}{A}$$ [Math Figure 191]

Therefore, the elevation angle corresponding to the said third point is given by Eq. 192.

$$\mu = F^{-1}\left(\frac{y'' - y_o''}{A}\right) = \tan^{-1}\left\{\frac{\cos\chi}{A}(y'' - y_o'')\right\}$$ [Math Figure 192]

Furthermore, the zenith angle can be easily obtained from the elevation angle of the incident ray.

$$\theta = \frac{\pi}{2} - \mu - \chi$$ [Math Figure 193]

On the other hand, the azimuth angle corresponding to the said third point is given by Eq. 194.

$$\phi = \frac{2\pi}{W}(x'' - x_o'')$$ [Math Figure 194]

Therefore, using equations 190 through 194, the zenith and the azimuth angles of the incident ray corresponding to the third point on the processed image plane can be obtained, and using this, image processing can be done as in the previous embodiments.

Identical to the previous examples, considering the fact that all the image sensors and display devices are digital devices, image processing procedure must use the following set of equations. First, the desirable size ($I_{max}$, $J_{max}$) of the processed image plane, the location ($I_o$, $J_o$) of the reference point, and the vertex half-angle of the cone, in other words, the reference angle $\chi$, are set-up. In this embodiment, the reference angle $\chi$ takes a value that is larger than $-90°$ and smaller than $90°$. Then, the said constant A is given by Eq. 195.

$$A = \frac{J_{max} - 1}{2\pi}$$ [Math Figure 195]

By using $J_{max}-1$ as the numerator as in this case, the first column (i.e., the column with J=1) of the processed image plane exhibits the same information as the last column (i.e., the column with $J=J_{max}$). In a panoramic image exhibiting the view of 360° directions, it appears natural when the left edge and the right edge matches. However, if such a duplicate display of information is not preferred, then it is only necessary to change the numerator in Eq. 195 as $J_{max}$. Next, for all the pixels (I, J) on the said processed image plane, the elevation angle $\mu_1$ and the azimuth angle $\phi_J$ given by Eq. 196 and 197 are computed.

$$\mu_I = F^{-1}\left(\frac{I - I_o}{A}\right) = \tan^{-1}\left\{\frac{\cos\chi}{A}(I - I_o)\right\}$$ [Math Figure 196]

$$\phi_J = \frac{2\pi}{J_{max} - 1}(J - J_o)$$ [Math Figure 197]

On the other hand, the zenith angle of the incident ray is given by Eq. 198.

$$\theta_I = \frac{\pi}{2} - \chi - \mu_I$$ [Math Figure 198]

The image height $r_1$ on the image sensor plane is obtained using Eq. 199.

$$r_1 = r(\theta_1)$$ [Math Figure 199]

Then, the position ($K_o$, $L_o$) of the second intersection point on the uncorrected image plane and the magnification ratio g are used to find the position of the second point on the uncorrected image plane.

$$x'_{I,J} = L_o + gr_1 \cos\phi_J$$ [Math Figure 200]

$$y'_{I,J} = K_o + gr_1 \sin\phi_J$$ [Math Figure 201]

Once the position of the corresponding second point has been found, then interpolation methods such as described in the first through the third embodiments can be used to obtain a panoramic image. Such a processed image plane satisfies the relation given in Eq. 202 or Eq. 203.

$$\frac{J_{max} - 1}{2\pi} = \frac{I_{max} - 1}{F(\mu_{1max}) - F(\mu_1)}$$ [Math Figure 202]

$$\frac{J_{max}}{2\pi} = \frac{I_{max} - 1}{F(\mu_{1max}) - F(\mu_1)}$$ [Math Figure 203]

FIG. 58 is a panoramic image extracted from FIG. 26 using this method, whereof the lateral dimension of the processed image plane is $J_{max}$=720 pixels, the longitudinal dimension is $I_{max}$=120 pixels, the position of the reference point is ($I_o$=1, $J_o$=1), and the reference angle is $\chi$=0. On the other hand, in FIG. 59, the position of the reference point is ($I_o$=60.5, $J_o$=1), the reference angle is $\chi$=45°, and the function given in Eq. 185 has been used. From the FIGS. 58 and 59, it is clear that a natural looking panorama can be obtained.

Ninth Embodiment

FIG. 60 is a conceptual drawing of an object plane according to the ninth embodiment of the present invention. The main difference between the examples in the eighth and the ninth embodiments of the present invention is the fact that, a cone contacting the celestial sphere is used as the object plane in the eighth embodiment, while the celestial sphere itself is used as the object plane in the ninth embodiment. All the other aspects are mostly identical. In the ninth embodiment, also, a celestial sphere (6030) with a radius S is assumed that takes the nodal point N of the lens as the center of the sphere. When all the points having a latitude angle $\chi$ from the ground plane, in other words, the X-Y plane, are marked, then the collection of these points form a small circle on the celestial sphere. The elevation angle $\mu$ of the incident ray is measured with respect to this small circle, and the zenith angle $\theta$ and the elevation angle $\mu$ of the incident ray satisfy the following relation given in Eq. 204.

$$\mu = \frac{\pi}{2} - \theta - \chi$$ [Math Figure 204]

The conceptual drawing of the uncorrected image plane according to the ninth embodiment of the present invention is identical to FIG. 56, and the conceptual drawing of the processed image plane is identical to FIG. 57. As has been marked in FIG. 57, the lateral dimension of the processed image plane is W, and the longitudinal dimension is H. The reference point O" on the processed image plane corresponds to the intersection point between the said small circle and the X-Z plane (i.e., the reference plane). The coordinate of the said reference point is $(x''_o, y''_o)$. Furthermore, the lateral distance from the said reference point to the third point P" on the processed image plane is proportional to the azimuth angle of the said object point (6004), and the longitudinal distance is proportional to an arbitrary monotonic function $F(\mu)$ of the elevation angle from the said tangential point (6009) to the said object point (6004), where the function is passing through the origin. Similar to the second embodiment of the present invention, the said monotonic function can be given by Eqs. 205 or 206.

$$F(\mu) = \mu \quad \text{[Math Figure 205]}$$

$$F(\mu) = \ln\left\{\tan\left(\frac{\mu}{2} + \frac{\pi}{4}\right)\right\} \quad \text{[Math Figure 206]}$$

The radius of the object plane of the present embodiment is taken as the radius of the celestial sphere. Therefore, the lateral dimension of the object plane must satisfy the relation given in Eq. 207, where c is proportionality constant.

$$2\pi S = cW \quad \text{[Math Figure 207]}$$

Furthermore, considering the range of the elevation angle, the relation given in Eq. 208 must be satisfied.

$$SF(\mu) = c(y'' - y''_o) \quad \text{[Math Figure 208]}$$

Therefore, the relation given in Eq. 209 must hold true.

$$A = \frac{S}{c} = \frac{W}{2\pi} = \frac{y'' - y''_o}{F(\mu)} = \frac{H}{F(\mu_2) - F(\mu_1)} \quad \text{[Math Figure 209]}$$

Therefore, the elevation angle corresponding to the said third point is given by Eq. 210.

$$\mu = F^{-1}\left(\frac{y'' - y''_o}{A}\right) \quad \text{[Math Figure 210]}$$

Furthermore, the zenith angle can be easily obtained from the elevation angle of the incident ray.

$$\theta = \frac{\pi}{2} - \mu - \chi \quad \text{[Math Figure 211]}$$

In this embodiment, the reference angle $\chi$ takes a value that is larger than −90° and smaller than 90°. On the other hand, the azimuth angle corresponding to the third point is given by Eq. 212.

$$\phi = \frac{2\pi}{W}(x'' - x''_o) \quad \text{[Math Figure 212]}$$

Therefore, using equations 208 through 212, the zenith and the azimuth angles of the incident ray corresponding to the third point on the processed image plane can be obtained, and using this, image processing can be done as in the previous embodiments.

Identical to the previous examples, considering the fact that all the image sensors and display devices are digital devices, image processing procedure must use the following set of equations. First, the desirable size $(I_{max}, J_{max})$ of the processed image plane, the location $(I_o, J_o)$ of the reference point, and the reference angle $\chi$ are set-up. Then, the said constant A is given either by Eq. 213 or 214.

$$A = \frac{J_{max} - 1}{2\pi} \quad \text{[Math Figure 213]}$$

$$A = \frac{J_{max}}{2\pi} \quad \text{[Math Figure 214]}$$

By using $J_{max}-1$ as the numerator as in Eq. 213, the first column of the processed image plane exhibits the same information as the last column. On the other hand, by using $J_{max}$ as the numerator as in Eq. 214, all the columns correspond to different azimuth angles. Next, for all the pixels (I, J) on the said processed image plane, the elevation angle $\mu_I$ and the azimuth angle $\phi_J$ given by Eq. 215 and 216 are computed.

$$\mu_I = F^{-1}\left(\frac{I - I_o}{A}\right) \quad \text{[Math Figure 215]}$$

$$\phi_J = \frac{2\pi}{J_{max} - 1}(J - J_o) \quad \text{[Math Figure 216]}$$

On the other hand, the zenith angle of the incident ray is given by Eq. 217.

$$\theta_I = \frac{\pi}{2} - \chi - \mu_I \quad \text{[Math Figure 217]}$$

The image height $r_1$ on the image sensor plane is calculated using Eq. 218.

$$r_1 = r(\theta_I) \quad \text{[Math Figure 218]}$$

Next, the position $(K_o, L_o)$ of the second intersection point on the uncorrected image plane and the magnification ratio g are used to find the position of the second point on the uncorrected image plane.

$$x'_{I,J} = L_o + gr_1 \cos\phi_J \quad \text{[Math Figure 219]}$$

$$y'_{I,J} = K_o + gr_1 \sin\phi_J \quad \text{[Math Figure 220]}$$

Once the position of the corresponding second point has been found, interpolation methods such as described in the first and the second embodiments can be used to obtain a panoramic image. Such a processed image plane satisfies the relation given in Eq. 221 or Eq. 222.

$$\frac{J_{max}-1}{2\pi} = \frac{I_{max}-1}{F(\mu_{1max})-F(\mu_1)}$$ [Math Figure 221]

$$\frac{J_{max}}{2\pi} = \frac{I_{max}-1}{F(\mu_{1max})-F(\mu_1)}$$ [Math Figure 222]

The desirable examples of the monotonically increasing function $F(\mu)$ of the elevation angle in this embodiment can be given by Eqs. 97, 99 and 101. FIG. 61 is a panoramic image acquired using this method, and an equidistance projection scheme given in Eq. 99 has been used. The lateral dimension of the processed image plane is $J_{max}$=720 pixels, the longitudinal dimension is $I_{max}$=180 pixels, the position of the reference point is ($I_o$=90.5, $J_o$=1), and the reference angle, in other words, the vertex half-angle of the cone, is $\chi$=45°. On the other hand, a Mercator projection scheme given in Eq. 101 has been used in FIG. 62. Especially, since the vertical field of view in FIG. 62 is 90°, an imaging system completely free from a dead zone in security monitoring can be realized.

Tenth Embodiment

The most of the imaging systems in the present invention excluding those from the fifth and the sixth embodiments share many common features. FIG. 63 is a conceptual drawing of the world coordinate system that are common to the most of the embodiments of the present invention. For the simplicity of argument, this will be referred to as the tenth embodiment. The tenth embodiment of the present invention is a device that includes an image acquisition means, an image processing means and an image display means, where the image acquisition means is a camera mounted with a wide-angle imaging lens rotationally symmetric about an optical axis, the said image processing means extracts a panoramic image by image processing the distorted wide-angle image acquired using the said image acquisition means, and the said image display means display the said panoramic image on a rectangular screen.

The world coordinate system of the tenth embodiment of the present invention takes the nodal point N of the said lens as the origin, and a vertical line passing through the origin as the Y-axis. Here, a vertical line is a line perpendicular to the ground plane, or more precisely to the horizontal plane (6317). The X-axis and the Z-axis of the world coordinate system are contained within the ground plane. The optical axis (6301) of the said wide-angle lens generally does not coincide with the Y-axis, and can be contained within the ground plane (i.e., parallel to the ground plane), or is not contained within the ground plane. Herein, the plane (6304) containing both the said Y-axis and the said optical axis (6301) is referred to as the reference plane. The intersection line (6302) between this reference plane (6304) and the ground plane (6317) coincides with the Z-axis of the world coordinate system. On the other hand, an incident ray (6305) originating from an object point Q having a rectangular coordinate (X, Y, Z) in the world coordinate system has an altitude angle $\delta$ from the ground plane, and an azimuth angle $\Psi$ with respect to the reference plane. The plane containing both the said Y-axis and the said incident ray is the incidence plane (6306). The horizontal incidence angle $\Psi$ of the said incident ray with respect to the said reference plane is given by Eq. 223.

$$\psi = \tan^{-1}\left(\frac{X}{Z}\right)$$ [Math Figure 223]

On the other hand, the vertical incidence angle (i.e., the altitude angle) $\delta$ subtended by the said incident ray and the X-Z plane is given by Eq. 224.

$$\delta = \tan^{-1}\left(\frac{Y}{\sqrt{X^2+Z^2}}\right)$$ [Math Figure 224]

Said elevation angle $\mu$ of the incident ray is given by Eq. 225, where the reference angle $\chi$ takes a value that is larger than −90°, and smaller than 90°.

$$\mu = \delta - \chi$$ [Math Figure 225]

On the other hand, if we assume the coordinate of an image point on a screen corresponding to an object point with a coordinate (X, Y, Z) in the world coordinate system is (x", y"), then the said image processing means process the image so that the image point corresponding to an incident ray originating from the said object point appears on the said screen at the coordinate (x", y"), wherein the lateral coordinate x" of the image point is given by Eq. 226.

$$x'' = c\Psi$$ [Math Figure 226]

Here, c is proportionality constant. Furthermore, the longitudinal coordinate y" of the said image point is given by Eq. 227.

$$y'' = cF(\mu)$$ [Math Figure 227]

Here, $F(\mu)$ is a monotonically increasing function passing through the origin. In mathematical terminology, it means that Eqs. 228 and 229 are satisfied.

$$F(0) = 0$$ [Math Figure 228]

$$\frac{\partial F(\mu)}{\partial \mu} > 0$$ [Math Figure 229]

The above function F can take an arbitrary form, but the most desirable forms are given by Eqs. 230 through 232.

$$F(\mu) = \frac{\tan\mu}{\cos\chi}$$ [Math Figure 230]

$$F(\mu) = \mu$$ [Math Figure 231]

$$F(\mu) = \ln\left\{\tan\left(\frac{\mu}{2}+\frac{\pi}{4}\right)\right\}$$ [Math Figure 232]

The specification of the present invention is implicitly described with reference to the visible wavelength range, but the projection scheme of the present invention can be described by the same equations as described above even in the millimeter and the microwave wavelength ranges, in the ultra violet wavelength range, in the near infrared wavelength range, in the far infrared wavelength range, as well as in the visible wavelength range. Accordingly, the present invention is not limited to imaging systems operating in the visible wavelength range.

Preferred embodiments of the current invention have been described in detail referring to the accompanied drawings. However, the detailed description and the embodiments of the current invention are purely for illustrate purpose, and it will be apparent to those skilled in the art that variations and modifications are possible without deviating from the sprits and the scopes of the present invention.

INDUSTRIAL APPLICABILITY

According to the present invention, mathematically precise image processing methods of extracting panoramic images that appear most natural to the naked eye from an image acquired using a camera equipped with a wide-angle lens rotationally symmetric about an optical axis, and devices using the methods are provided.

SEQUENCE LIST TEXT panorama, distortion, projection scheme, equidistance projection, rectilinear projection, fisheye lens, panoramic lens, image processing, image correction, rear view camera, video phone

The invention claimed is:

1. A panoramic imaging system comprising:
an image acquisition means for acquiring a wide-angle image using a fisheye lens rotationally symmetric about an optical axis;
an image processing means for generating a panoramic image based on the said wide-angle image; and
an image display means for displaying the said panoramic image on a rectangular screen,
wherein;
a coordinate of an image point on the rectangular screen corresponding to an object point having a coordinate (X, Y, Z) in a world coordinate system, which has a nodal point of the fisheye lens as an origin and a vertical line passing through the origin as the Y-axis and an intersection line between a reference plane containing the said Y-axis and the said optical axis of the fisheye lens and a horizontal plane perpendicular to the said vertical line as the Z-axis, is given as (x", y"),
a horizontal incidence angle $\Psi$, which an incident ray originating from the said object point makes with the said reference plane, is given as $$\psi = \tan^{-1}\left(\frac{X}{Z}\right),$$

a vertical incidence angle $\delta$, which the said incident ray makes with the X-Z plane, is given as $$\delta = \tan^{-1}\left(\frac{Y}{\sqrt{X^2 + Z^2}}\right),$$

a lateral coordinate x" of the said image point is given as x"=c$\Psi$,
herein, c is a proportionality constant,
a longitudinal coordinate y" of the said image point is given as y"=cF($\delta$),
herein, the function F($\delta$) is a monotonically increasing function.

2. The panoramic imaging system of claim 1, wherein the function F($\delta$) of the vertical incidence angle $\delta$ of the said incident ray is given by F($\delta$)=tan $\delta$.

3. The panoramic imaging system of claim 1, wherein the function F($\delta$) of the vertical incidence angle $\delta$ of the said incident ray is given by F($\delta$)=$\delta$.

4. The panoramic imaging system of claim 1, wherein the function F($\delta$) of the vertical incidence angle $\delta$ of the said incident ray is given by $$F(\delta) = \ln\left\{\tan\left(\frac{\delta}{2} + \frac{\pi}{4}\right)\right\}.$$

5. A panoramic imaging system comprising:
an image acquisition means for acquiring a wide-angle image using a fisheye lens rotationally symmetric about an optical axis;
an image processing means for generating a panoramic image based on the said wide-angle image; and
an image display means for displaying the said panoramic image on a rectangular screen,
wherein;
if the optical axis of the fisheye lens is aligned parallel to a horizontal plane,
then a coordinate of an image point on the rectangular screen corresponding to an object point having a coordinate (X, Y, Z) in a world coordinate system, which has a nodal point of the fisheye lens as an origin and a vertical line passing through the origin as the Y-axis and the optical axis of the fisheye lens as the Z-axis, is given as (x", y"),
a lateral coordinate x" of the said image point is proportional to a horizontal incidence angle $\Psi$,
herein, the said horizontal incidence angle $\Psi$ is an angle an incident ray originating from the said object point makes with the Y-Z plane and is given as $$\psi = \tan^{-1}\left(\frac{X}{Z}\right),$$

a longitudinal coordinate y" of the said image point is given as a monotonically increasing function of a vertical incidence angle $\delta$,
herein, the vertical incidence angle $\delta$ is an angle the said incident ray makes with the X-Z plane and is given as $$\delta = \tan^{-1}\left(\frac{Y}{\sqrt{X^2 + Z^2}}\right).$$

6. The panoramic imaging system of claim 5, wherein the function F(67) of the vertical incidence angle $\delta$ of the said incident ray is given by F($\delta$)=tan $\delta$.

7. The panoramic imaging system of claim 5, wherein the function $F(\delta)$ of the vertical incidence angle $\delta$ of the said incident ray is given by $F(\delta)=\delta$.

8. The panoramic imaging system of claim 5, wherein the function $F(\delta)$ of the vertical incidence angle $\delta$ of the said incident ray is given by $$F(\delta) = \ln\left\{\tan\left(\frac{\delta}{2} + \frac{\pi}{4}\right)\right\}.$$

* * * * *